US009500807B2

(12) United States Patent
Oka

(10) Patent No.: US 9,500,807 B2
(45) Date of Patent: Nov. 22, 2016

(54) PLANAR OPTICAL WAVEGUIDE ELEMENT, DUAL POLARIZATION QUADRATURE PHASE SHIFT KEYING MODULATOR, COHERENT RECEIVER, AND POLARIZATION DIVERSITY

(71) Applicant: Fujikura Ltd., Koto-ku, Tokyo (JP)

(72) Inventor: Akira Oka, Sakura (JP)

(73) Assignee: FUJIKURA, LTD., Tokyo (JP)

( * ) Notice: Subject to any disclaimer, the term of this patent is extended or adjusted under 35 U.S.C. 154(b) by 0 days.

(21) Appl. No.: 14/827,397

(22) Filed: Aug. 17, 2015

(65) Prior Publication Data

US 2016/0062038 A1 Mar. 3, 2016

(30) Foreign Application Priority Data

Aug. 27, 2014 (JP) ................................ 2014-173320

(51) Int. Cl.
| | |
|---|---|
| *G02B 6/26* | (2006.01) |
| *G02B 6/122* | (2006.01) |
| *G02B 6/125* | (2006.01) |
| *G02B 6/14* | (2006.01) |

(Continued)

(52) U.S. Cl.
CPC .............. *G02B 6/1228* (2013.01); *G02B 6/125* (2013.01); *G02B 6/14* (2013.01); *G02F 1/011* (2013.01); *G02F 1/0136* (2013.01); *G02B 2006/12038* (2013.01); *G02B 2006/12061* (2013.01); *G02F 2001/0113* (2013.01); *G02F 2001/0142* (2013.01)

(58) Field of Classification Search
None
See application file for complete search history.

(56) References Cited

U.S. PATENT DOCUMENTS

| | | | | |
|---|---|---|---|---|
| 7,539,373 | B1 * | 5/2009 | Logvin | G02B 6/12004 385/28 |
| 2006/0204175 | A1 * | 9/2006 | Laurent-Lund | G02B 6/1228 385/43 |

(Continued)

FOREIGN PATENT DOCUMENTS

| | | |
|---|---|---|
| JP | 9-178967 A | 7/1997 |
| JP | 2007-114253 A | 5/2007 |

(Continued)

OTHER PUBLICATIONS

Daoxin Dai et al., "Novel concept for ultracompact polarization splitter-rotator based on silicon nanowires", Optics Express, May 23, 2011, pp. 10940-10949, vol. 19, No. 11.

(Continued)

*Primary Examiner* — Eric Wong
(74) *Attorney, Agent, or Firm* — Sughrue Mion, PLLC

(57) ABSTRACT

A planar optical waveguide element includes: a substrate; and an optical waveguide comprising a core and a cladding, the core being provided on the substrate so as to include first and second core regions arranged in parallel, the cladding having a smaller refractive index than the core. Also, the core forms a preceding-stage mode conversion portion that converts a mode of input light and a subsequent-stage mode conversion portion that converts a mode of light output from the preceding-stage mode conversion portion, and the first and second core regions are spaced apart from each other at an input end of the subsequent-stage mode conversion portion, and a gap between the first and second core regions is continuously decreased along the light waveguide direction such that the first and second core regions are in contact with each other at an output end of the subsequent-stage mode conversion portion.

14 Claims, 45 Drawing Sheets

(51) Int. Cl.
 *G02F 1/01* (2006.01)
 *G02B 6/12* (2006.01)

(56) References Cited

U.S. PATENT DOCUMENTS

2007/0086704 A1  4/2007  Ishikawa et al.
2012/0076465 A1* 3/2012  Chen .................. G02B 6/14
                                            385/124

FOREIGN PATENT DOCUMENTS

JP       4361030 B2    11/2009
JP       2013-68909 A   4/2013

OTHER PUBLICATIONS

Michael G. F. Wilson et al., "Tapered Optical Directional Coupler", IEEE Transactions on Microwave Theory and Techniques, Jan. 1975, pp. 85-92, vol. MTT-23, No. 1.

Po Dong et al., "112-Gb/s Monolithic PDM-QPSK Modulator in Silicon", European Conference and Exhibition on Optical Communication, 2012, vol. 1, Th.3.B.1.

C. R. Doerr et al., "Packaged Monolithic Silicon 112-Gb/s Coherent Receiver", IEEE Photonics Technology Letters, Jun. 15, 2011, pp. 762-764, vol. 23, No. 12.

Qing Fang et al., "Suspended optical fiber-to-waveguide mode size converter for Silicon photonics", Optics Express, Apr. 12, 2010, pp. 7763-7769, vol. 18, No. 8.

Hiroshi Fukuda et al., "Silicon photonic circuit with polarization diversity", Optics Express, Mar. 31, 2008, pp. 4872-4880, vol. 16, No. 7.

Yunhong Ding et al., "On-chip two-mode division multiplexing using tapered directional coupler-based mode multiplexer and demultiplexer", Optics Express, Apr. 22, 2013, pp. 10376-10382, vol. 21, No. 8.

Dong et al., "112-Gb/s monolithic PDM-QPSK modulator in silicon", Optics Express, Dec. 10, 2012, vol. 20, No. 26, pp. B624-B629.

Sun et al., "Adiabaticity criterion and the shortest adiabatic mode transformer in a coupled-waveguide system", Optics Letters, Feb. 1, 2009, vol. 34, No. 3, pp. 280-282.

Communication dated May 10, 2016 from Japanese Patent Office in counterpart Application No. 2014-173320.

Communication dated Aug. 2, 2016, from the Japanese Patent Office in counterpart Japanese application No. 2014-173320.

* cited by examiner

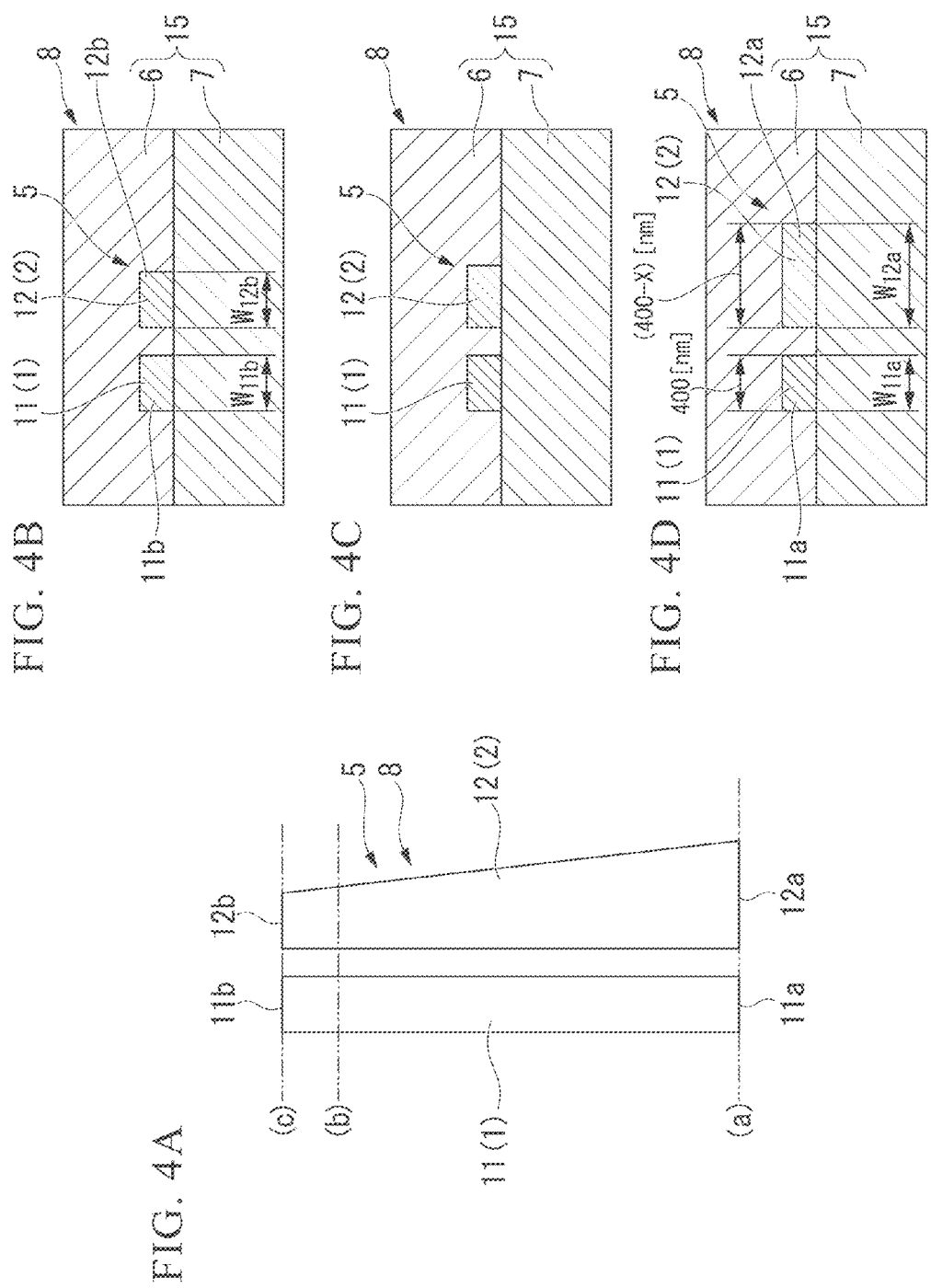

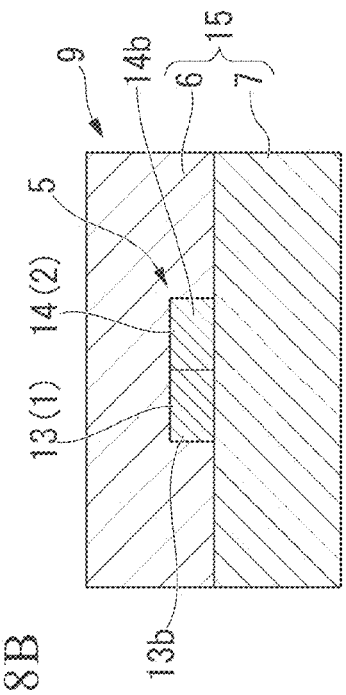
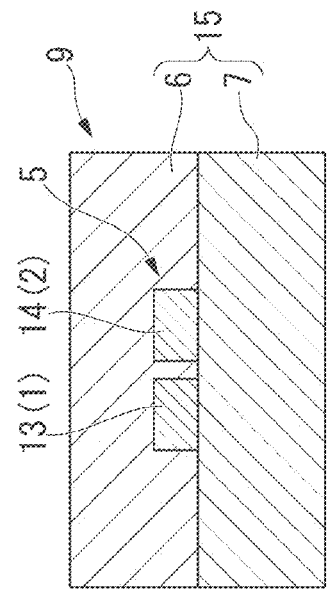
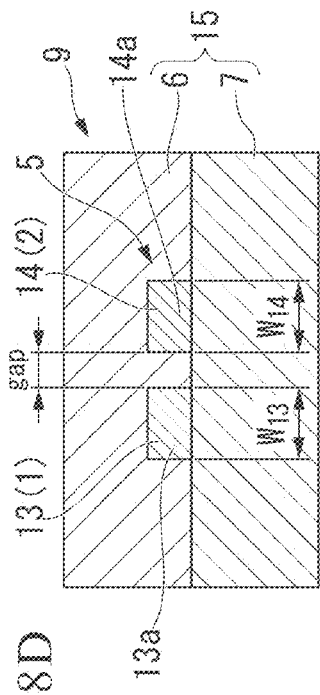
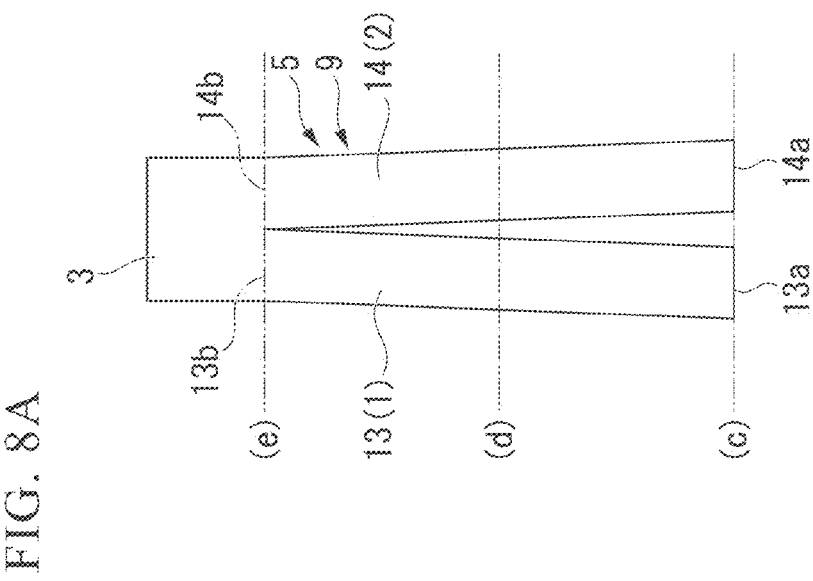

FIG. 10A #0
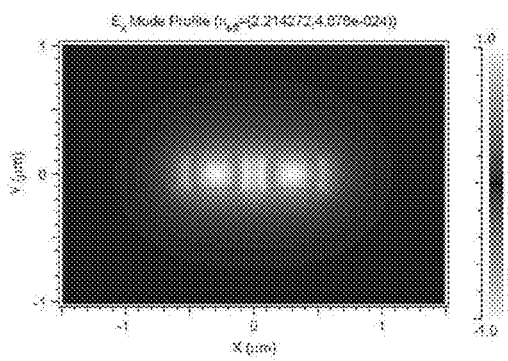
FIG. 10B #1
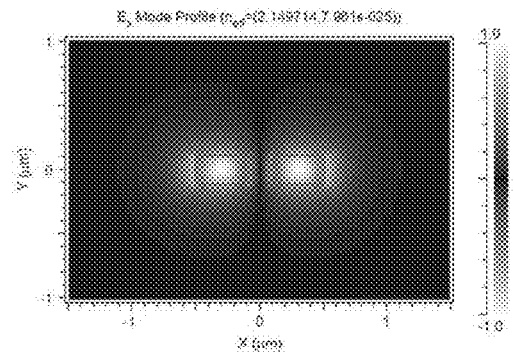
FIG. 10C #0
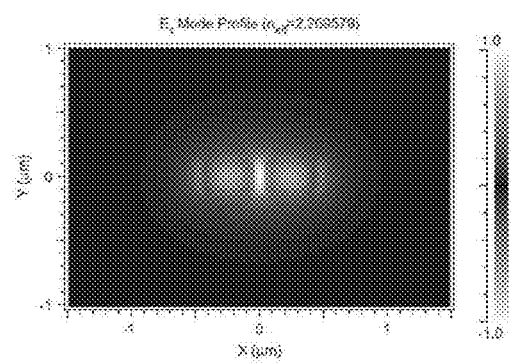
FIG. 10D #1
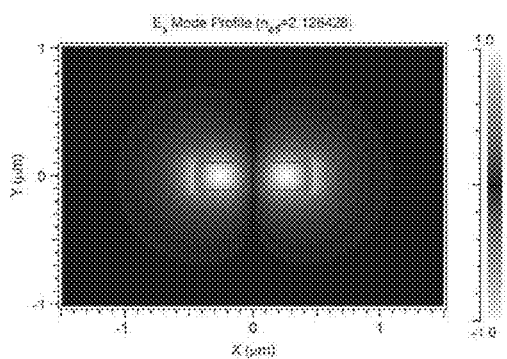
FIG. 10E #0
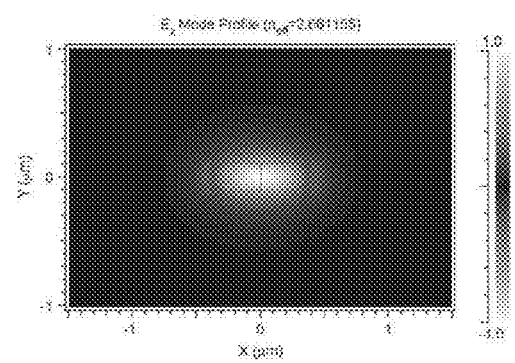
FIG. 10F #1
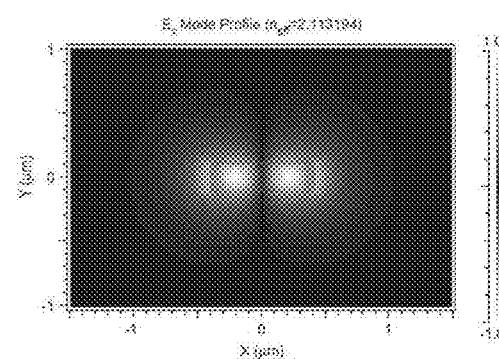

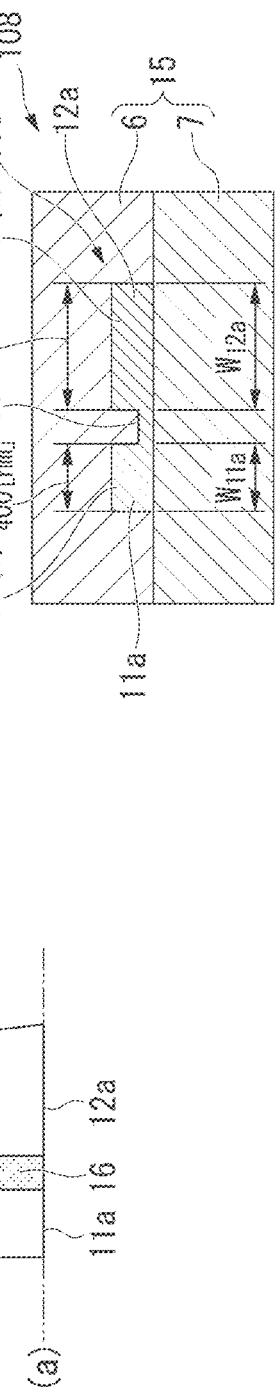
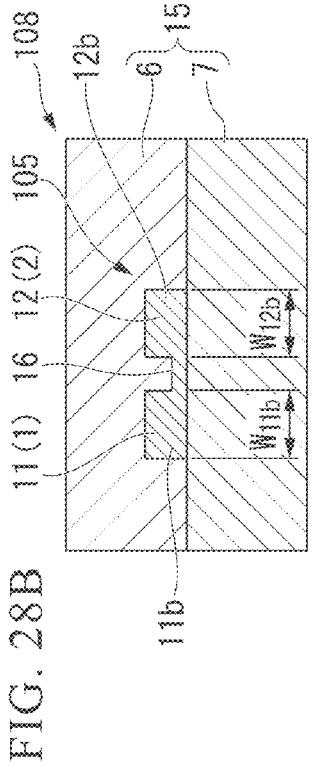
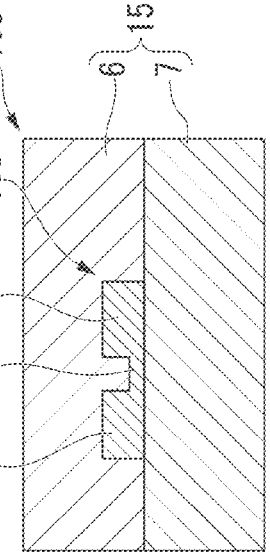
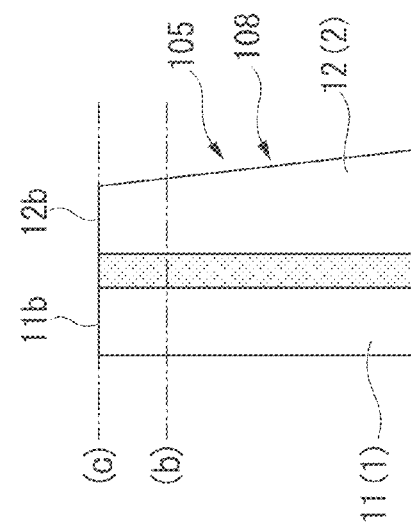

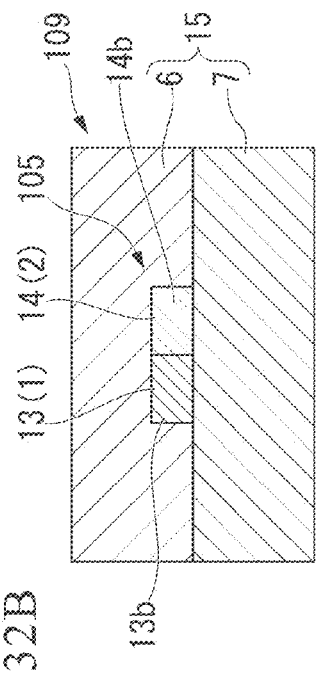
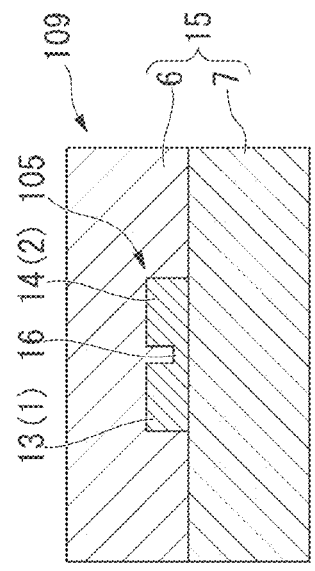
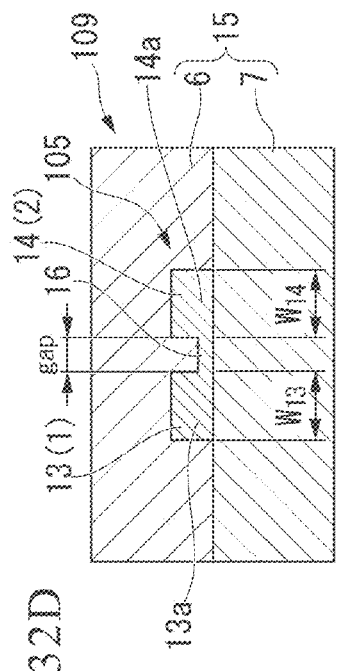
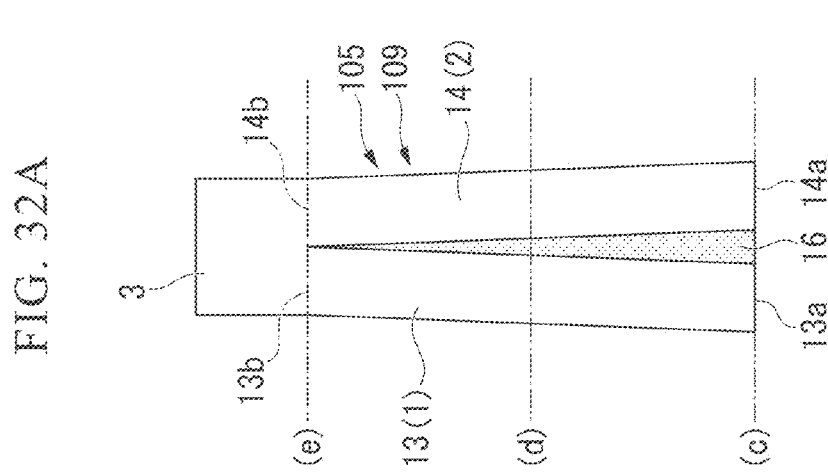
FIG. 32A
FIG. 32B
FIG. 32C
FIG. 32D

FIG. 34A
FIG. 34B
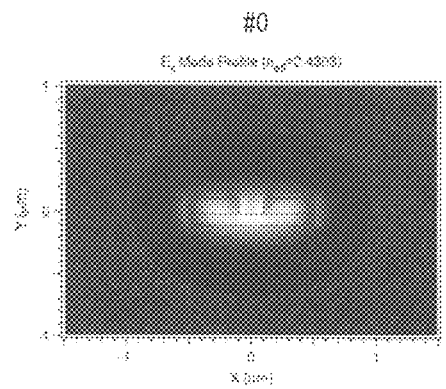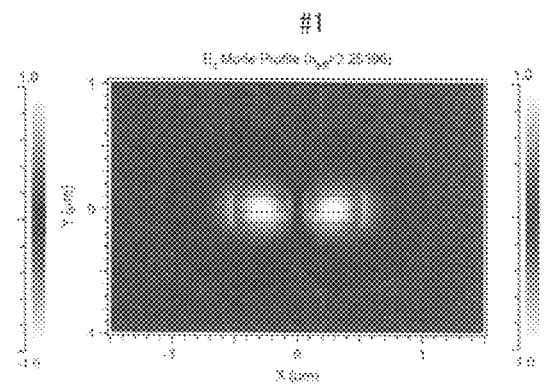
FIG. 34C
FIG. 34D
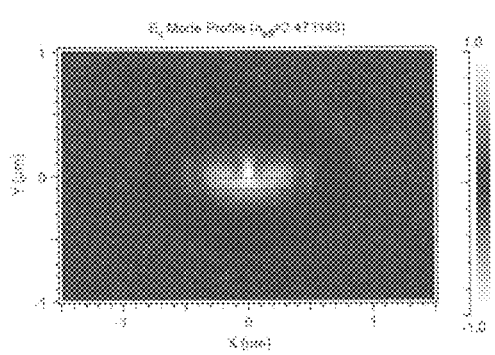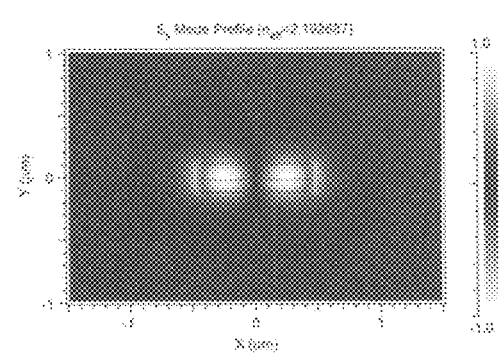
FIG. 34E
FIG. 34F
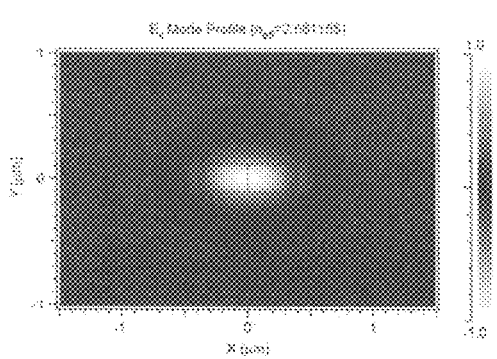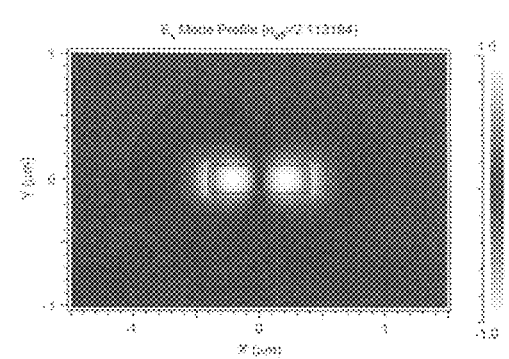

FIG. 45A    FIG. 45B    FIG. 45C
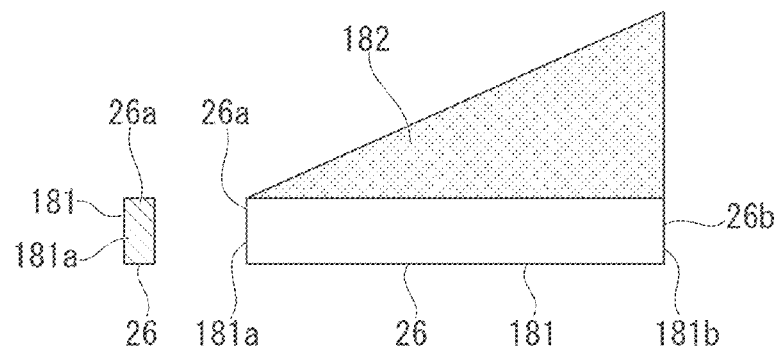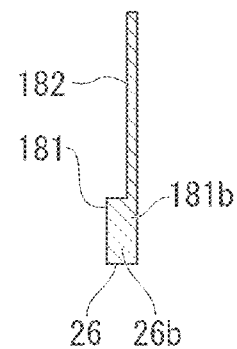
FIG. 46A    FIG. 46B    FIG. 46C
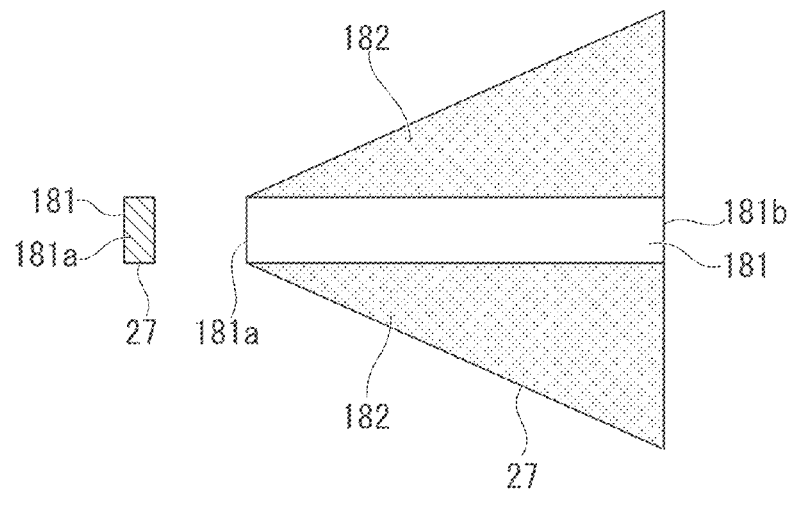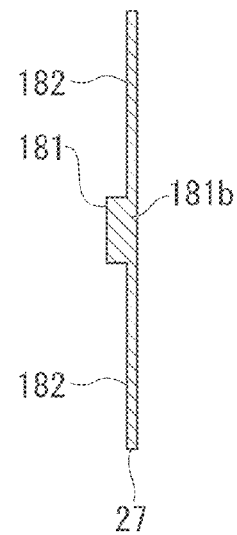

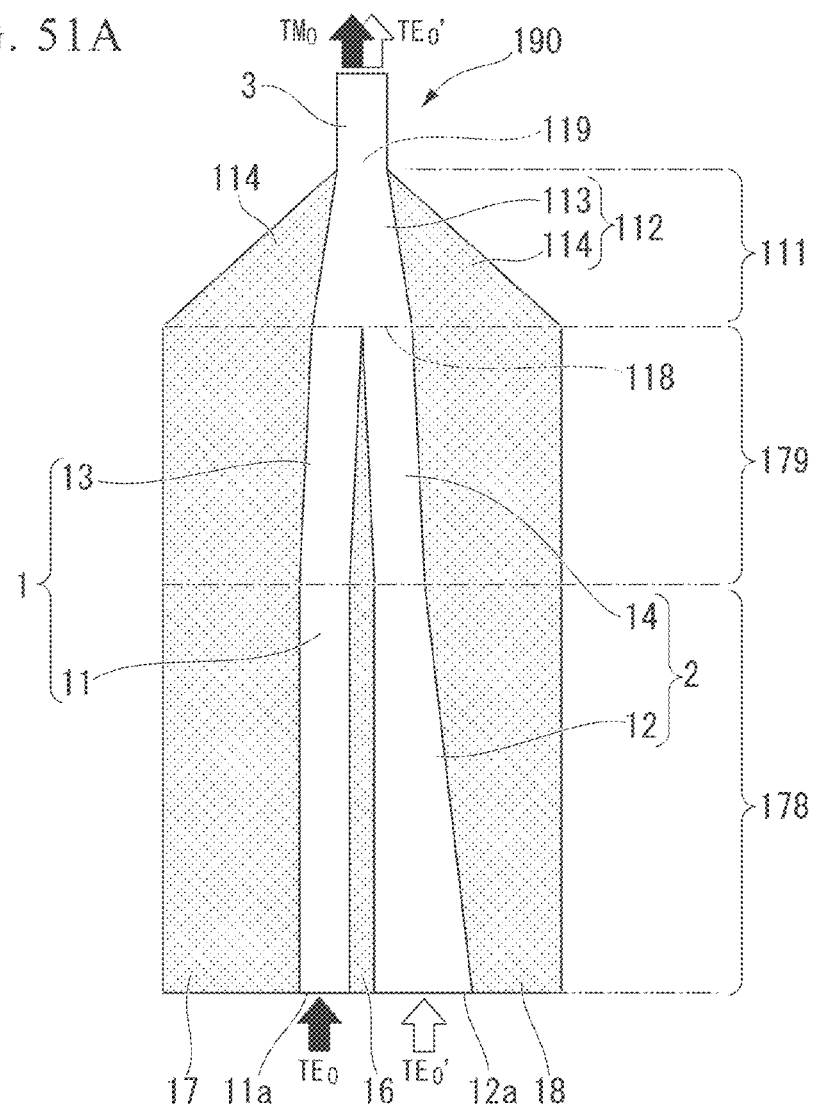
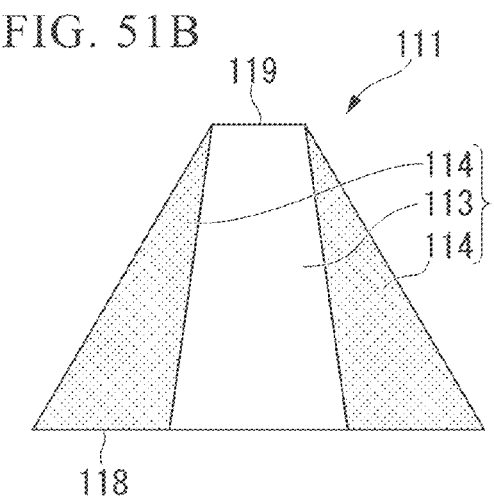
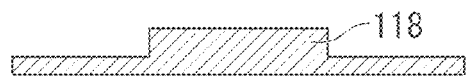
FIG. 51A
FIG. 51B
FIG. 51C
FIG. 51D

PLANAR OPTICAL WAVEGUIDE ELEMENT, DUAL POLARIZATION QUADRATURE PHASE SHIFT KEYING MODULATOR, COHERENT RECEIVER, AND POLARIZATION DIVERSITY

BACKGROUND OF THE INVENTION

Field of the Invention

The present invention relates to a planar optical waveguide element, a dual polarization quadrature phase shift keying modulator, a coherent receiver, and a polarization diversity.

Priority is claimed on Japanese Patent Application No. 2014-173320, filed on Aug. 27, 2014, the content of which is incorporated herein by reference.

Description of Related Art

Currently, the amount of information transmitted in optical communication is increasing. In order to respond to such an increase in the amount of information, measures have been taken for an increase in the signal speed, an increase in the number of channels due to wavelength multiplexing communication, and the like. In particular, in digital coherent transmission technology of the next generation 100 Gbps (gigabit per second) for high-speed information communication, in order to double the amount of information per unit time, a polarization multiplexing scheme for carrying information in two polarized waves having electric fields perpendicular to each other is used.

However, in modulation schemes for high-speed communication including the polarization multiplexing scheme, an optical modulator having a complicated configuration is required. For this reason, problems, such as an increase in device size and an increase in cost, occur. In order to solve such problems, an optical modulator including a planar optical waveguide using silicon, which is advantageous in terms of easy processing, size reduction by integration, and cost reduction by mass production, has been studied.

However, the polarization multiplexing in the planar optical waveguide has the following problems. In general, the planar optical waveguide has a shape in which the width direction parallel to the substrate and the height direction perpendicular to the substrate are asymmetric. For this reason, between two types of polarization modes of a mode in which an electric field component in the width direction is a main component (hereinafter, referred to as a TE mode) and a mode in which an electric field component in the height direction is a main component (hereinafter, referred to as a TM mode), characteristics, such as effective refractive indices, are different. Among these modes, $TE_0$ and $TM_0$ are used in many cases. $TE_0$ refers to a mode having the largest effective refractive index of the TE modes, and $TM_0$ refers to a mode having the largest effective refractive index of the TM modes.

It is difficult to perform an optical modulation operation for these modes having different characteristics with a single planar optical waveguide element. Accordingly, planar optical waveguide elements that are optimally designed for the respective modes are required. However, this requires a lot of effort in terms of the development of the planar optical waveguide elements.

As a method for solving this problem, a method can be mentioned in which $TE_0$ is used as light incident on the planar optical waveguide element designed optimally for $TE_0$ and the output is polarization-converted to $TM_0$. The polarization conversion herein indicates a conversion from $TE_0$ to $TM_0$ or a conversion from $TM_0$ to $TE_0$. In order to perform the operation described above, a planar optical waveguide element for performing polarization conversion on the substrate is required.

As a technique for performing such polarization conversion on the substrate, there is a method of combining the conversion between $TE_0$ and $TE_1$ and the conversion between $TE_1$ and $TM_0$. Among these, focus will be given to the conversion between $TE_0$ and $TE_1$. Here, $TE_1$ indicates a TE mode having a second largest effective refractive index.

As an optical waveguide element having a function of conversion between $TE_0$ and $TE_1$ in the related art, an optical waveguide element disclosed in Daoxin Dai and John E. Bowers, "Novel concept for ultracompact polarization splitter-rotator based on silicon nanowires," Optics Express, Vol. 19, Issue 11, pp. 10940-10949 (2011) can be mentioned.

FIGS. 55A and 55B show an optical waveguide element obtained by modeling the structure disclosed in Daoxin Dai and John E. Bowers, "Novel concept for ultracompact polarization splitter-rotator based on silicon nanowires," Optics Express, Vol. 19, Issue 11, pp. 10940-10949 (2011). FIG. 55A is a plan view, and FIG. 55B is a sectional view.

The optical waveguide element includes core regions 81 and 82 and a cladding 15. The cladding 15 includes a lower cladding 7 and an upper cladding 6.

The core regions 81 and 82 are straight waveguides, and are arranged in parallel to form a directional coupler. In the directional coupler, the $TE_0$ of the core region 81 and the $TE_1$ of the core region 82 are coupled to perform mode conversion.

In order to perform efficient mode conversion in the directional coupler, it is necessary to make the effective refractive indices of $TE_0$ and $TE_1$ be approximately the same. Therefore, the waveguide structure is adjusted according to the respective modes.

In the optical waveguide element, in order to make the effective refractive indices of $TE_0$ and $TE_1$ be approximately the same, the widths of the core regions 81 and 82 are adjusted. Since the widths of the core regions 81 and 82 are different, the directional coupler is referred to as an "asymmetric directional coupler".

However, the optical waveguide element described above couples different modes. Therefore, even if the conditions "making the effective refractive indices of $TE_0$ and $TE_1$ be approximately the same" for a specific wavelength are satisfied by adjusting the waveguide structure (for example, by adjusting the width of the core region), the effective refractive indices of the two above modes are shifted in case that the wavelength is changed. In addition, when the waveguide structure is changed due to a manufacturing error, the effective refractive indices of the two modes are shifted. These may reduce the conversion efficiency.

Therefore, the related art has a problem that the wavelength band that enables high-efficiency conversion is narrow and the related art is susceptible to manufacturing errors.

Hereinafter, these problems will be described using the asymmetric directional coupler in the related art shown in FIGS. 55A and 55B as an example.

In this example, the core regions 81 and 82 are formed of Si (refractive index of 3.48), and both of the upper and lower claddings 6 and 7 are formed of $SiO_2$ (refractive index of 1.44). The heights of the core regions 81 and 82 are set to 220 nm. The gap between the core regions 81 and 82 is set to 200 nm.

The waveguide including a narrow core region 81, through which the $TE_0$ to be mode-converted is guided, is assumed to be a "waveguide 1", and the waveguide including a wide core region 82, through which the $TE_1$ is guided, is assumed to be a "waveguide 2".

The width of the core region 81 is set to 400 nm. In this case, the width of the core region 82 is set to 838 nm so that the effective refractive indices of the $TE_0$ of the core region 81 and the $TE_1$ of the core region 82 are approximately the same at the wavelength of 1580 nm. The calculation result of each effective refractive index is shown in Table 1. For the calculation, a finite element method (FEM) is used.

TABLE 1

|  | $TE_0$ of waveguide 1 | $TE_1$ of waveguide 2 |
| --- | --- | --- |
| Effective refractive index | 2.178818 | 2.178940 |

The conversion efficiency of the asymmetric directional coupler is as follows. The conversion efficiency T is a ratio of the power of the output $TE_1$ to the power of the input $TE_0$.

$$T = F \sin^2(qL) \quad (1)$$

Here, F and q are expressed by the following equations.

$$F = \frac{1}{1 + \left(\frac{\delta}{\chi}\right)^2} \quad (2)$$

$$q = \sqrt{\chi^2 + \delta^2} \quad (3)$$

δ is expressed by the following equation.

$$\delta = \frac{\pi}{\lambda} \Delta N \quad (4)$$

L is the length of the asymmetric directional coupler in the propagation direction of light, ΔN is an effective refractive index difference (difference between the effective refractive indices in Table 1) between the $TE_0$ of the waveguide 1 and the $TE_1$ of the waveguide 2 when two waveguides are independently present, and λ is a wavelength. In addition, χ is the strength of coupling of the two waveguides, and is referred to as a coupling coefficient.

In the asymmetric directional coupler, even if the effective refractive indices of the two modes to be coupled are made to be the same by adjusting the waveguide structure, such as the width of the core region, at a certain wavelength (in this example, 1580 nm), the effective refractive indices are shifted if the wavelength is changed.

This problem is a problem that does not occur in a symmetric directional coupler, in which two cores have the same height and width and the coupling of the same mode is handled, and is a problem that occurs uniquely in the asymmetric directional coupler in which the coupling of different modes is handled.

FIG. 56 shows the relationship between the wavelength and the absolute value of ΔN in the optical waveguide element of this example. From FIG. 56, it can be seen that the absolute value of ΔN increases as the wavelength is shifted from 1580 nm.

From equations (1), (2), and (4), the conversion efficiency T decreases as the wavelength is shifted. Therefore, a high efficiency of conversion in a wide wavelength band cannot be expected.

The conversion efficiency for the wavelength (1520 nm to 1640 nm) in this case was calculated based on equations (1) to (4). The result is shown in FIG. 57. In equation (1), L is a value when the minimum value of the conversion efficiency in the wavelength band (1520 nm to 1640 nm) is maximized, and L=16.1 μm.

From FIG. 57, the conversion efficiency decreases as the amount of shift from the wavelength around 1580 nm increases. In the wavelength band of 1520 nm to 1640 nm, the conversion efficiency is equal to or greater than approximately −0.94 dB. This is because the absolute value of ΔN increases with respect to the wavelength as described above.

Now, the relationship between the manufacturing error and the conversion efficiency will be described. When the waveguide structure is changed, the degree of confinement of light is changed, and the effective refractive index relevant thereto is changed. Therefore, even if the waveguide structure is designed such that the effective refractive indices of the two modes to be coupled are approximately the same at a certain wavelength, the waveguide structure is changed due to the manufacturing error and the effective refractive indices of the two modes are shifted.

As a result, conversion efficiency is reduced as in the discussion about the wavelength dependence described above.

In order to confirm this, the manufacturing error of the width of the core region caused by lithography/etching is taken as an example.

Typically, for the design value of the width of the core region (width of the core region defined by the mask; in FIG. 58, $W_{81}$ and $W_{82}$), a manufacturing error occurs by the same amount (δ) locally in the two core regions 81 and 82, as shown in FIG. 58. In this example, it is assumed that the positions of both side edges of each core region change by δ/2 inwardly or outwardly.

Hereinafter, a case is assumed in which a manufacturing error δ (=−30 nm) occurs in the core region 81 (design value: 400 nm in width) and the core region 82 (design value: 838 nm in width) of the optical waveguide element shown in FIGS. 55A and 55B. FIG. 59 shows the relationship between the wavelength and the absolute value of ΔN.

From FIG. 59, it can be seen that the effective refractive indices of the $TE_0$ of the core region 81 and the $TE_1$ of the core region 82 are greatly shifted and the absolute value of ΔN is increased. Based on this, conversion efficiency was calculated. The above-described value was adopted as L (L=16.1 μm). The result is shown in FIG. 60.

From FIG. 60, it can be seen that the conversion efficiency is greatly reduced since the absolute value of ΔN is increased due to the manufacturing error. Specifically, the conversion efficiency is approximately −5.16 dB or more at the wavelength of 1580 nm, and is approximately −7.32 dB or more in the range of 1520 nm to 1640 nm. From this, it can be said that the asymmetric directional coupler is susceptible to manufacturing errors.

Thus, the optical waveguide element including the asymmetric directional coupler in the related art has a problem that the wavelength band in mode conversion is narrow and the optical waveguide element including the asymmetric directional coupler in the related art is susceptible to manufacturing error.

The invention has been made in view of the aforementioned problem, and it is an object of the invention to provide a planar optical waveguide element that can ensure high conversion efficiency in a wide wavelength band and can ensure the efficiency of mode conversion even if the waveguide structure changes due to a manufacturing error.

SUMMARY OF THE INVENTION

According to a first aspect of the invention, a planar optical waveguide element includes a substrate; and an optical waveguide including a core and a cladding the core being provided on the substrate so as to include first and second core regions arranged in parallel, the cladding having a smaller refractive index than the core. The core forms a preceding-stage mode conversion portion that converts a mode of input light and a subsequent-stage mode conversion portion that is configured to convert a mode of light output from the preceding-stage mode conversion portion, sectional shapes of the first and second core regions are not congruent at an input end of the preceding-stage mode conversion portion, and a shape or size of a section of at least one of the first and second core regions is continuously changed along a light waveguide direction such that the sectional shapes of the first and second core regions are congruent at an output end of the preceding-stage mode conversion portion, and the first and second core regions are spaced apart from each other at an input end of the subsequent-stage mode conversion portion, and a gap between the first and second core regions is continuously decreased along the light waveguide direction such that the first and second core regions are in contact with each other at an output end of the subsequent-stage mode conversion portion.

In the planar optical waveguide element, in each of the first and second core regions, a section perpendicular to the light waveguide direction may be a rectangular shape.

In the planar optical waveguide element, in the preceding-stage mode conversion portion, heights of the first and second core regions may be the same, and a width of one of the first and second core regions having a larger section at the input end may be continuously decreased along the light waveguide direction such that shapes of sections of the first and second core regions are congruent at the output end.

In the planar optical waveguide element, in the subsequent-stage mode conversion portion, a sectional shape of each of the first and second core regions may be fixed over an entire length, and sectional shapes of the first and second core regions at the input end of the subsequent-stage mode conversion portion may be the same as the sectional shapes of the first and second core regions at the output end of the preceding-stage mode conversion portion.

In the planar optical waveguide element, the core may include a slab portion that extends in a width direction of the first and second core regions, and the slab portion may have a smaller height than the first and second core regions, be disposed at least between the first and second core regions, and be formed so as to connect the first and second core regions to each other.

In the planar optical waveguide element, the slab portion may have an outwardly extending region that is formed so as to extend outwardly in the width direction from the first and second core regions.

In the planar optical waveguide element, the preceding-stage mode conversion portion may be configured to convert $TE_0$ into an odd mode of a super mode of $TE_0$, and the subsequent-stage mode conversion portion may be configured to convert the odd mode of the super mode into $TE_1$.

In the planar optical waveguide element, the core may include a curved waveguide that is formed on an input side of the preceding-stage mode conversion portion so as to be curved in plan view of at least one of the first and second core regions, and in the curved waveguide, the first and second core regions may become closer to each other as a distance from the preceding-stage mode conversion portion becomes shorter.

The planar optical waveguide element may further include an intermediate core region that is provided between the preceding-stage mode conversion portion and the subsequent-stage mode conversion portion so as to connect the preceding-stage mode conversion portion and the subsequent-stage mode conversion portion to each other.

In the planar optical waveguide element, the core may be formed of Si, and the cladding may be formed of $SiO_2$.

The planar optical waveguide element may further include a high-order polarization conversion portion that is connected to an output side of the subsequent-stage mode conversion portion and that is configured to convert $TE_1$ obtained by the subsequent-stage mode conversion portion into $TM_0$.

According to a second aspect of the invention, there is provided a dual polarization quadrature phase shift keying modulator including the planar optical waveguide element.

According to a third aspect of the invention, there is provided a coherent receiver including the planar optical waveguide element.

According to a fourth aspect of the invention, there is provided a polarization diversity including the planar optical waveguide element.

The planar optical waveguide element according to the aspects of the invention has a configuration in which a preceding-stage mode conversion portion (super mode generating element) and a subsequent-stage mode conversion portion (Y branch) are combined.

In the super mode generating element having a structure (for example, a tapered waveguide) in which the waveguide structure is changed in the light waveguide direction, the input $TE_0$ is converted into an odd mode of the super mode of $TE_0$. In the Y branch, the odd mode of the super mode of the $TE_0$ is converted into $TE_1$.

In the super mode generating element, the shapes and sizes of the sections of two core regions at the output end are the same (congruent). Accordingly, the super mode generating element is less susceptible to the influence of a manufacturing error, and the wavelength dependence is low. Being less susceptible to the influence of a manufacturing error and the low wavelength dependence are also the same for the Y branch.

Therefore, it is possible to realize high-efficiency conversion over the wide wavelength band and to ensure the efficiency of mode conversion even when the waveguide structure is changed due to a manufacturing error.

BRIEF DESCRIPTION OF THE DRAWINGS

FIG. 4A is a plan view showing the structure of a preceding-stage mode conversion portion.

FIG. 4B is a sectional view at the sectional position (c) that shows the structure of the preceding-stage mode conversion portion.

FIG. 4C is a sectional view at the sectional position (b) that shows the structure of the preceding-stage mode conversion portion.

FIG. 4D is a sectional view at the sectional position (a) that shows the structure of the preceding-stage mode conversion portion.

FIG. 8A is a plan view showing the structure of a subsequent-stage mode conversion portion.

FIG. 8B is a diagram showing the structure of the subsequent-stage mode conversion portion, and is a sectional view at the sectional position (e).

FIG. 8C is a diagram showing the structure of the subsequent-stage mode conversion portion, and is a sectional view at the sectional position (d).

FIG. 8D is a diagram showing the structure of the subsequent-stage mode conversion portion, and is a sectional view at the sectional position (c).

FIG. 10A is a simulation result of the electric field distribution ($E_X$ component) of the mode #0 at the sectional position (c) in FIG. 8A.

FIG. 10B is a simulation result of the electric field distribution ($E_X$ component) of the mode #1 at the sectional position (c) in FIG. 8A.

FIG. 10C is a simulation result of the electric field distribution ($E_X$ component) of the mode #0 at the sectional position (d) in FIG. 8A.

FIG. 10D is a simulation result of the electric field distribution ($E_X$ component) of the mode #1 at the sectional position (d) in FIG. 8A.

FIG. 10E is a simulation result of the electric field distribution ($E_X$ component) of the mode #0 at the sectional position (e) in FIG. 8A.

FIG. 10F is a simulation result of the electric field distribution ($E_X$ component) of the mode #1 at the sectional position (e) in FIG. 8A.

FIG. 28A is a plan view showing the structure of a preceding-stage mode conversion portion.

FIG. 28B is a sectional view at the sectional position (c) that shows the structure of the preceding-stage mode conversion portion.

FIG. 28C is a sectional view at the sectional position (b) that shows the structure of the preceding-stage mode conversion portion.

FIG. 28D is a sectional view at the sectional position (a) that shows the structure of the preceding-stage mode conversion portion.

FIG. 32A is a plan view showing the structure of a subsequent-stage mode conversion portion.

FIG. 32B is a sectional view at the sectional position (e) that shows the structure of the subsequent-stage mode conversion portion.

FIG. 32C is a sectional view at the sectional position (d) that shows the structure of the subsequent-stage mode conversion portion.

FIG. 32D is a sectional view at the sectional position (c) that shows the structure of the subsequent-stage mode conversion portion.

FIG. 34A is a simulation result of the electric field distribution ($E_X$ component) of the mode #0 at the sectional position (c) in FIG. 32A.

FIG. 34B is a simulation result of the electric field distribution ($E_X$ component) of the mode #1 at the sectional position (c) in FIG. 32A.

FIG. 34C is a simulation result is the electric field distribution ($E_X$ component) of the mode #0 at the sectional position (d) in FIG. 32A.

FIG. 34D is a simulation result of the electric field distribution ($E_X$ component) of the mode #1 at the sectional position (d) in FIG. 32A.

FIG. 34E is a simulation result of the electric field distribution ($E_X$ component) of the mode #0 at the sectional position (e) in FIG. 32A.

FIG. 34F is a simulation result of the electric field distribution ($E_X$ component) of the mode #1 at the sectional position (e) in FIG. 32A.

FIG. 45A shows an example of the tapered waveguide, and is a sectional view of one end.

FIG. 45B is a plan view showing an example of the tapered waveguide.

FIG. 45C shows an example of the tapered waveguide, and is a sectional view of the other end.

FIG. 46A shows another example of the tapered waveguide, and is a sectional view of one end.

FIG. 46B is a plan view showing another example of the tapered waveguide.

FIG. 46C shows another example of the tapered waveguide, and is a sectional view of the other end.

FIG. 51A is an overall plan view showing another example of the planar optical waveguide element (polarization conversion element) using a high-order polarization conversion element.

FIG. 51B shows another example of the planar optical waveguide element (polarization conversion element) using a high-order polarization conversion element, and is a plan view of a high-order polarization conversion element.

FIG. 51C shows another example of the planar optical waveguide element (polarization conversion element) using a high-order polarization conversion element, and is a sectional view of an end portion of a high-order polarization conversion element.

FIG. 51D shows another example of the planar optical waveguide element (polarization conversion element) using a high-order polarization conversion element, and is a sectional view of a start portion of a high-order polarization conversion element.

DETAILED DESCRIPTION OF THE INVENTION

<Overview of the Present Embodiment>

A planar optical waveguide element according to the embodiment of the invention has a configuration in which a preceding-stage mode conversion portion (super mode generating element) and a subsequent-stage mode conversion portion (Y branch) are combined.

In the super mode generating element having a structure (for example, a tapered waveguide) in which the waveguide structure is changed in the light waveguide direction, the input $TE_0$ is converted into an odd mode of the super mode of $TE_0$. In the Y branch, the odd mode is converted into $TE_1$.

The super mode generating element converts the mode of $TE_0$ into the odd mode by changing the waveguide structure in the light waveguide direction, that is, using a so-called adiabatic change phenomenon. Therefore, if the waveguide (for example, a tapered waveguide) of the structure is made to be sufficiently long, it is possible to increase the efficiency of conversion into the odd mode. Also in the Y branch, if a waveguide (device length) is made to be sufficiently long, it is possible to increase the efficiency of conversion from the odd mode to $TE_1$.

In the super mode generating element, the shapes and sizes of the sections of two core regions at the output end are the same (congruent). Accordingly, the super mode generating element is less susceptible to the influence of manufacturing error, and the wavelength dependence is low. Being less susceptible to the influence of manufacturing error and the low wavelength dependence are also the same for the Y branch.

Therefore, in the present embodiment, it is possible to realize high-efficiency conversion over a wide wavelength band and to ensure the efficiency of mode conversion even when the waveguide structure is changed due to manufacturing error.

Hereinafter, the planar optical waveguide element according to the present embodiment will be described in detail.

First, a specific example of the planar optical waveguide element according to the present embodiment will be presented. Then, the principle of conversion of the $TE_0$ and the odd mode using the super mode generating element will be described with reference to the specific example. Thereafter, the principle of conversion of the odd mode and the $TE_1$ using the Y branch will be described, and then the effect of the invention will be described.

<Planar Optical Waveguide Element>

Figure 1A:
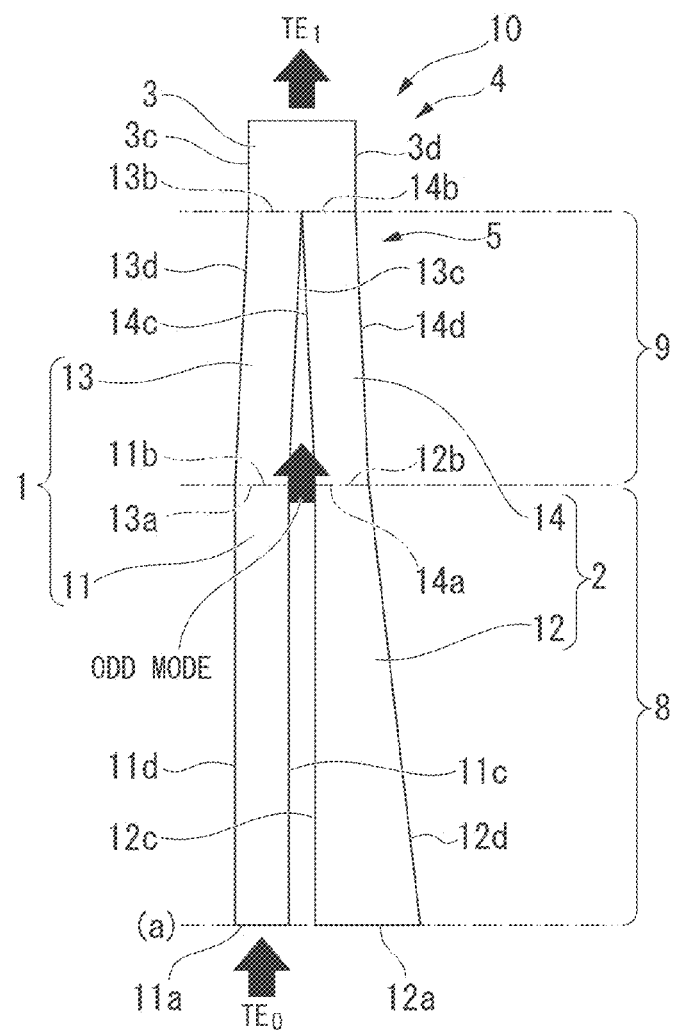
FIG. 1A is a plan view showing a planar optical waveguide element according to a first embodiment of the invention.

The structure of a planar optical waveguide element 10 according to a first embodiment of the invention will be described with reference to FIGS. 1A and 1B. FIG. 1A is a plan view showing the planar optical waveguide element 10, and FIG. 1B is a sectional view at the sectional position (a) in FIG. 1A and shows a section perpendicular to the light waveguide direction.

In this section, a length of the section in a direction in which core regions 1 and 2 face each other is referred to as a width, and a length of the section in a direction perpendicular to the width direction (direction perpendicular to a substrate S) is referred to as a height.

Figure 1B:
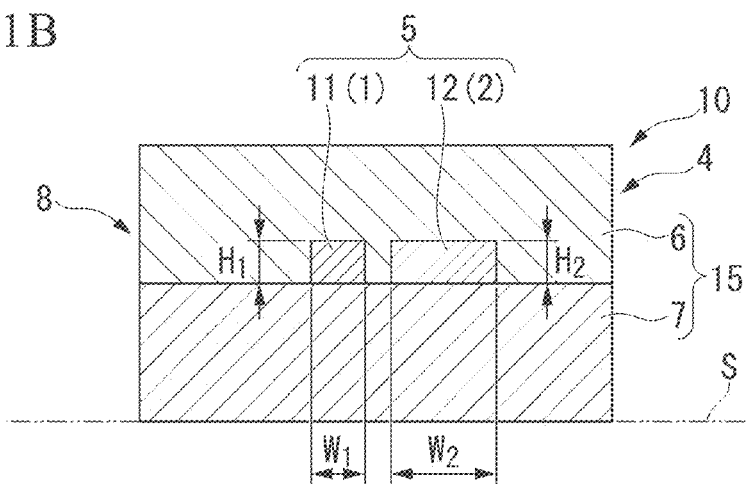
FIG. 1B is a sectional view at the sectional position (a) that shows the planar optical waveguide element according to the first embodiment of the invention.

As shown in FIGS. 1A and 1B, the planar optical waveguide element 10 (mode conversion element) includes an optical waveguide 4 that has a core 5 and a cladding 15. The optical waveguide 4 is formed on the substrate S.

The cladding 15 includes an upper cladding 6 and a lower cladding 7. The upper cladding 6 is provided on the core 5 and the lower cladding 7.

The cladding 15 is formed of a material having a lower refractive index than the core 5. The lower cladding 7 is formed of $SiO_2$, for example. The upper cladding 6 is formed of $SiO_2$ or an air layer, for example.

The core 5 includes a pair of core regions 1 and 2 arranged in parallel and an output portion 3 provided on the subsequent stage sides (output sides) of the core regions 1 and 2.

The core regions 1 and 2 and the output portion 3 are formed of a material having a higher refractive index than the cladding 15, preferably, Si (silicon).

The core regions 1 and 2 are formed as separate bodies except for output ends 13b and 14b of the subsequent-stage mode conversion portion 9.

Hereinafter, the core region 1 may be referred to as a first core region 1, and the core region 2 may be referred to as a second core region 2.

In addition, the invention is not limited to the silicon waveguide having a core formed of Si, and can also be applied to an optical waveguide using a core formed of $SiO_2$, for example, an optical waveguide such as a planar lightwave circuit (PLC).

As shown in FIG. 1B, the core regions 1 and 2 can be made to have rectangular sectional shapes. The sectional shapes of the core regions 1 and 2 are not limited thereto, and may be arbitrary shapes.

Preferably, heights $H_1$ and $H_2$ of the core regions 1 and 2 are equal. If the heights of the core regions 1 and 2 are equal, it is possible to minimize the number of etching times when forming the core.

As shown in FIG. 1A, the core 5 includes a preceding-stage mode conversion portion 8 (super mode generating element) for converting the mode of light propagating through the core regions 1 and 2 and the subsequent-stage mode conversion portion 9 (Y branch) for converting the mode of light transmitted through the preceding-stage mode conversion portion 8.

The planar optical waveguide element 10 can be manufactured by processing the SOI substrate. For example, an $SiO_2$ layer and an Si layer of the SOI substrate can be formed as a lower cladding and a core, respectively, by the lithography/etching process. After forming the core, it is possible to provide an $SiO_2$ layer as an upper cladding.

<Principle of the Super Mode Generating Element>

The basic principle of the super mode generating element will be described.

In the super mode generating element, $TE_0$ is converted into the odd mode of the super mode of the $TE_0$ by gradually mode-coupling the $TE_0$ of one of two adjacent waveguides to the $TE_0$ of the other waveguide.

Hereinafter, two waveguides in the super mode generating element are referred to as a waveguide 1 and a waveguide 2.

Of the two waveguides 1 and 2, a waveguide in which the width of a core region at the input end is smaller is assumed to be the waveguide 1, and a waveguide in which the width of a core region at the input end is larger is assumed to be the waveguide 2.

The waveguide referred to herein is a path through which the light is guided, and is formed by a core and a cladding.

In the preceding-stage mode conversion portion 8 of the planar optical waveguide element 10 shown in FIGS. 1A and 1B, the waveguide 1 is formed by a core region 11 and a cladding region that covers the core region. The waveguide 2 is formed by a core region 12 and a cladding region that covers the core region 12.

Mode coupling means that, for light propagating through a core region of one waveguide in a certain mode, a part of light leaking to the outside from the core region through which the light propagates moves to the other waveguide.

In order to perform the mode coupling efficiently, the effective refractive indices of the modes to be coupled in a waveguide need to be approximately the same. "Approximately the same" means that the difference between the effective refractive indices is smaller than "$\chi \times$ wavelength/$\pi$" using the coupling coefficient $\chi$ to be described later. "This condition is satisfied" is referred to as "phase matching". When the shapes and sizes of the cores are the same (congruent), the effective refractive index of light of the same mode propagating through the cores is the same. Therefore, phase matching is always realized. This is because the core shape is not changed even if the wavelength is changed. In addition, even if the manufacturing error of the same amount occurs in two core regions, for example, even if the same variation (variation in the width or height) occurs in two core regions, phase matching is maintained since the relationship of congruence of the cores does not collapse.

Figure 2A:
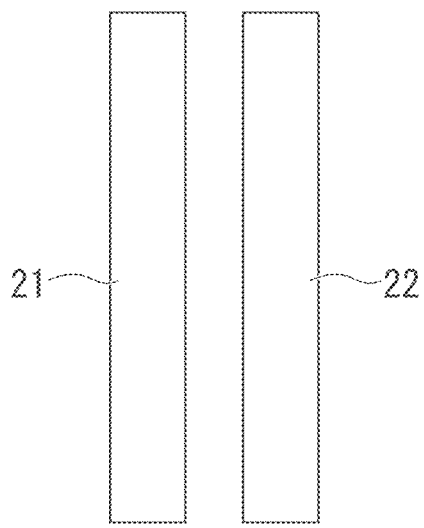
FIG. 2A is a plan view showing an example of the optical waveguide element.
Figure 2B:
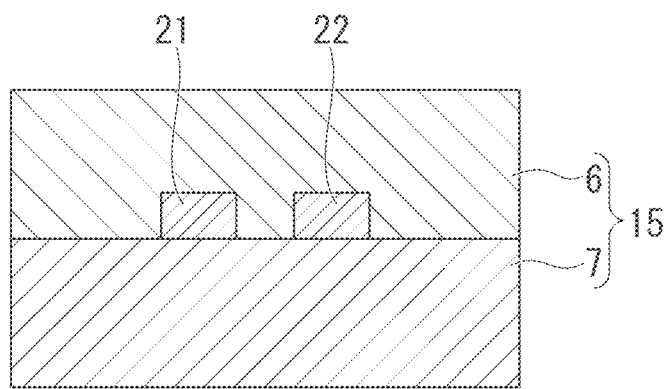
FIG. 2B is a sectional view showing an example of the optical waveguide element.

FIGS. 2A and 2B show an optical waveguide element including core regions 21 and 22 having the same width.

As shown in FIGS. 2A and 2B, when performing mode coupling of $TE_0$ between adjacent waveguides, if the heights of core regions are equal, the waveguide section structures become the same by making the widths of the core regions be the same. Accordingly, the conditions for phase matching are satisfied. This is always realized even if the wavelength is changed.

In addition, in a structure in which the widths of core regions are the same, phase matching is maintained even if the manufacturing error of the same amount occurs in two core regions, for example, even if the same variation in the width or height occurs in two core regions.

Figure 3C:
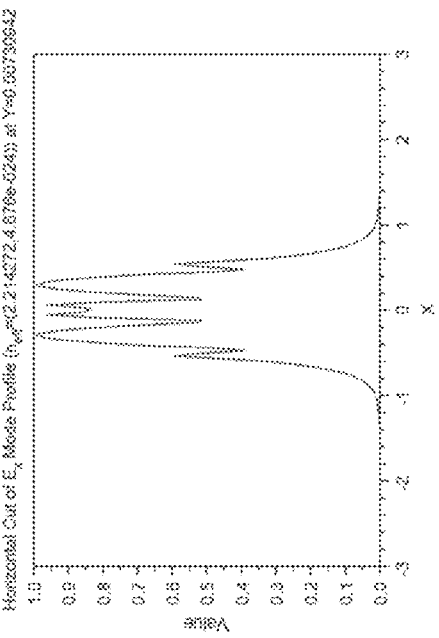
FIG. 3C is a graph of the electric field distribution ($E_X$ component) of an even mode in the optical waveguide element shown in FIGS. 2A and 2B.
Figure 3D:
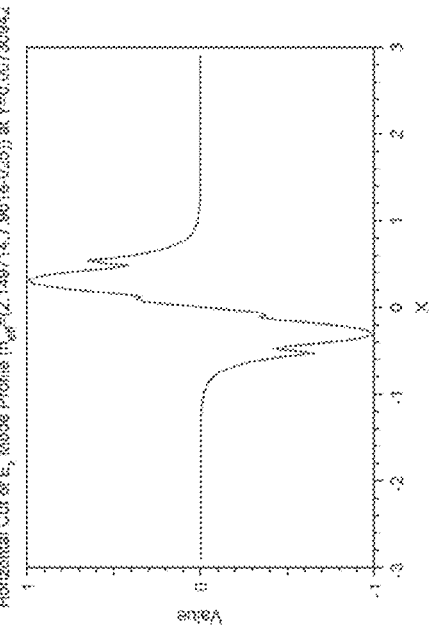
FIG. 3D is a graph of the electric field distribution ($E_X$ component) of an odd mode in the optical waveguide element shown in FIGS. 2A and 2B.
Figure 3A:
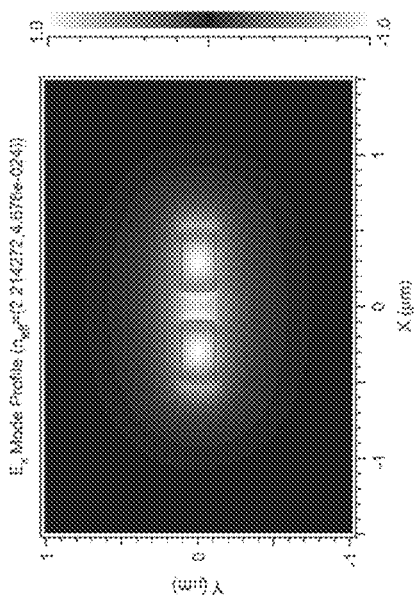
FIG. 3A is a simulation result of the electric field distribution ($E_X$ component) of an even mode in the optical waveguide element shown in FIGS. 2A and 2B.
Figure 3B:
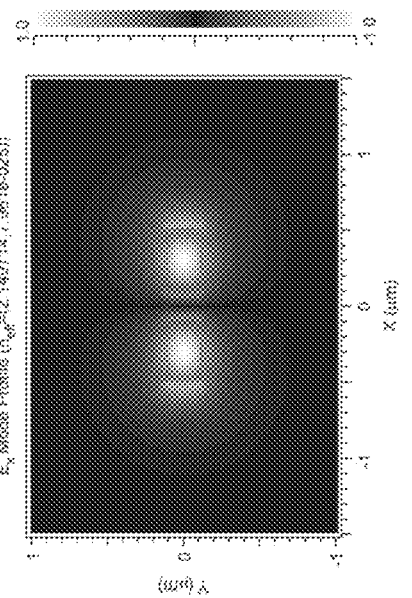
FIG. 3B is a simulation result of the electric field distribution ($E_X$ component) of an odd mode in the optical waveguide element shown in FIGS. 2A and 2B.

In this case, both $TE_0$ of adjacent waveguides are mode-coupled. Therefore, a mode guided through a section obtained by arranging the two core regions in parallel becomes a mode shown in FIGS. 3A and 3C, in which the $TE_0$ of the respective waveguides is coupled and the electric field components are symmetric in the width direction (called an even mode), and a mode shown in FIGS. 3B and 3D, in which the electric field components are anti-symmetric in the width direction (called an odd mode). These are collectively referred to as a super mode of $TE_0$ (or simply a super mode).

When the phase matching between the respective modes to be coupled in the adjacent waveguides is realized, the length of the waveguide that is required for the light leaking from one waveguide to move to the other waveguide to become a super mode depends on the coupling coefficient $\chi$ indicating the strength of mode coupling. $\chi$ is expressed by the following expression.

$$\chi \propto \int_{-\infty}^{\infty}\int_{-\infty}^{\infty}(N^2-N_1^2)E_1^* \cdot E_2 dxdy \text{ or } \int_{-\infty}^{\infty}\int_{-\infty}^{\infty}(N^2-N_2^2)E_1 \cdot E_2^* dxdy \quad (5)$$

Here, $E_i$ (i=1, 2) is electric field vectors of the modes to be coupled, which are guided through two adjacent waveguides i (i=1, 2). N is a refractive index profile when two waveguides are adjacent to each other. $N_i$ is a refractive index profile when the waveguide i is present alone. Coordinates x and y are a width dimension and a height dimension, respectively.

In the waveguide 1 or the waveguide 2, an inner product between the electric fields of both of the modes is integrated. Therefore, it can be seen that coupling becomes strong as the amount of light leaking to the outside from the core region increases. When the coupling coefficient $\chi$ is large, it is possible to generate a super mode at a short distance.

<Specific Example of the Super Mode Generating Element>

The preceding-stage mode conversion portion 8 that is a specific example of the super mode generating element will be described with reference to FIGS. 1A and 1B.

First, the structure of the preceding-stage mode conversion portion 8 will be described.

The core regions 1 and 2 of the range that forms the preceding-stage mode conversion portion 8 are referred to as the preceding-stage first core region 11 and the preceding-stage second core region 12, respectively.

Input ends 11a and 12a (preceding-stage input ends) of the core regions 11 and 12 are ends through which light is input to the core regions 11 and 12, and output ends 11b and 12b (preceding-stage output ends) are ends through which light is output from the core regions 11 and 12.

It is preferable that the preceding-stage first core region 11 extends in a straight line in plan view and the width and height are fixed in the longitudinal direction (light waveguide direction). Since the preceding-stage first core region 11 in the example shown in the diagrams has a width and a height that are fixed in the longitudinal direction, the sectional shape (shape of a section perpendicular to the light waveguide direction) is also fixed over the entire length.

An inner edge 11*c* (side edge on the core region 12 side of both side edges of the core region 11) and an outer edge 11*d* (side edge on the opposite side to the inner edge 11*c*) of the preceding-stage first core region 11 are formed in a straight line.

It is preferable that the sectional shapes of the core regions 11 and 12 are rectangles.

The waveguide structure of the preceding-stage second core region 12 is continuously changed from the input end 12*a* to the output end 12*b*.

In order to change the waveguide structure in the light waveguide direction, it is preferable to change the width of the core region along the light waveguide direction.

Since the width of the core region is relevant to confinement of light to the core region, it is possible to arbitrarily adjust the effective refractive index of the mode of light guided through the core region by changing the width of the core region.

As a method of changing the waveguide structure, there is also a method of changing the height of the core region. On the other hand, a method of changing the width of the core region in the longitudinal direction of the core region while maintaining the height of the core region constant is preferable since the core region can be formed in a single etching in the processing of the SOI substrate.

An inner edge 12*c* (side edge on the core region 11 side of both side edges of the core region 12) of the preceding-stage second core region 12 is a straight line parallel to the inner edge 11*c* of the preceding-stage first core region 11 in plan view.

On the other hand, an outer edge 12*d* (side edge on the opposite side of the inner edge 12*c*) of the preceding-stage second core region 12 is a straight line that is inclined so as to become closer to the inner edge 12*c* gradually from the input end 12*a* to the output end 12*b* in plan view.

Therefore, the preceding-stage second core region 12 is formed in a tapered shape having a width (width $W_2$ in FIG. 1B) that decreases gradually from the input end 12*a* to the output end 12*b*.

Since the width of the preceding-stage second core region 12 decreases gradually, the size of the section continuously decreases at a fixed rate from the input end 12*a* to the output end 12*b*.

In the present embodiment, at the input ends 11*a* and 12*a*, the width (width $W_2$ in FIG. 1B) of the second core region 12 is larger than the width (width $W_1$ in FIG. 1B) of the first core region 11. Accordingly, the section of the core region 12 is larger than the section of the core region 11 at the input ends 11*a* and 12*a*. That is, the sectional area of the core region 12 is larger than the sectional area of the core region 11 at the input ends 11*a* and 12*a*.

By the tapering of the second core region 12, the widths of the core regions 11 and 12 become equal at the output ends 11*b* and 12*b*. For this reason, at the output ends 11*b* and 12*b*, the shapes and sizes of the sections of the core regions 11 and 12 are the same.

The core regions 11 and 12 are spaced apart from each other. The gap between the core regions 11 and 12 can be made to be fixed from the input ends 11*a* and 12*a* to the output ends 11*b* and 12*b*.

In addition, the structures of the core regions 11 and 12 are not limited to the example shown in the diagrams as long as the sectional shapes of the core regions 11 and 12 are congruent at the output ends 11*b* and 12*b* due to the shape or size of the section of at least the core region that is continuously changed along the light waveguide direction even though the sectional shapes of the core regions 11 and 12 are not congruent at the input ends 11*a* and 12*a*.

For example, it is possible to adopt a structure in which the sectional shapes of two core regions become congruent at the output ends since the size of a core region having a smaller section at the input end increases continuously along the light waveguide direction.

"Changing continuously" means that there is no abrupt change in the structure of the core regions 11 and 12 and that the sections of the core regions 11 and 12 are changed to the extent that discontinuous uneven portions causing a stepped portion are not generated on the outer surfaces of the core regions.

Hereinafter, the preceding-stage mode conversion portion 8 will be described more specifically with reference to FIGS. 4A to 4D.

FIGS. 4A to 4D are diagrams showing the preceding-stage mode conversion portion 8. FIG. 4A is a plan view, FIG. 4B is a sectional view along the sectional position (c) in FIG. 4A, FIG. 4C is a sectional view along the sectional position (b) in FIG. 4A, and FIG. 4D is a sectional view along the sectional position (a) in FIG. 4A.

The waveguide 1 corresponds to a waveguide including the core region 1, and the waveguide 2 corresponds to a waveguide including the core region 2.

The core region 11 (core region 1) and the core region 12 (core region 2) are formed of Si (refractive index of 3.48 (wavelength of 1580 nm)), and the upper cladding 6 and the lower cladding 7 are formed of $SiO_2$ (refractive index of 1.44 (wavelength of 1580 nm)). The heights of the core regions 11 and 12 (core regions 1 and 2) are 220 nm. The gap between the core regions 11 and 12 (core regions 1 and 2) is 200 nm.

As shown in FIG. 4D, the width of the core region 11 (core region 1) is set to 400 [nm], and the width of the core region 12 (core region 2) is set to 400−X [nm] (−200≤X ≤0). X changes linearly from −200 to 0 in a range from the input end 12*a* to the output end 12*b*.

Therefore, the core region 12 (core region 2) has a tapered shape having a width that decreases gradually from the input end 12*a* (X=−200) to the output end 12*b* (X=0).

FIG. 4C shows a section at an intermediate position (X=−20) between the input ends 11*a* and 12*a* and the output ends 11*b* and 12*b*.

In the super mode generating element, based on the conditions for phase matching described above, the core shapes of the adjacent waveguides at the input ends are made so as to not be congruent. Accordingly, the conditions for phase matching are not satisfied. On the contrary, at the output ends, the conditions for phase matching are satisfied by making the core shapes of the adjacent waveguides congruent to each other.

In addition, phase matching is continuously realized from the input ends to the output ends by continuously changing the shapes or sizes of the core regions along the light waveguide direction (that is, by tapering the core regions).

In the example shown in FIGS. 4A to 4D, at the input ends 11a and 12a, the width (width $W_{12a}$ in FIG. 4D) of the core region 12 (core region 2) is larger than the width (width $W_{11a}$ in FIG. 4D) of the core region 11 (core region 1). Accordingly, the section of the core region 12 is larger than the section of the core region 11 at the input ends a and 12a. For this reason, since phase matching is not realized, mode coupling is hardly performed.

On the other hand, at the output ends 11b and 12b, the widths (widths $W_{11b}$ and $W_{12b}$ in FIG. 4B) of the core regions 11 and 12 (core regions 1 and 2) are the same. Accordingly, the shapes and sizes of the sections of the core regions 11 and 12 are the same at the output ends 11b and 12b. For this reason, phase matching is realized.

Since the core region 12 is formed in a tapered shape, phase matching is realized gradually along the light waveguide direction from the input end to the output end. As a result, mode coupling proceeds. Therefore, by making the length (taper length) of the tapered waveguide (core region 12) sufficiently large, the $TE_0$ input to the waveguide 1 can be converted into the odd mode of the super mode of $TE_0$ with little loss.

As described above, the length of the waveguide that is required for the light leaking from one waveguide to move to the other waveguide to become a super mode depends on the coupling coefficient $\chi$. Therefore, as the coupling coefficient $\chi$ increases, high-efficiency mode conversion can be realized in a short waveguide (short device length).

The method of adjusting the effective refractive index by changing the width of the waveguide uses the following phenomenon. That is, as the size of the waveguide increases, the degree of confinement of light to the core region increases. Then, since the influence of the refractive index of the core region becomes strong, the effective refractive index increases.

This principle will be described in more detail with reference to the above specific example.

Figure 5:
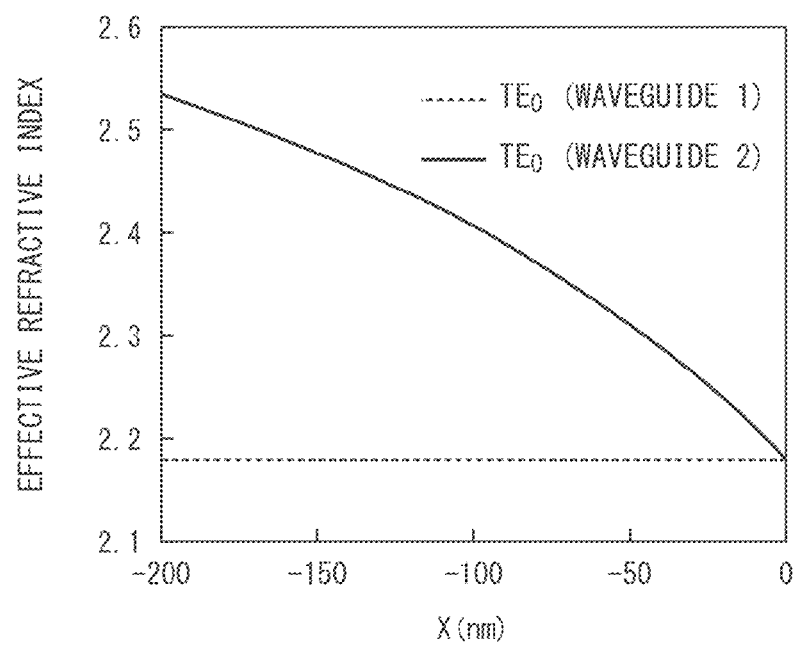
FIG. 5 is a diagram showing an effective refractive index when two waveguides are present independently.

In order to confirm that the conditions for phase matching at the input end cannot be satisfied by changing the width of the core region in the light waveguide direction (that is, by tapering the waveguide), the effective refractive index of each mode when the waveguides 1 and 2 were present independently was calculated. The result is shown in FIG. 5. The wavelength is 1580 nm (the same hereinbelow).

FIG. 5 shows that the effective refractive index of the $TE_0$ of the waveguide 1 and the effective refractive index of the $TE_0$ of the waveguide 2 match each other to realize phase matching at X=0.

As X moves away from 0, the effective refractive index of the $TE_0$ of the waveguide 1 and the effective refractive index of the $TE_0$ of the waveguide 2 are shifted, and the conditions for phase matching are not satisfied.

The reason why the effective refractive index of the $TE_0$ of the waveguide 1 is smaller than the effective refractive index of the $TE_0$ of the waveguide 2 in 200≤X<0 is that the width of the core region in the waveguide 1 is smaller than that in the waveguide 2.

Figure 6:
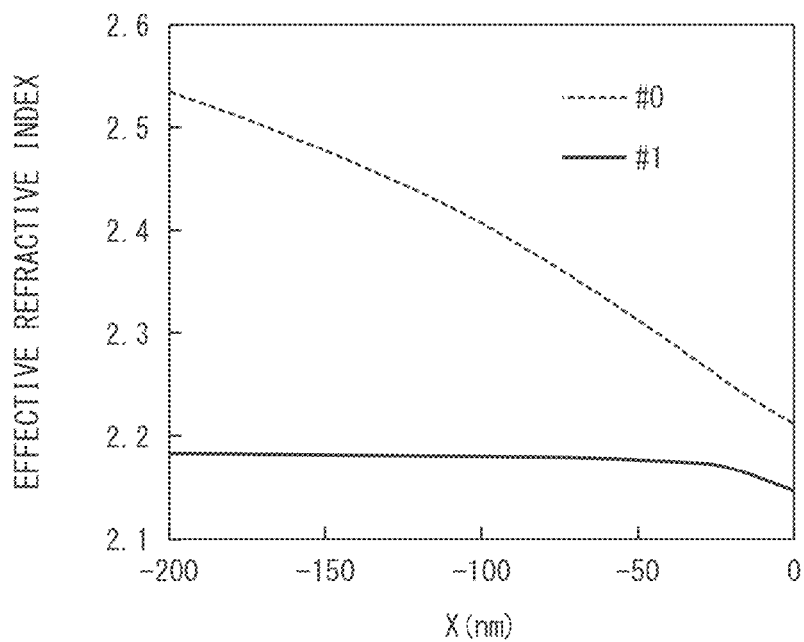
FIG. 6 is a diagram showing the effective refractive index when two waveguides are made to be adjacent to each other.

Next, FIG. 6 shows the effective refractive indices of the modes when the waveguides 1 and 2 are made to be adjacent to each other.

0 and #1 indicate effective refractive indices of modes, which have the first and second effective refractive indices, of modes on the sections of two waveguides.

Compared with FIG. 5 showing the effective refractive indices when the waveguides are present independently, #0 and #1 are not the same and are separated from each other at X=0 in FIG. 6.

This is because the conditions for phase matching between the $TE_0$ of the waveguide 1 and the $TE_0$ of the waveguide 2 are satisfied and the two modes interact with each other due to mode coupling to form a mixed mode (super mode).

If the distance from X=0 increases, the conditions for phase matching are not satisfied. In this case, such interaction does not occur, and the same mode profile as when the waveguides are present independently is obtained. As a result, the effective refractive index is not greatly changed compared with the case in which the waveguides are present independently. At X=0, the mode #0 becomes an even mode, and #1 becomes an odd mode.

In a structure in which the structure of the waveguide is changed gradually in the light waveguide direction, such as a tapered waveguide, it is known that a mode is converted so as to remain on one effective refractive index curve (referred to as adiabatic change).

Therefore, in FIG. 6, the $TE_0$ can be converted into the odd mode at X=0 by inputting the $TE_0$ to the waveguide 1 at X=−200 (input end) and changing X gradually from −200 to 0 in the longitudinal direction of the waveguide.

In order to confirm this, FIGS. 7A to 7F show the electric field distribution of each of the modes #0 and #1 at the sectional positions (a) to (c) (refer to FIG. 4A).

Figure 7A:
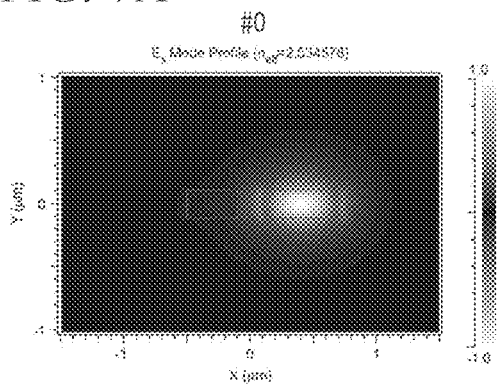
FIG. 7A is a simulation result of the electric field distribution ($E_X$ component) of the mode #0 at the sectional position (a) in FIG. 4A.
Figure 7B:
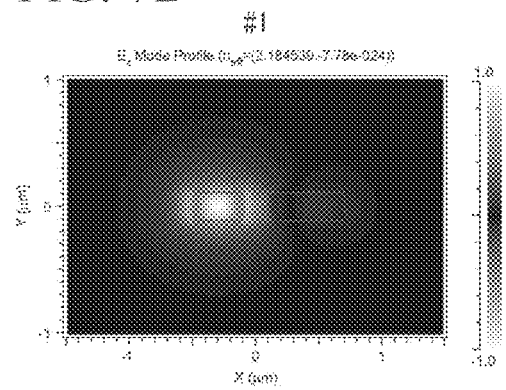
FIG. 7B is a simulation result of the electric field distribution ($E_X$ component) of the mode #1 at the sectional position (a) in FIG. 4A.
Figure 7C:
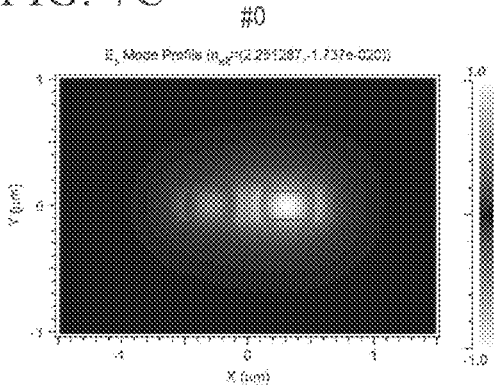
FIG. 7C is a simulation result of the electric field distribution ($E_X$ component) of the mode #0 at the sectional position (b) in FIG. 4A.
Figure 7D:
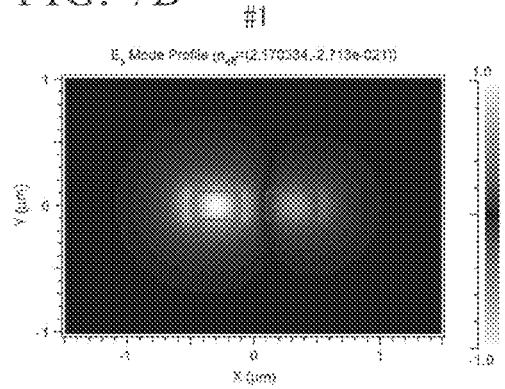
FIG. 7D is a simulation result of the electric field distribution ($E_X$ component) of the mode #1 at the sectional position (b) in FIG. 4A.
Figure 7E:
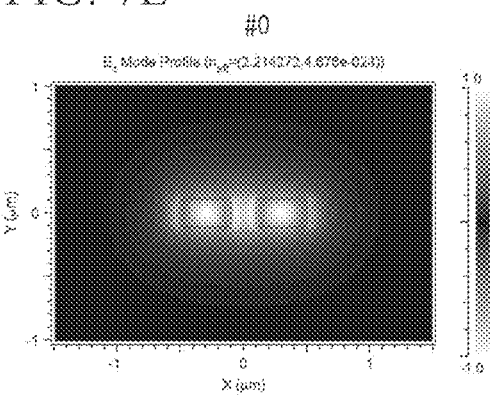
FIG. 7E is a simulation result of the electric field distribution ($E_X$ component) of the mode #0 at the sectional position (c) in FIG. 4A.
Figure 7F:
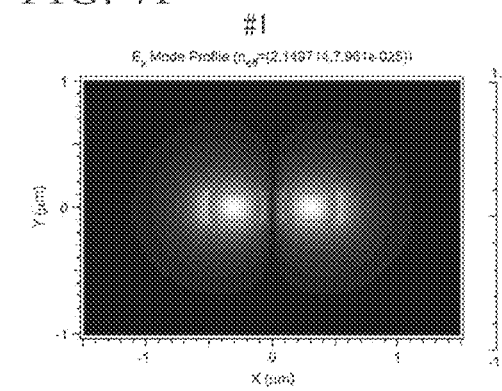
FIG. 7F is a simulation result of the electric field distribution ($E_X$ component) of the mode #1 at the sectional position (c) in FIG. 4A.

FIGS. 7A and 7B are simulation results showing the electric field distribution ($E_X$ component) at the sectional position (a) (FIG. 7A shows the mode #0, and FIG. 7B shows the mode #1). FIGS. 7C and 7D are simulation results showing the electric field distribution ($E_X$ component) at the sectional position (b) (FIG. 7C shows the mode #0, and FIG. 7D shows the mode #1). FIGS. 7E and 7F are simulation results showing the electric field distribution ($E_X$ component) at the sectional position (c) (FIG. 7E shows the mode #0, and FIG. 7F shows the mode #1).

x and y indicate a width direction and a height direction, respectively. The electric field distributions shown in FIGS. 7E and 7F are the same as those shown in FIGS. 3A and 3B.

Looking at the mode #1, at the sectional position (a) (X=−200) shown in FIG. 7B, $TE_0$ is present in the waveguide 1.

At the sectional position (b) (X=−20) shown in FIG. 7D, it can be seen that the mode has started to be coupled to the $TE_0$ of the waveguide 2.

At the sectional position (c) (X=0) shown in FIG. 7F, since the conditions for phase matching are satisfied, an odd mode of the super mode in which the $TE_0$ of the waveguide 1 and the $TE_0$ of the waveguide 2 are mixed is seen.

Thus, it can be seen that the $TE_0$ input to the waveguide 1 can be changed to the odd mode of the super mode of the $TE_0$ by changing the waveguide structure gradually in the light waveguide direction.

The above is the principle of the super mode generating element.

In the example shown in the diagrams, the preceding-stage second core region 12 is formed in a tapered shape over the entire length since the width decreases continuously from the input end 12a to the output end 12b. However, the shape of the preceding-stage second core region 12 is not limited thereto, and only a part in the longitudinal direction may be formed in a tapered shape.

In FIGS. 4A to 4D, the gap between waveguides (gap between the core regions 11 and 12) of the super mode generating element (preceding-stage mode conversion portion) is fixed. However, the gap between waveguides (gap between the core regions 11 and 12) of the super mode generating element (preceding-stage mode conversion portion) may be changed in the longitudinal direction of the waveguide without being limited to the above.

As long as the conditions that the sizes of the sections of two adjacent core regions are the same at the output ends and the effective refractive index of the $TE_0$ of the first core region is smaller than the effective refractive index of the $TE_0$ of the second core region in the other range are satisfied, only one of the core regions may be tapered, or both of the two core regions may be tapered.

For example, the first core region 11 may be formed in a tapered shape having a width that decreases continuously from the input end 11a to the output end 11b, similar to the second core region 12.

Although the core region 2 is a tapered waveguide having a width that changes linearly in the longitudinal direction in the specific example described above, the tapered waveguide may be a curved tapered waveguide instead of the linearly tapered waveguide.

As a method of changing the waveguide structure, there is also a method of changing the height of the core region along the light waveguide direction instead of changing the width of the core region. By changing the height of the core region, it is possible to arbitrarily adjust the effective refractive index of the mode of light guided through the core region.

In addition, although the input end and the output end of each core region are formed perpendicular to the light waveguide direction in the specific example described above, the input end and the output end of each core region may be inclined with respect to the vertical direction.

<Principle of the Y Branch>

Next, the principle of converting the odd mode into the $TE_1$ using the Y branch will be described.

Y branch (Y branch element) is a device that is generally used for the multiplexing and demultiplexing of light. For example, an exemplary example of the structure is a structure in which a pair of branch portions are provided and one end of each of the two branch portions is connected to an output portion. The two branch portions are formed so as to become closer to each other as the distance from the output portion becomes shorter.

The operation when inputting the $TE_0$ to the other end (input end) of each branch portion of the Y branch is as follows.

As described above, the input $TE_0$ is expressed as a superposition of the even mode and the odd mode that are super modes and have the same power ratio.

Since the two adjacent waveguides (branch portions) are brought closer to each other gradually, the input $TE_0$ is output after the even mode is converted into the $TE_0$, and is output after the odd mode is converted into the $TE_1$.

Therefore, when the $TE_0$ is input from only one of the two branch portions, the power of $TE_0$ and $TE_1$ obtained in the output portion is halved.

In principle, however, the $TE_1$ can be obtained with the conversion efficiency of 100% by inputting only the odd mode to the branch portion.

In the invention, focusing on this point, it is possible to convert the $TE_0$ into $TE_1$ as a whole by connecting the above-described super mode generating element to the front of the Y branch.

Hereinafter, the principle regarding how the odd mode is converted into the $TE_1$ by the Y branch will be described by way of a specific example.

<Specific Example of the Y Branch>

The subsequent-stage mode conversion portion 9 that is a specific example of the Y branch will be described with reference to FIGS. 1A and 1B.

The subsequent-stage mode conversion portion 9 is formed continuously to the output side of the preceding-stage mode conversion portion 8. The core regions 1 and 2 of the range that forms the subsequent-stage mode conversion portion 9 are referred to as a subsequent-stage first core region 13 and a subsequent-stage second core region 14, respectively.

Input ends 13a and 14a (subsequent-stage input ends) of the core regions 13 and 14 are ends through which light is input to the core regions 13 and 14, and output ends 13b and 14b (subsequent-stage output ends) are ends through which light is output from the core regions 13 and 14.

Since the subsequent-stage mode conversion portion 9 is formed continuously to the output side of the preceding-stage mode conversion portion 8, the input end 13a is at the same position as the output end 11b, and the input end 14a is at the same position as the output end 12b.

It is preferable that the subsequent-stage first core region 13 extends in a straight line and the width and height are fixed in the longitudinal direction (light waveguide direction). It is preferable that the width of the subsequent-stage first core region 13 is the same as the width of the preceding-stage first core region 11.

An inner edge 13c (side edge on the core region 14 side of both side edges of the core region 13) and an outer edge 13d (side edge on the opposite side to the inner edge 13c) of the subsequent-stage first core region 13 are formed in a straight line.

It is preferable that the subsequent-stage second core region 14 extends in a straight line and the width and height are fixed in the longitudinal direction (light waveguide direction). It is preferable that the width of the subsequent-stage second core region 14 is the same as the width of the preceding-stage second core region 12 at the output end 12b.

An inner edge 14c (side edge on the core region 13 side of both side edges of the core region 14) and an outer edge 14d (side edge on the opposite side to the inner edge 14c) of the subsequent-stage second core region 14 are formed in a straight line in plan view.

It is preferable that the core regions 13 and 14 have the same width. It is preferable that the sectional shapes of the core regions 13 and 14 at the input ends 13a and 14a are the same as the sectional shapes of the core regions 11 and 12 at the output ends 11b and 12b.

Although the core regions 13 and 14 in the example shown in the diagrams have rectangular sectional shapes, the sectional shapes of the core regions 13 and 14 are not limited thereto.

The core regions 13 and 14 are formed to be inclined so as to become closer to each other from the input ends 13a and 14a to the output ends 13b and 14b.

For this reason, the core regions 13 and 14 are spaced apart from each other at the input ends 13a and 14a, but are in contact with each other at the output ends 13b and 14b since the gap decreases continuously as the distance from the output ends 13b and 14b decreases.

Since each of the core regions 13 and 14 in the example shown in the diagrams has a width and a height that are fixed in the longitudinal direction, the sectional shape (shape of a section perpendicular to the light waveguide direction) is also fixed over the entire length.

The output ends 13b and 14b of the core regions 13 and 14 are connected to the output portion 3.

The output portion 3 can be formed so as to have a rectangular sectional shape.

It is preferable that the output portion 3 extends in a straight line and the width and height are fixed in the longitudinal direction (light waveguide direction).

The width of the output portion 3 can be made to be the same as the sum of the widths of the core regions 13 and 14 at the output ends 13b and 14b.

One side edge 3c of the output portion 3 is formed continuously to the outer edge 13d of the subsequent-stage first core region 13, and the other side edge 3d is formed continuously to the outer edge 14d of the subsequent-stage second core region 14. Each of the side edges 3c and 3d of the output portion 3 is formed in a straight line (in plan view).

It is preferable that the height of the output portion 3 be equal to the height of the core regions 1 and 2.

Hereinafter, the subsequent-stage mode conversion portion 9 will be described more specifically with reference to FIGS. 8A to 8D.

FIGS. 8A to 8D are diagrams showing the subsequent-stage mode conversion portion 9. FIG. 8A is a plan view, FIG. 8B is a sectional view along the sectional position (e) in FIG. 8A, FIG. 8C is a sectional view along the sectional position (d) in FIG. 8A, and FIG. 8D is a sectional view along the sectional position (c) in FIG. 8A.

The core region 13 (core region 1) and the core region 14 (core region 2) are formed of Si (refractive index of 3.48 (wavelength of 1580 nm)), and the upper cladding 6 and the lower cladding 7 are formed of $SiO_2$ (refractive index of 1.44 (wavelength of 1580 nm)). The heights of the core regions 13 and 14 (core regions 1 and 2) are 220 nm.

As shown in FIG. 8D, the widths $W_{13}$ and $W_{14}$ of the core regions 13 and 14 (core regions 1 and 2) (branch portions) are set to 400 [nm].

The gap between the core regions 13 and 14 (core regions 1 and 2) is a gap [nm] (0≤gap≤200). The gap changes linearly from 200 nm to 0 nm in a range from the input ends 13a and 14a to the output ends 13b and 14b.

Therefore, the gap between the core regions 13 and 14 (core regions 1 and 2) decreases from the input ends 13a and 14a (gap=200) to the output ends 13b and 14b (gap=0).

FIG. 8C shows a section at an intermediate position (gap=100) between the input ends 13a and 14a and the output ends 13b and 14b.

Figure 9:
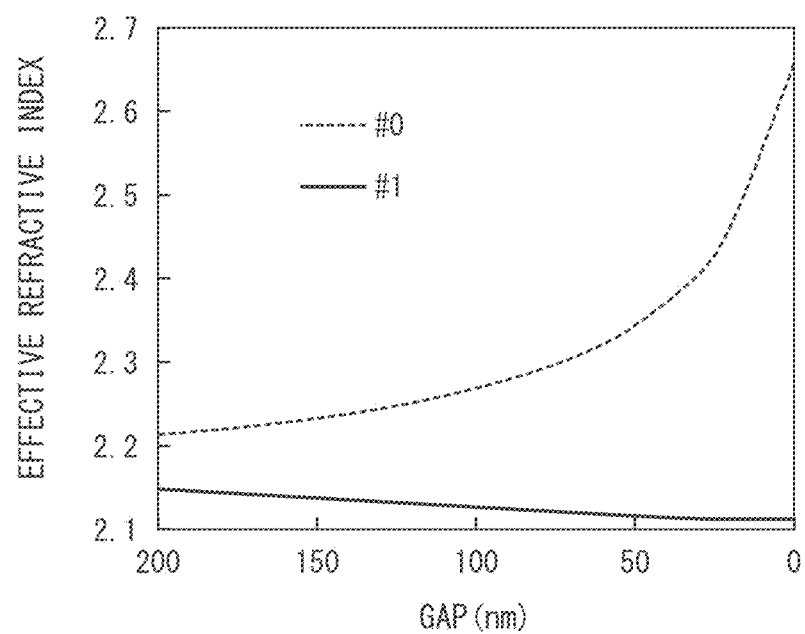
FIG. 9 is a graph showing the relationship between a gap between core regions and the effective refractive index.

FIG. 9 is a graph showing the relationship between the gap between core regions and the effective refractive index.

Modes #0 and #1 indicates first and second effective refractive indices. At the gap=200 nm (input end), the modes #0 and #1 match the mode at X=0 in FIG. 6.

At the gap=0 nm (output end), the mode #0 becomes $TE_0$, and the mode #1 becomes $TE_1$.

Therefore, the odd mode at the input end is converted into the $TE_1$ at the output end by forming the core regions closer to each other gradually.

In order to confirm this, FIGS. 10A to 10F show the electric field distribution of each of the modes #0 and #1 at the sectional positions (c) to (e) (refer to FIG. 8A).

FIGS. 10A and 10B are simulation results showing the electric field distribution ($E_X$ component) at the sectional position (c) in FIG. 8A (FIG. 10A shows the mode #0, and FIG. 10B shows the mode #1). FIGS. 10C and 10D are simulation results showing the electric field distribution ($E_X$ component) at the sectional position (d) (FIG. 10C shows the mode #0, and FIG. 10D shows the mode #1). FIGS. 10E and 10F are simulation results showing the electric field distribution ($E_X$ component) at the sectional position (e) (FIG. 10E shows the mode #0, and FIG. 10F shows the mode #1).

From FIGS. 10A to 10F, it can be confirmed that the odd mode is gradually converted into the $TE_1$ and the even mode is gradually converted into the $TE_0$.

Also in the Y branch (subsequent-stage mode conversion portion), the phenomenon of adiabatic change is used in the mode conversion described above.

That is, since the Y branch (subsequent-stage mode conversion portion) has a structure in which the gap between both of the core regions decreases continuously along the light waveguide direction and both of the core regions are in contact with each other at the output ends, mode conversion based on the adiabatic change can be realized without an increase or decrease in light energy.

In the example shown in the diagrams, since the width of the output portion 3 is the same as the sum of the width of the core regions 13 and 14 at the output ends 13b and 14b, the continuity in the longitudinal direction of the waveguide is maintained. Accordingly, an adiabatic change at the time of output from Y branch (preceding-stage mode conversion portion) to the output portion is not affected.

The $TE_0$ input to the super mode generating element is converted into the odd mode, and then the odd mode is input to the Y branch and is converted into the $TE_1$.

<Effects of the Present Embodiment>
[First Effect]

As a first effect, it can be mentioned that high-efficiency conversion can be realized over a wide wavelength band and the influence of manufacturing error is suppressed by applying the present embodiment. Hereinafter, the reason will be described.

In the asymmetric directional coupler of the related art, it has been necessary to maintain the conditions for phase matching in order to maintain a high conversion efficiency.

However, when a wavelength is changed or the waveguide structure is changed due to manufacturing error, the conditions are not satisfied, and the conversion efficiency is reduced.

In contrast, in the super mode generating element used in the present embodiment, the shapes and sizes of the sections of the core regions at the output end are the same. Therefore, even if the wavelength changed, the effective refractive indices are not shifted, and phase matching is maintained.

As a result, it is possible to ensure the high conversion efficiency in a wide wavelength band.

Typical manufacturing errors due to lithography/etching or the like occur by the same amount in two core regions locally. Accordingly, even if the width or height of the core region is changed due to the manufacturing error, phase matching is maintained. In addition, even if there is a variation in the height of the layer in the wafer (for example, an SOI substrate) to be used, there is no problem in maintaining the phase matching since the influence on the two core regions is the same.

Therefore, even if the waveguide structure is changed due to manufacturing error, it is possible to ensure the efficiency of mode conversion.

In the super mode generating element and the Y branch, the loss of energy can be sufficiently reduced by changing the waveguide structure gradually in the light waveguide direction (by the so-called adiabatic change).

Therefore, it is possible to realize mode conversion with low loss by sufficiently increasing the length (taper length) of a portion (for example, a tapered waveguide) in which the waveguide structure is changed.

$TE_1$ can be obtained by inputting the odd mode of $TE_0$ to the Y branch. In the present embodiment, however, in order to generate the odd mode, a new super mode generating element can be used by using a part of the principle of a tapered directional coupler (refer to Reference [1]) known in the related art.

Reference [1]: MICHAEL G. F. WILSON, et. al., "Tapered Optical Directional Coupler," IEEE TRANSACTIONS ON MICROWAVE THEORY AND TICCHNIQUES, VOL. MTT-23, NO. 1, JANUARY 1975

In the present embodiment, in spite of handling conversion into different modes, it is possible to use a symmetric waveguide structure in at least the emission end and the Y branch of the super mode generating element. In addition, it is possible to use the phenomenon of an adiabatic change in the entire process (the super mode generating element and the Y branch).

Therefore, it is possible to ensure the high conversion efficiency in a wide wavelength band, and it is possible to ensure the efficiency of mode conversion even when the waveguide structure is changed due to manufacturing error.

[Second Effect]

As a second effect, it can be mentioned that the mode multiplexing of $TE_0$ and $TE_1$ is possible.

In the present embodiment, when the $TE_0$ is input to the waveguide 2 of the super mode generating element, the same $TE_D$ is output from the Y branch.

This is because the $TE_0$ input to the waveguide 2 becomes an even mode in the super mode generating element and then becomes $TE_0$ at the Y branch and is output, in the effective refractive index curve shown in FIGS. 6 and 9 (refer to the mode #0 in FIGS. 7A, 7C, 7E, 10A, 10C, and 10E).

Therefore, it is possible to output the multiplexed light of $TE_0$ and $TE_1$ by inputting the $TE_0$ to each of the waveguides 1 and 2.

Here, "mode multiplexing" means that, by inputting light of a mode (mode B), which is different from a mode (mode A) caused by mode conversion from one waveguide to the other waveguide, to the other waveguide, the light of the mode A and the light of the mode B are simultaneously output from the other waveguide.

[Third Effect]

As a third effect, it can be mentioned that manufacturing using a single lithography/etching process is possible and the manufacturing is easy.

For example, the Si layer of the SOI substrate can be formed as the core 5 (the core regions 1 and 2 and the output portion 3) shown in FIGS. 1A and 1B and the like through the single lithography/etching process.

The height of the core or the like is not particularly limited, and any height satisfying the general conditions of the optical waveguide may be adopted. Therefore, it can also be mentioned as an advantage of the present embodiment that the integration with other optical waveguide elements is easy.

[Fourth Effect]

As a fourth effect, It can be mentioned that the influence of manufacturing error on the conversion efficiency is small.

That is, in the present embodiment, mode conversion is performed by using the phenomenon of a so-called adiabatic change. Therefore, even if manufacturing errors for the super mode generating element and the Y branch are different between waveguides, the influence on the conversion efficiency is smaller than the asymmetric directional coupler in the related art.

In the planar optical waveguide element according to the present embodiment, when the input and output directions are opposite to the directions described above, it is possible to perform the reverse operation to the operation described above. For example, in the planar optical waveguide element 10 shown in FIGS. 1A and 1B, when the $TE_1$ is input to the output portion 3, $TE_0$ is output from the input end 11a of the core region 11. On the other hand, when the $TE_0$ is input to the output portion 3, $TE_0$ is output from the input end 12a of the core region 12. Therefore, the planar optical waveguide element 10 can also be applied to a mode splitter.

Example 1

<Planar optical waveguide element>

Figure 11A:
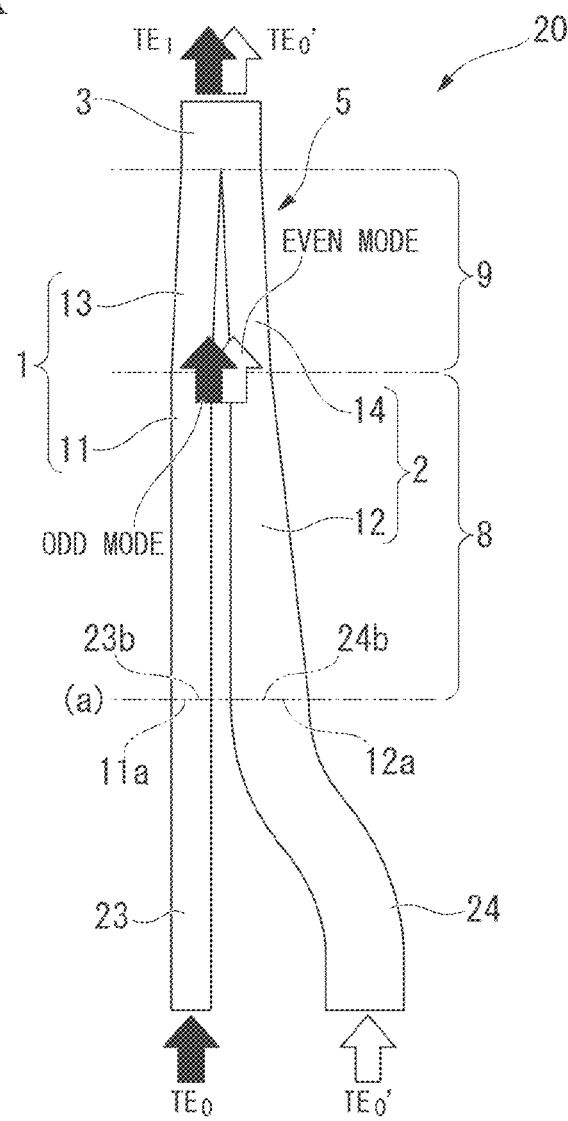
FIG. 11A is a plan view showing an example of a planar optical waveguide element including a curved waveguide.
Figure 11B:
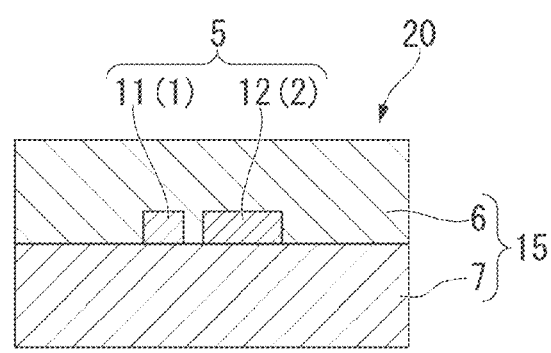
FIG. 11B shows an example of the planar optical waveguide element including a curved waveguide, and is a sectional view at the sectional position (a).

FIGS. 11A and 11B are diagrams showing a planar optical waveguide element 20 in example 1 of the invention. FIG. 11A is a plan view, and FIG. 11B is a sectional view at the sectional position (a) of FIG. 11A. The same components as in the planar optical waveguide element 10 shown in FIGS. 1A and 1B are denoted by the same reference numerals, and an explanation thereof will be omitted.

In the planar optical waveguide element 20, the first core region 1 includes a straight waveguide 23, and the second core region 2 includes a curved waveguide 24. The straight waveguide 23 is formed on the input side of the core region 11, and the curved waveguide 24 is formed on the input side of the core region 12.

The curved waveguide 24 is formed so as to be curved in plan view.

Accordingly, the core region 1 (straight waveguide 23) and the core region 2 (curved waveguide 24) become closer to each other as the distance from the preceding-stage mode conversion portion 8 becomes shorter in a length range including at least emission ends 23b and 24b.

The curved shape of the curved waveguide 24 can be a circular arc shape, for example. The shape of the curved waveguide 24 is not limited thereto, and may be an arbitrary curved shape. For example, it is possible to adopt a high-order curved shape (for example, a quadratic curve shape), such as an elliptical arc shape, a parabolic shape, and a hyperbolic shape. The curved waveguide 24 in the example shown in the diagrams has an S shape obtained by combining two approximate arcs.

In the planar optical waveguide element 20, on the input side of the preceding-stage mode conversion portion 8, the first core region 1 (straight waveguide 23) and the second core region 2 (curved waveguide 24) are formed so as to become closer to each other as the distance from the preceding-stage mode conversion portion 8 becomes shorter. Therefore, it is possible to limit the reflection of unnecessary light.

As described above, in the preceding-stage mode conversion portion 8, mode coupling on the input side is reduced by tapering the core region 12. However, the straight waveguide 23 and the curved waveguide 24 are spaced apart from each other as the distance from the preceding-stage mode conversion portion 8 increases. For this reason, it is possible to reduce the mode coupling more reliably than in the case of tapering. Therefore, it is possible to improve the mode conversion efficiency in the preceding-stage mode conversion portion 8.

This is because the effect of weakening the coupling is higher in the structure in which the core regions are spaced further apart from each other than in the tapered structure.

In the planar optical waveguide element 20, the core region 1 (core region 11) includes the straight waveguide 23, and the core region 2 (core region 12) that is wider than the core region 1 includes the curved waveguide 24. This is because the confinement of light is susceptible to the narrower core region 1 and the loss at the time of bending is increased.

Even if the straight waveguide 23 and the curved waveguide 24 are not present in the planar optical waveguide element 20, there is no problem in the function of the planar optical waveguide element. However, since there are advantages, such as the reduction of reflection or the reduction of mode coupling, as described above, it is preferable to adopt these (the straight waveguide 23 and the curved waveguide 24).

In the planar optical waveguide element 20 shown in FIG. 11A, only the core region 2 of the core regions 1 and 2 includes the curved waveguide 24. However, as long as the structure is adopted in which the core regions 1 and 2 become closer to each other as the distance from the preceding-stage mode conversion portion 8 becomes shorter, the position where the curved waveguide is formed is not limited to the example shown in the diagrams.

For example, a structure may be adopted in which the core region 2 includes a straight waveguide and the core region 1 includes a curved waveguide, or a structure may be adopted in which both of the core regions 1 and 2 include a curved waveguide.

The planar optical waveguide element 20 can be manufactured by processing the SOI substrate. An intermediate $SiO_2$ layer (refractive index: 1.44) of the SOI substrate is used as a lower cladding, and an Si layer (refractive index: 3.47) is used as a core. After forming the core, an $SiO_2$ layer is provided as an upper cladding.

In order to show that mode conversion is possible in this example, the conversion efficiency (ratio of the power of the output $TE_1$ to the power of the input $TE_0$) of the $TE_1$ that was output when the $TE_0$ was input to the core region 1 was calculated using the finite difference time domain method (FDTD).

The length of the Y branch (subsequent-stage mode conversion portion 9 in FIG. 11A) is 20 µm. The wavelength is 1580 nm. The calculation result is shown in FIG. 12.

Figure 12:
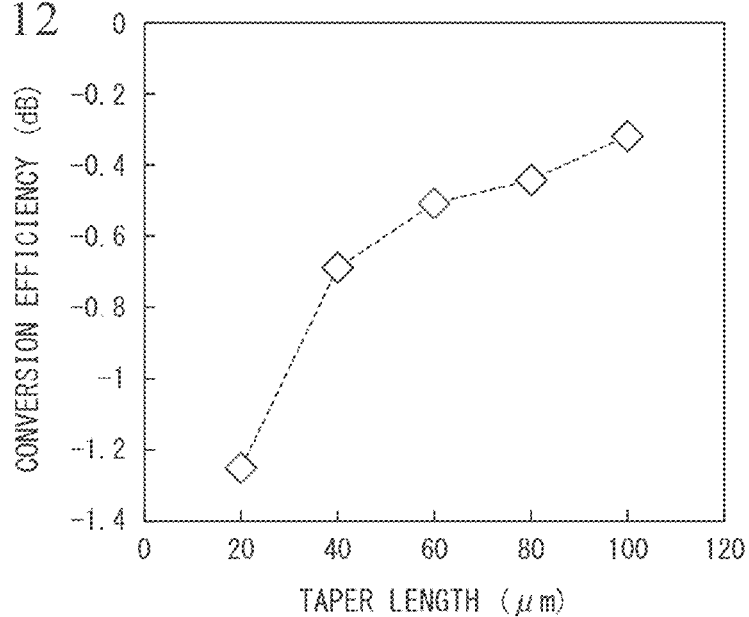
FIG. 12 is a graph showing the relationship between the taper length of a preceding-stage mode conversion portion and conversion efficiency.

FIG. 12 shows the relationship between the taper length of the super mode generating element (length of the tapered waveguide (core region 12)) and the conversion efficiency.

From FIG. 12, it can be seen that the conditions of adiabatic change are easily satisfied and the conversion efficiency is increased since a change in the width of the core region in the light waveguide direction becomes gentle as the taper length of the super mode generating element increases.

Figure 13:
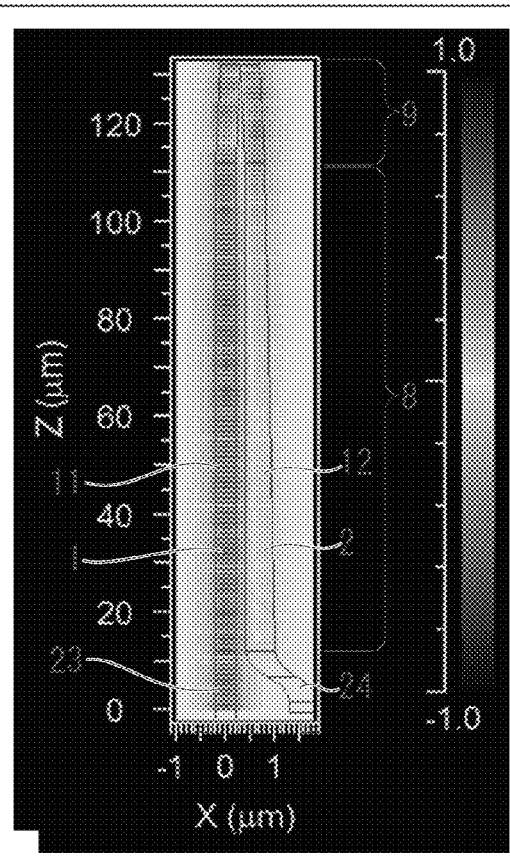
FIG. 13 is a diagram showing the simulation result that shows the electric field distribution ($E_X$ component).

FIG. 13 shows the electric field distribution when the taper length (length of the core region 12) of the super mode generating element (preceding-stage mode conversion portion 8) is 100 µm. FIG. 13 shows the $E_X$ component at y=0.1 µm when inputting the $TE_0$ to the core region 1 from the input end (lower end). The wavelength is 1580 nm.

From FIG. 13, it can be seen that optical coupling occurs in the super mode generating element and conversion into the odd mode in which the $TE_0$ is distributed in both of the core regions occurs at the output end. In addition, it can also be confirmed that the odd mode is converted into the $TE_1$ by the Y branch.

Figure 14:
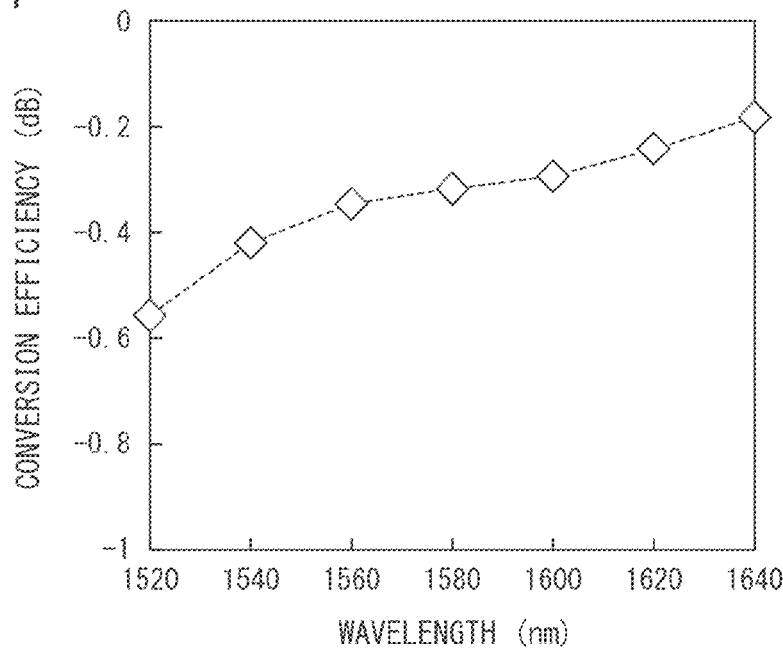
FIG. 14 is a graph showing the relationship between the wavelength of light and conversion efficiency.

FIG. 14 is a graph showing the result when simulating the wavelength dependence (relationship between the wavelength and conversion efficiency) in the present example using the FDTD. The taper length of the super mode generating element is 100 µm.

From FIG. 14, in the present example, it can be confirmed that the high conversion efficiency of −0.55 dB or more is obtained in the range of 1520 nm to 1640 nm.

In addition, the electric field distribution spreads to the outside of the core region as the waveguide increases, and coupling to the adjacent wavelength is increased. At the long wavelength, the conversion efficiency of the super mode generating element is increased. Therefore, the overall conversion efficiency is improved.

Next, in order to check the influence of manufacturing error in the present example, the relationship between the wavelength and the conversion efficiency when the widths of all core regions were changed by only −30 nm was simulated using the FDTD. The taper length of the super mode generating element is 100 µm.

Figure 15:
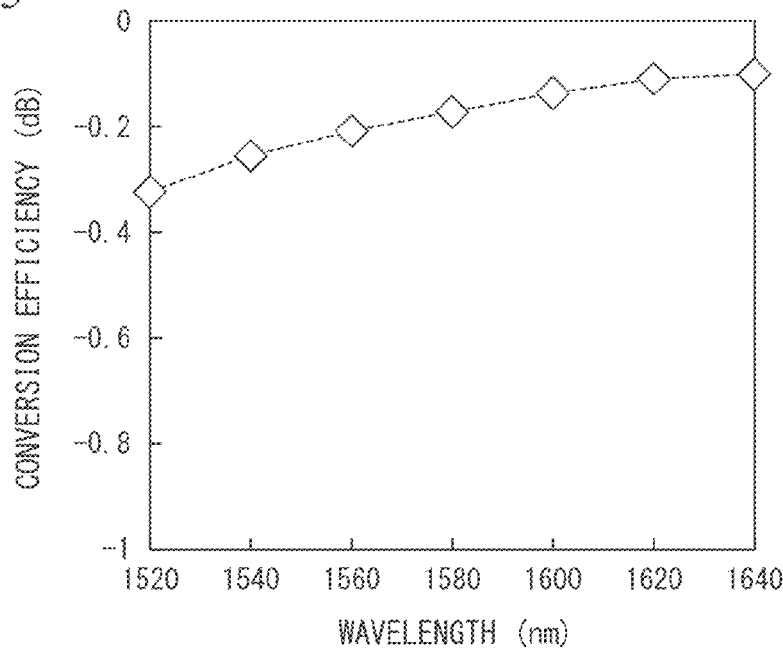
FIG. 15 is a graph showing the relationship between the wavelength of light and conversion efficiency when the width of the core region is changed.

The calculation result is shown in FIG. 15.

When FIG. 15 is compared with FIG. 14, a variation in the conversion efficiency when the width of the core region is changed by −30 nm is within 0.24 dB at each wavelength, so that the high conversion efficiency is maintained.

From FIG. 15, it can be confirmed that this structure is less influenced by the manufacturing error.

The reason why the conversion efficiency is improved when there is a manufacturing error (FIG. 15) rather than when there is no manufacturing error (FIG. 14) is as follows.

If the width of the core region is changed, the degree of confinement of light into the core region is changed. If the width is reduced, the confinement becomes weak. Accordingly, the amount of light leaking from the core region is increased, and the coupling of the super mode generating element to the adjacent waveguide becomes strong. For this reason, the conversion efficiency when there is a manufacturing error is improved.

Depending on the manufacturing error, the confinement may be strong. However, since the variation width of the conversion efficiency is approximately the same between waveguides, the fact that there is little influence of manufacturing error in the present embodiment is not changed.

Next, it is shown that the mode multiplexing of $TE_0$ and $TE_1$ (mode obtained by conversion of the $TE_0$ input to the core region 1) of the core region 2 is possible in the present example (FIGS. 11A and 11B).

For this, the transmittance (ratio of the power of $TE_0'$ output from the Y branch to the power of $TE_0'$ input to the core region 2) of $TE_0'$ output from the Y branch when inputting $TE_0$ (described as $TE_0'$ for distinction) to the core region 2 from the input side was simulated using the FDTD.

Figure 16:
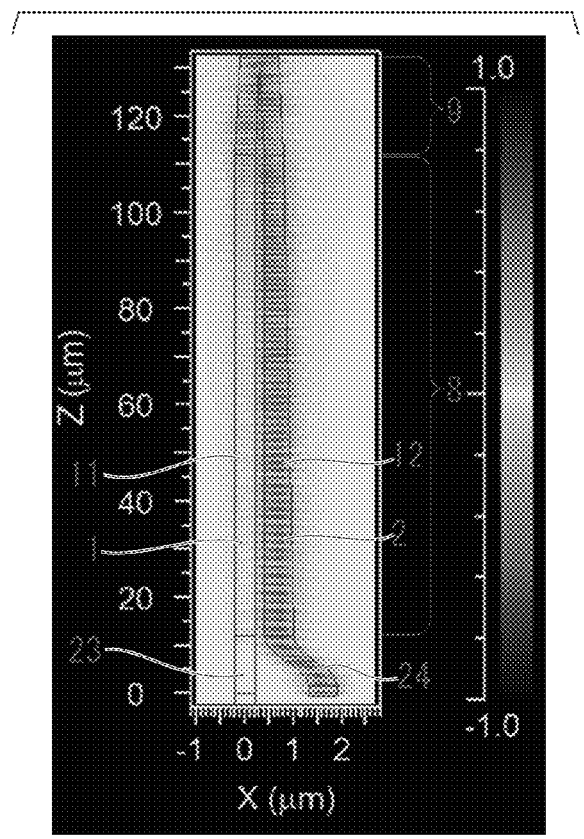
FIG. 16 is a diagram showing the simulation result that shows the electric field distribution ($E_X$ component).

FIG. 16 shows the electric field distribution calculated by using the FDTD when the taper length of the super mode generating element is 100 µm. The wavelength is 1580 nm. FIG. 16 shows the $E_X$ component at y=0.1 µm when inputting the $TE_0$ to the core region 2 from the input end (lower end).

In this case, it can be seen that the transmittance is −0.35 dB and a lot of power is transmitted. From the above, mode multiplexing is possible in the present example.

<Comparison with the Related Art>

Figure 55A:
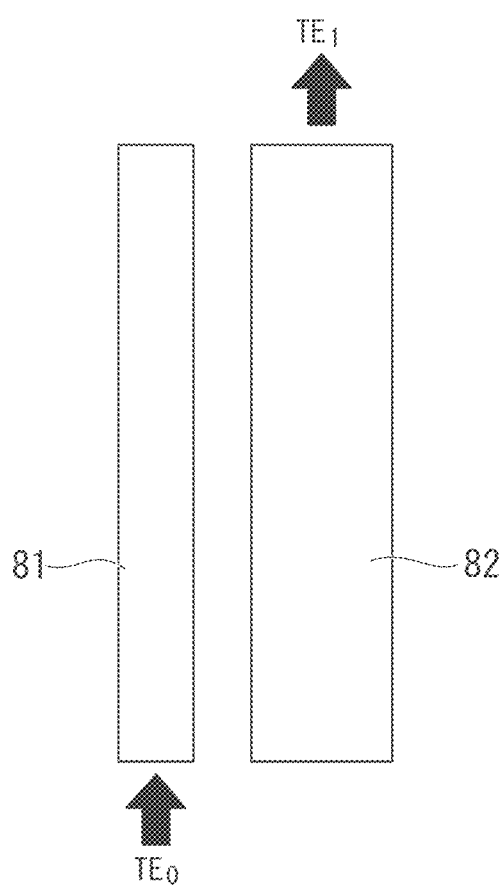
FIG. 55A is a plan view showing an example of a planar optical waveguide element in the related art.
Figure 55B:
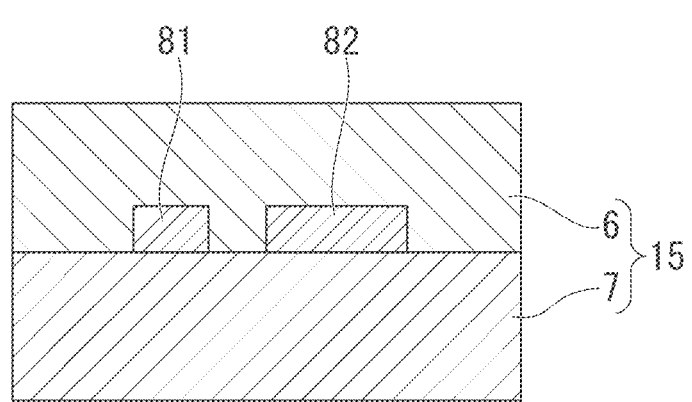
FIG. 55B is a sectional view showing an example of the planar optical waveguide element in the related art.
Figure 56:
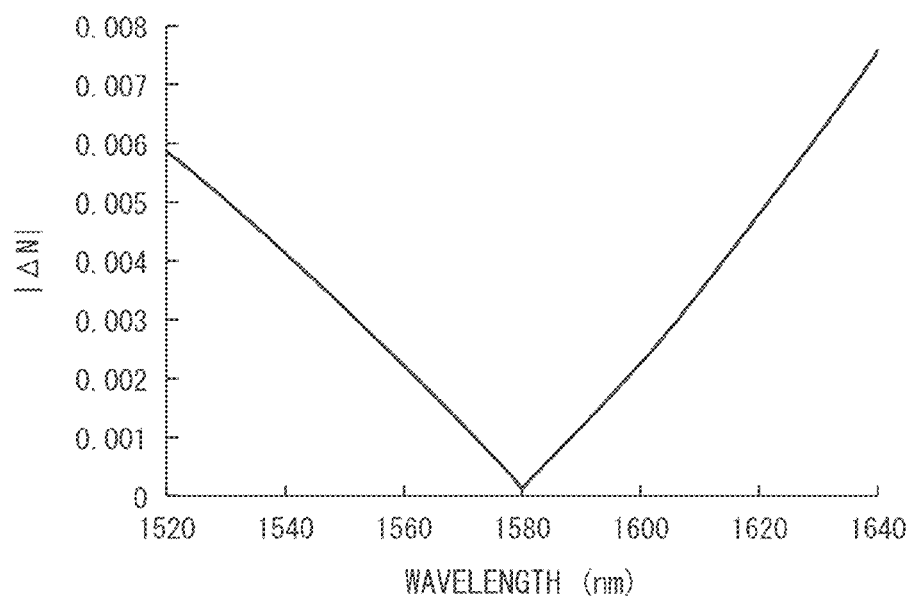
FIG. 56 is a graph showing the relationship between the wavelength of light and the absolute value of ΔN.

The present example will be compared with the performance of an asymmetric directional coupler of the related art. Specifically, example 1 will be compared with comparative example 1 having the structure shown in FIGS. 55A and 55B. First, the validity of the comparison will be checked from the follow point of view.

Both the super mode generating element used in the present example and the asymmetric directional coupler in the related art use the principle of mode coupling.

As the amount of light leaking to the adjacent waveguide becomes larger, mode coupling becomes stronger, and the efficiency is improved. In order to realize this, it is preferable to weaken the confinement of light by reducing the width of the core region.

However, when actual manufacturing is taken into consideration, there is a problem that reproducibility is reduced or a waveguide based on the mask design cannot be manufactured depending on the accuracy of lithography if the width of the core region is too narrow. That is, in the width of the core region, there is a minimum value allowing the manufacturing.

Therefore, it becomes possible to compare example 1 with comparative example 1 by setting the same conditions for the minimum width of the core region. In addition, since the bonding also becomes strong by reducing the gap between the core regions, the gap between the core regions is also set to be the same in example 1 and comparative example 1.

In example 1, the other widths of the core region were determined with the width of the output end (portion where the core needs to be narrowest) of the super mode generating element using the principle of mode coupling as 400 nm.

In comparative example 1 (asymmetric directional coupler shown in FIGS. 55A and 55B), the width of the core region 1 (portion where the core needs to be narrowest) through which the $TE_0$ to be coupled was guided was set to 400 nm, and the width of the core region 2 was determined for phase matching therebetween.

Since the conditions for the minimum width of the core region are the same, it becomes possible to compare example 1 with comparative example 1.

Figure 17:
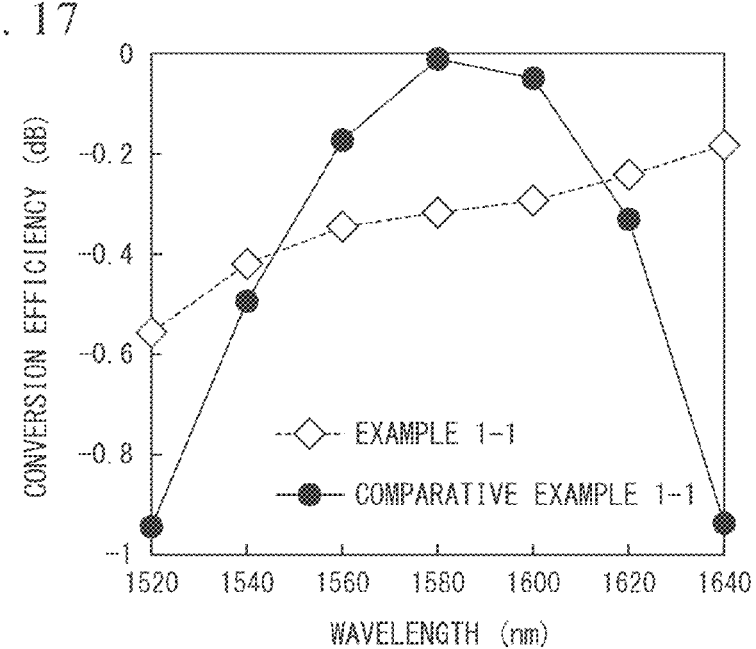
FIG. 17 is a graph showing the relationship between the wavelength of light and conversion efficiency.
Figure 57:
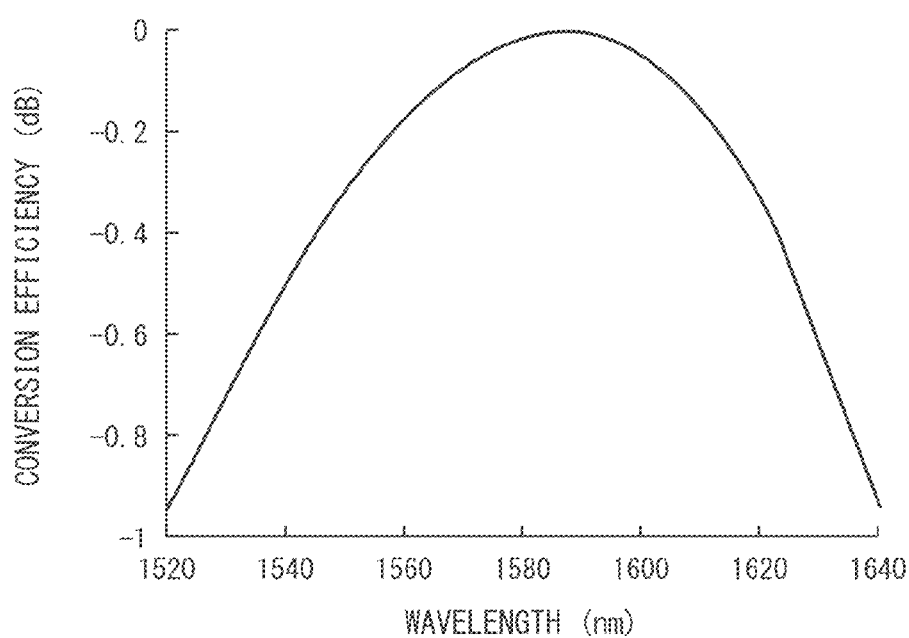
FIG. 57 is a graph showing the relationship between the wavelength of light and conversion efficiency.
Figure 58:
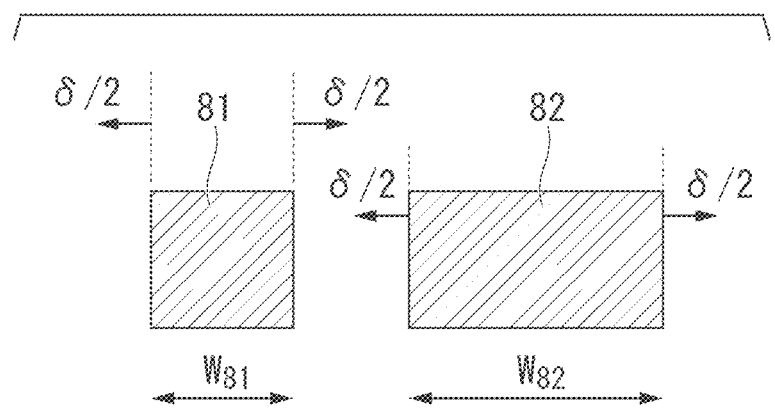
FIG. 58 is a diagram for explaining the manufacturing error of the width of the core region.
Figure 59:
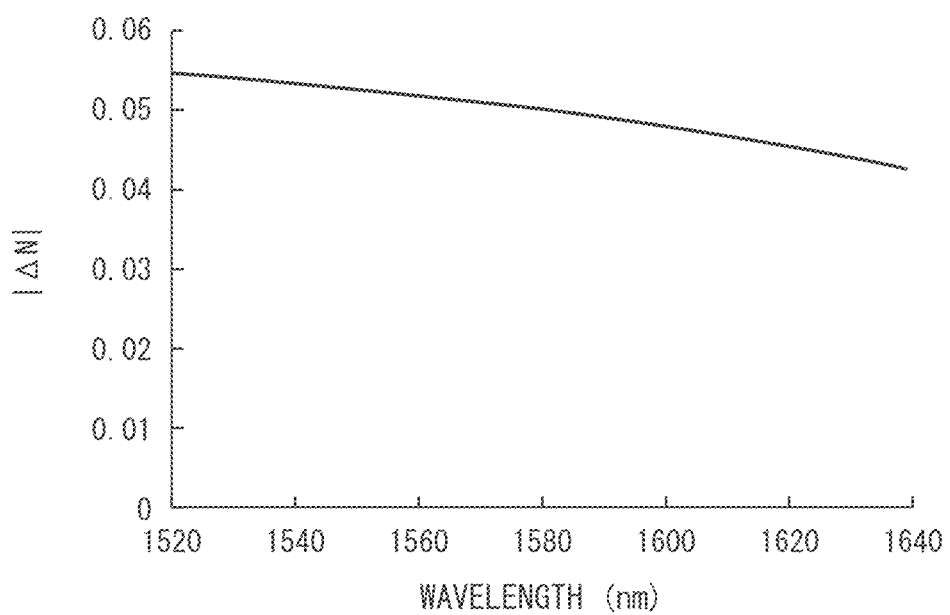
FIG. 59 is a graph showing the relationship between the wavelength of light and the absolute value of ΔN when the width of the core region is changed.

FIG. 17 shows the comparison result regarding the influence of the wavelength on the conversion efficiency in example 1 and comparative example 1. The results of example 1 and comparative example 1 are described as example 1-1 and comparative example 1-1, respectively. These results are the same as the graphs shown in FIGS. 14 and 57.

Referring to FIG. 17, in comparative example 1 (comparative example 1-1), the loss near the wavelength of 1580 nm is lower than that in example 1, but the conversion efficiency is greatly reduced when the wavelength is changed. For this reason, a change in loss depending on the wavelength is large.

In contrast, in example 1 (example 1-1), the loss change depending on the wavelength near the wavelength of 1580 nm is larger than that in comparative example 1 (comparative example 1-1), but the loss change depending on the wavelength in the wavelength range of 1520 nm to 1640 nm (wavelength range covering the C+L band in optical communication) is small.

In addition, when the minimum conversion efficiency in this wavelength range is compared, it can be seen that the minimum conversion efficiency in example 1 (example 1-1) is higher.

As described above, in example 1 (example 1-1), high-efficiency conversion can be realized over the wider wavelength range than in comparative example 1 (comparative example 1-1).

In addition, since the super mode generating element uses the adiabatic change in example 1 (example 1-1), it is possible to further reduce the loss by increasing the taper length.

In contrast, in the asymmetric directional coupler of comparative example 1 (comparative example 1-1), it is difficult to greatly change the length. Accordingly, a further improvement in the conversion efficiency cannot be expected.

Figure 18:
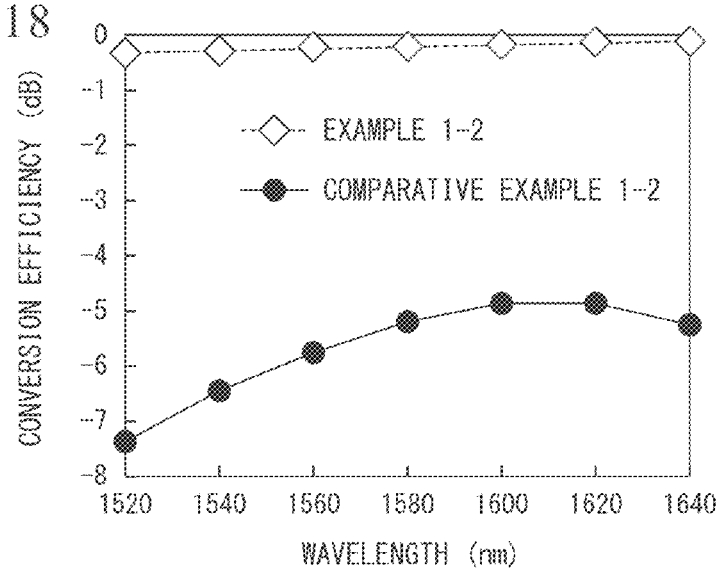
FIG. 18 is a graph showing the relationship between the wavelength of light and conversion efficiency when the width of the core region is changed.
Figure 60:
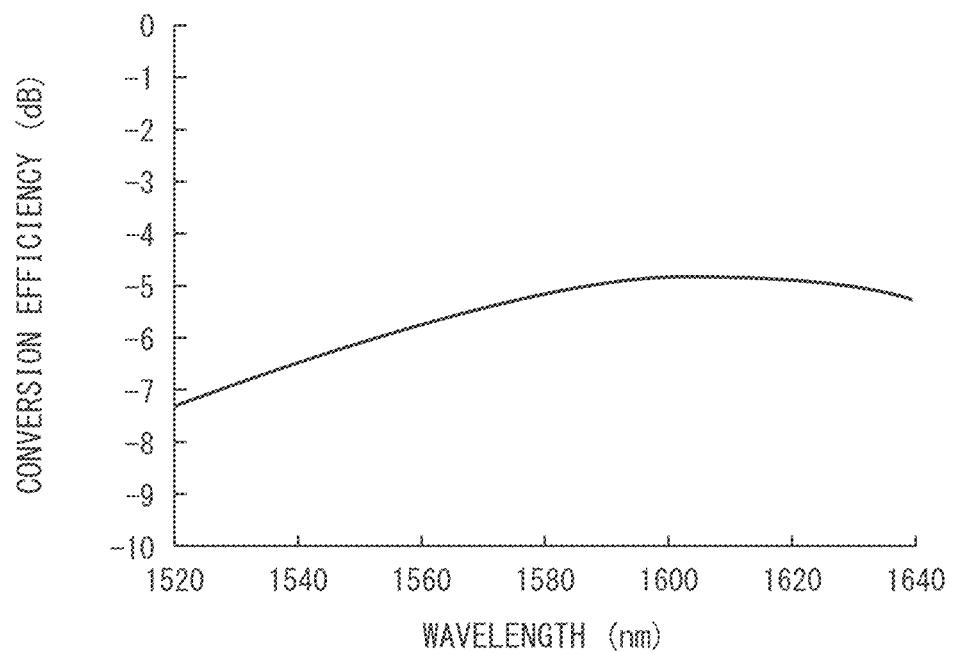
FIG. 60 is a graph showing the relationship between the wavelength of light and conversion efficiency when the width of the core region is changed.

Subsequently, FIG. 18 shows the comparison result regarding the influence of manufacturing error on the conversion efficiency in example 1 and comparative example 1. FIG. 18 shows the conversion efficiency when the width of the core region is changed by −30 nm. The results of example 1 and comparative example 1 are described as example 1-2 and comparative example 1-2, respectively. These results are the same as in the graphs shown in FIGS. 15 and 60.

Referring to FIG. 18, phase matching is not realized and the conversion efficiency is greatly reduced in comparative example 1 (comparative example 1-2), while the high conversion efficiency is maintained in example 1 (example 1-2). Therefore, the influence of manufacturing error in example 1 (example 1-2) is lower than that in comparative example 1 (comparative example 1-2).

From these results, it can be seen that, in example 1, high conversion efficiency is obtained in a wide wavelength band and the influence of manufacturing error is low, compared with the related art.

Example 2

<Planar Optical Waveguide Element>

Figure 19:
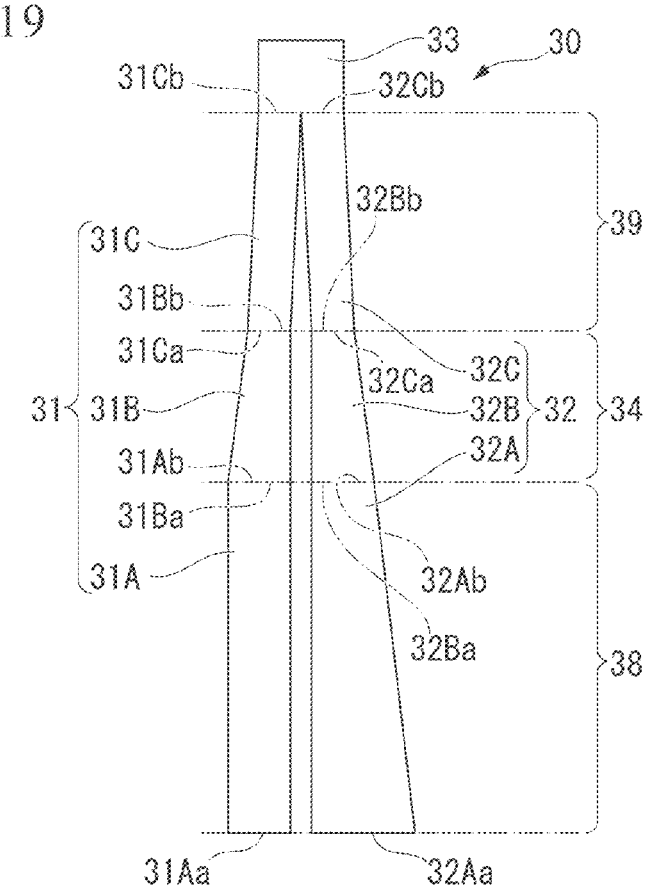
FIG. 19 is a plan view showing a first example of a planar optical waveguide element having a structure in which an intermediate core region is provided between a preceding-stage mode conversion portion and a subsequent-stage mode conversion portion.

FIG. 19 is a plan view showing a planar optical waveguide element 30 that is example 2. This example is a first example of a structure in which an intermediate core region is provided between a preceding-stage mode conversion portion and a subsequent-stage mode conversion portion.

The planar optical waveguide element 30 includes a pair of core regions 31 and 32 arranged in parallel and an output portion 33 provided on the subsequent stage sides (output sides) of the core regions 31 and 32. It is preferable that the heights of the core regions 31 and 32 and the output portion 33 are equal.

The planar optical waveguide element 30 is different from the planar optical waveguide element 10 shown in FIGS. 1A and 1B in that an intermediate core region 34 including tapered core regions 31B and 32B is interposed between a preceding-stage mode conversion portion 38 and a subsequent-stage mode conversion portion 39.

Of core regions 31A and 32A that form the preceding-stage mode conversion portion 38, the core region 31A extends in a straight line and the width is fixed in the longitudinal direction (light waveguide direction).

The core region 32A is formed in a tapered shape in which the width decreases continuously from an input end 32Aa to an output end 32Ab. The gap between the core regions 31A and 32A is fixed in the longitudinal direction.

In the preceding-stage mode conversion portion 38, at input ends 31Aa and 32Aa, the width of the core region 32A is larger than the width of the core region 31A. Accordingly, the section of the core region 32A is larger than the section of the core region 31A.

At output ends 31Ab and 32Ab, the widths of the core regions 31A and 32A are the same. Accordingly, the shapes and sizes of the sections of the core regions 31A and 32A are the same.

Of the core regions 31B and 32B that form the intermediate core region 34, the core region 31B is formed continuously to the core region 31A, and is formed in a tapered shape in which the width decreases continuously from an input end 31Ba to an output end 31Bb.

The width of the input end 31Ba of the core region 31B is the same as the width of the output end 31Ab of the core region 31A.

The core region 32B is formed continuously to the core region 32A, and is formed in a tapered shape in which the width decreases continuously from an input end 32Ba to an output end 32Bb.

The width of the input end 32Ba of the core region 32B is the same as the width of the output end 32Ab of the core region 32A. Therefore, the shapes and sizes of the sections of the core regions 31B and 32B at the input ends 31Ba and 32Ba are the same.

It is preferable that the widths of the core regions 31B and 32B at the output ends 31Bb and 32Bb are equal. Therefore, the shapes and sizes of the sections of the core regions 31B and 32B at the output ends 31Bb and 32Bb are the same.

The gap between the core regions 31B and 32B is fixed in the longitudinal direction.

Of core regions 31C and 32C that form the subsequent-stage mode conversion portion 39, the core region 31C extends in a straight line and the width is fixed in the longitudinal direction (light waveguide direction). The width of the core region 31C is the same as the width of the core region 31B at the output end 31Bb.

The core region 32C extends in a straight line, and the width is fixed in the longitudinal direction (light waveguide direction). The width of the core region 32C is the same as the width of the core region 32B at the output end 32Bb.

The core regions 31C and 32C are inclined so as to become closer to each other from input ends 31Ca and 32Ca to output ends 31Cb and 32Cb. The core regions 31C and 32C are spaced apart from each other at the input ends 31Ca and 32Ca, but are in contact with each other at the output ends 31Cb and 32Cb.

The output ends 31Cb and 32Cb of the core regions 31C and 32C are connected to the output portion 33.

In the planar optical waveguide element 30, by providing the intermediate core region 34 having a tapered structure, it is possible to gently change the width of the core region 31 from the preceding-stage mode conversion portion 38 to the subsequent-stage mode conversion portion 39.

For this reason, even if the width of the core region 31A is different from the width of the core region 31C, it is possible to connect the preceding-stage mode conversion portion 38 and the subsequent-stage mode conversion portion 39 to each other with low loss.

Example 3

<Planar Optical Waveguide Element>

Figure 20:
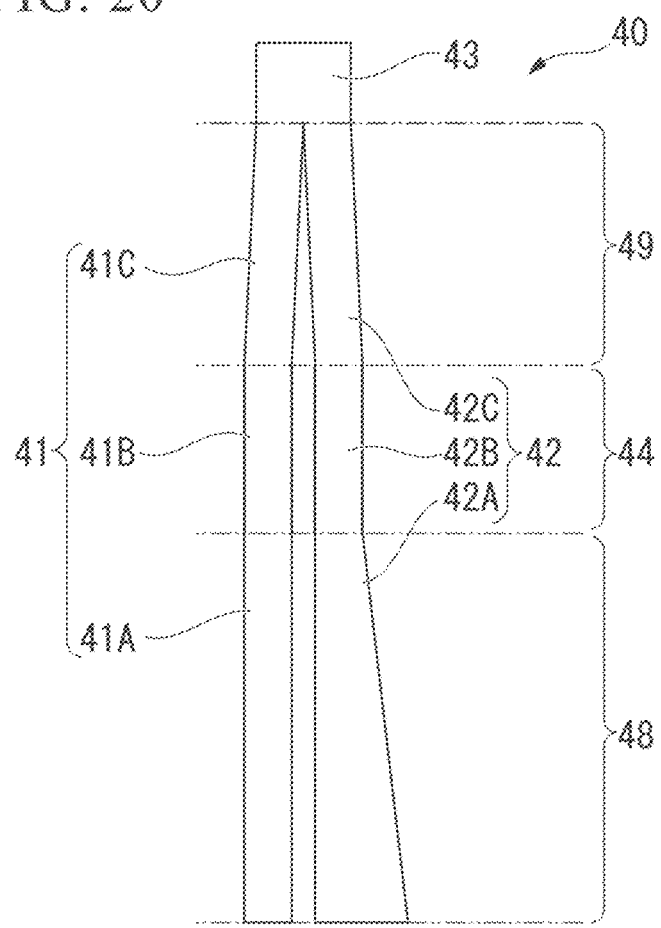
FIG. 20 is a plan view showing a second example of the planar optical waveguide element having a structure in which an intermediate core region is provided between a preceding-stage mode conversion portion and a subsequent-stage mode conversion portion.

FIG. 20 is a plan view showing a planar optical waveguide element 40 that is example 3. This example is a second example of the structure in which an intermediate core region is provided between a preceding-stage mode conversion portion and a subsequent-stage mode conversion portion.

The planar optical waveguide element 40 includes a pair of core regions 41 and 42 arranged in parallel and an output portion 43 provided on the subsequent stage sides (output sides) of the core regions 41 and 42. It is preferable that the heights of the core regions 41 and 42 and the output portion 43 are equal.

The planar optical waveguide element 40 is different from the planar optical waveguide element 10 shown in FIGS. 1A and 1B in that an intermediate core region 44 including linear core regions 41B and 42B is interposed between a preceding-stage mode conversion portion 48 and a subsequent-stage mode conversion portion 49.

Of core regions 41A and 42A that form the preceding-stage mode conversion portion 48, the core region 41A extends in a straight line and the width is fixed in the longitudinal direction (light waveguide direction). The core region 42A is formed in a tapered shape in which the width decreases continuously from the input end to the output end.

In the preceding-stage mode conversion portion 48, at the input end, the width of the core region 42A is larger than the width of the core region 41A. Accordingly, the section of the core region 42A is larger than the section of the core region 41A.

At the output end, the widths of the core regions 41A and 42A are the same. Accordingly, the shapes and sizes of the sections of the core regions 41A and 42A are the same.

In the preceding-stage mode conversion portion 48, phase matching is not realized at the input end but is realized at the output end.

Of the core regions 41B and 42B that form the intermediate core region 44, the core region 41B is formed continuously to the core region 41A, and the width is fixed in the longitudinal direction (light waveguide direction). The core region 41B extends in a straight line, and the width of the input end is the same as the width of the core region 41A at the output end.

The core region 42B is formed continuously to the core region 42A, and the width is fixed in the longitudinal direction (light waveguide direction). The core region 42B extends in a straight line, and the width of the input end is the same as the width of the core region 42A at the output end.

The widths of the core regions 41B and 42B are equal. Therefore, the sectional shapes of the core regions 41B and 42B are the same over the entire length.

The gap between the core regions 41B and 42B is fixed in the longitudinal direction.

Of core regions 41C and 42C that form the subsequent-stage mode conversion portion 49, the core region 41C extends in a straight line and the width is fixed in the longitudinal direction (light waveguide direction). The width of the core region 41C is the same as the width of the core region 41B.

The core region 42C extends in a straight line, and the width is fixed in the longitudinal direction (light waveguide direction). The width of the core region 42C is the same as the width of the core region 42B.

Since the core regions 41C and 42C are inclined so as to become closer to each other from the input ends to the output ends, the core regions 41C and 42C are spaced apart from each other at the input ends but are in contact with each other at the output ends.

The output ends of the core regions 41C and 42C are connected to the output portion 43.

In the planar optical waveguide element 40, by providing the straight intermediate core region 44 between the preceding-stage mode conversion portion 48 and the subsequent-stage mode conversion portion 49, it is possible to increase the degree of freedom of the arrangement of the subsequent-stage mode conversion portion 49.

Example 4

<Planar Optical Waveguide Element>

Figure 21:
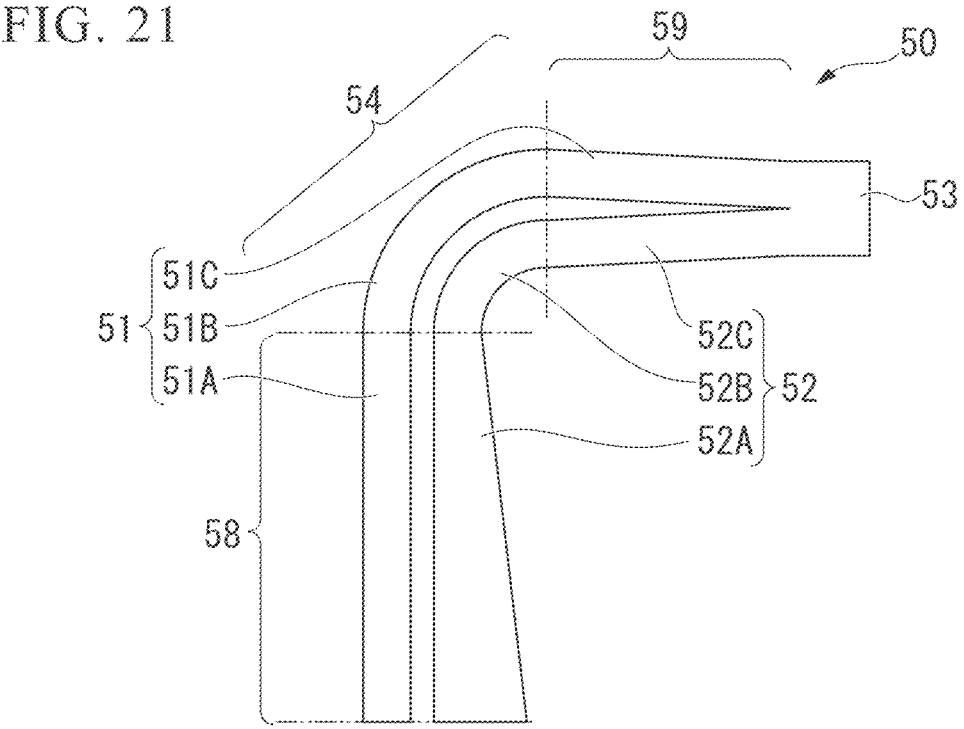
FIG. 21 is a plan view showing a third example of the planar optical waveguide element having a structure in which an intermediate core region is provided between a preceding-stage mode conversion portion and a subsequent-stage mode conversion portion.

FIG. 21 is a plan view showing a planar optical waveguide element 50 that is example 4. This example is a third example of the structure in which an intermediate core region is provided between a preceding-stage mode conversion portion and a subsequent-stage mode conversion portion.

The planar optical waveguide element 50 includes a pair of core regions 51 and 52 arranged in parallel and an output portion 53 provided on the subsequent stage sides (output sides) of the core regions 51 and 52. It is preferable that the heights of the core regions 51 and 52 and the output portion 53 are equal.

The planar optical waveguide element 50 is different from the planar optical waveguide element 10 shown in FIGS. 1A and 1B in that an intermediate core region 54 including curved core regions 51B and 52B is interposed between a preceding-stage mode conversion portion 58 and a subsequent-stage mode conversion portion 59.

Of core regions 51A and 52A that form the preceding-stage mode conversion portion 58, the core region 51A extends in a straight line and the width is fixed in the longitudinal direction (light waveguide direction). The core region 52A is formed in a tapered shape in which the width decreases gradually from the input end to the output end.

In the preceding-stage mode conversion portion 58, at the input end, the width of the core region 52A is larger than the width of the core region 51A. Accordingly, the section of the core region 52A is larger than the section of the core region 51A.

At the output end, the widths of the core regions 51A and 52A are the same. Accordingly, the shapes and sizes of the sections of the core regions 51A and 52A are the same.

In the preceding-stage mode conversion portion 58, phase matching is not realized at the input end is realized at the output end.

Of the core regions 51B and 52B that form the intermediate core region 54, the core region 51B is formed continuously to the core region 51A, and the width is fixed in the longitudinal direction (light waveguide direction). The width of the input end of the core 51B is the same as the width of the output end of the core 51A.

The core region 52B is formed continuously to the core region 52A, and the width is fixed in the longitudinal direction (light waveguide direction). The width of the input end of the core 52B is the same as the width of the output end of the core 52A.

The shapes of the core regions 51B and 52B in plan view are preferably circular arc shapes. However, the shapes of the core regions 51B and 52B are not limited thereto, and may be arbitrary curved shapes. For example, it is possible to adopt a high-order curved shape (for example, a quadratic curve shape), such as an elliptical arc shape, a parabolic shape, and a hyperbolic shape.

Of core regions 51C and 52C that form the subsequent-stage mode conversion portion 59, the core region 51C extends in a straight line and the width is fixed in the longitudinal direction (light waveguide direction). The width of the core region 51C is the same as the width of the core region 51B.

The core region 52C extends in a straight line, and the width is fixed in the longitudinal direction (light waveguide direction). The width of the core region 52C is the same as the width of the core region 52B.

Since the core regions 51C and 52C are inclined so as to become closer to each other from the input ends to the output ends, the core regions 51C and 52C are spaced apart from each other at the input ends but are in contact with each other at the output ends.

The output ends of the core regions 51C and 52C are connected to the output portion 53.

In the planar optical waveguide element 50, by providing the curved intermediate core region 54 between the preceding-stage mode conversion portion 58 and the subsequent-stage mode conversion portion 59, it is possible to increase the degree of freedom of the arrangement of the subsequent-stage mode conversion portion 59.

Example 5

<Planar Optical Waveguide Element>

Figure 22:
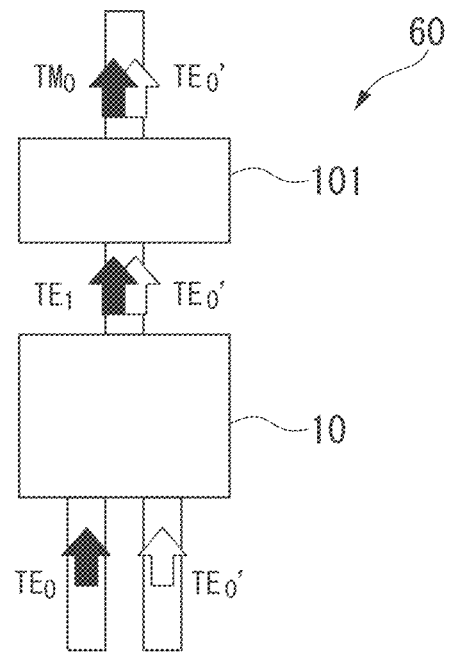
FIG. 22 is a plan view showing an example of a planar optical waveguide element using a high-order polarization conversion element.

FIG. 22 is a schematic diagram showing a planar optical waveguide element 60 (polarization conversion element) that is example 5.

The planar optical waveguide element 60 includes a high-order polarization conversion element 101 (high-order polarization conversion portion) that is provided on the output side of the planar optical waveguide element 10 (mode conversion element) shown in FIGS. 1A and 1B. In addition, the high-order polarization conversion refers to conversion between $TE_1$ and $TM_0$.

Figure 23A:
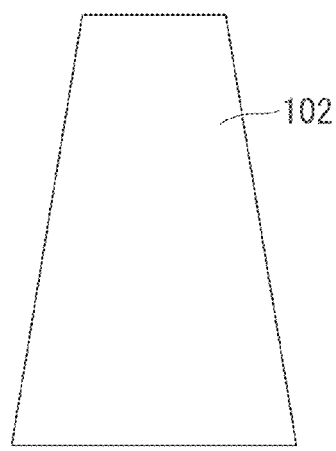
FIG. 23A is a plan view schematically showing an example of the high-order polarization conversion element shown in FIG. 22.
Figure 23B:
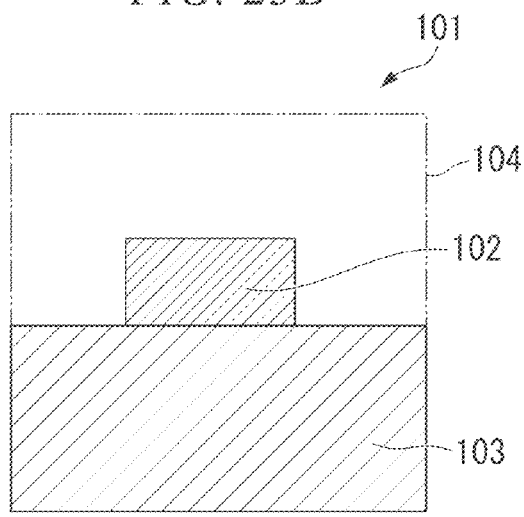
FIG. 23B is a sectional view schematically showing an example of the high-order polarization conversion element shown in FIG. 22.

FIGS. 23A and 23B show an example of the structure of the high-order polarization conversion element 101 (refer to Daoxin Dai and John E. Bowers, "Novel concept for ultra-compact polarization splitter-rotator based on silicon nanowires," Optics Express, Vol. 19, Issue 11, pp. 10940-10949 (2011)). FIG. 23A is a plan view, and FIG. 23B is a sectional view. The high-order polarization conversion element 101 has a waveguide including a core 102, a lower cladding 103 having a lower refractive index than the core 102, and an upper cladding 104 having a lower refractive index than the core 102.

The core 102 is formed of Si, for example. The lower cladding 103 is formed of $SiO_2$, for example. The upper cladding 104 is formed by an air layer.

In order to perform high-order polarization conversion, the upper cladding 104 and the lower cladding 103 need to have different refractive indices.

In the planar optical waveguide element 60 shown in FIG. 22, the $TE_0$ can be converted into the $TE_1$ by the planar optical waveguide element 10, and the $TE_1$ can be converted into the $TM_0$ by the high-order polarization conversion element 101.

In the high-order polarization conversion element 101, since the $TE_0$ is not converted into another mode, the $TE_0$ (described as $TE_0'$ for distinction) that is input to the core region 2 and is output from the output portion 3 is not converted.

For this reason, an output obtained by the multiplexing of $TM_0$ and $TE_0'$ is obtained from the output side of the high-order polarization conversion element 101. Therefore, the planar optical waveguide element 60 can be used as an element for performing polarization multiplexing.

Example 6

<Planar Optical Waveguide Element (Polarization Conversion Element)>

In the planar optical waveguide element 60 shown in FIG. 22, it is possible to use a high-order polarization conversion element 61 shown in FIGS. 24A to 24D instead of the high-order polarization conversion element 101.

Figure 24A:
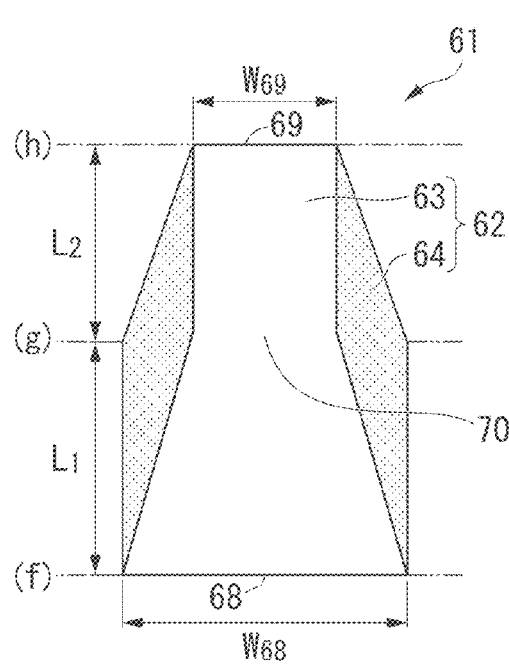
FIG. 24A is a plan view showing another example of the high-order polarization conversion element.
Figure 24B:
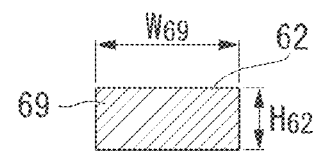
FIG. 24B shows another example of the high-order polarization conversion element, and is a sectional view at the sectional position (h).
Figure 24C:
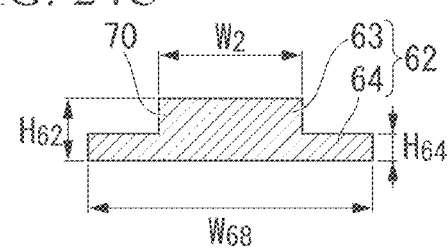
FIG. 24C shows another example of the high-order polarization conversion element, and is a sectional view at the sectional position (g).
Figure 24D:
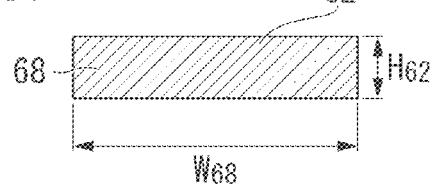
FIG. 24D shows another example of the high-order polarization conversion element, and is a sectional view at the sectional position (f).

FIG. 24A is a plan view of a core 62, FIG. 24B is a sectional view of an end portion of the core 62, FIG. 24C is a sectional view of an intermediate core region of the core 62, and FIG. 24D is a sectional view of a start portion of the core 62. A cladding (not shown) is provided around the core 62. In FIG. 24A, a lower core 64 is shaded.

In the high-order polarization conversion element 61, the core 62 includes the lower core 64 and an upper core 63 having a rectangular sectional shape that is formed on the lower core 64. In a start portion 68 and an end portion 69, the side edges of the upper core 63 are located so as to overlap the side edges of the lower core 64. Accordingly, the core 62 has a rectangular sectional shape.

The width $W_{68}$ of the start portion 68 is larger than the width $W_{69}$ of the end portion 69. The height of each of the start portion 68 and the end portion 69 is $H_{62}$, and the height $H_{64}$ of the lower core 64 is smaller than the core height $H_{62}$.

In a section $L_1$ from the start portion 68 to an intermediate core region 70, the width of the lower core 64 is fixed, while the width of the upper core 13 decreases gradually from the start portion 68 to the intermediate core region 70.

In a section $L_2$ from the intermediate core region 70 to the end portion 69, the width of the lower core 64 decreases gradually from the intermediate core region 70 to the end portion 69, while the width of the upper core 63 is fixed.

In the high-order polarization conversion element 61, since the core 62 has a vertically asymmetric structure, the width of a part of the upper core 63 and the lower core 64 is changed. Therefore, it is possible to convert the $TE_1$ into the $TM_0$.

<Planar Optical Waveguide Element>

Figure 25A:
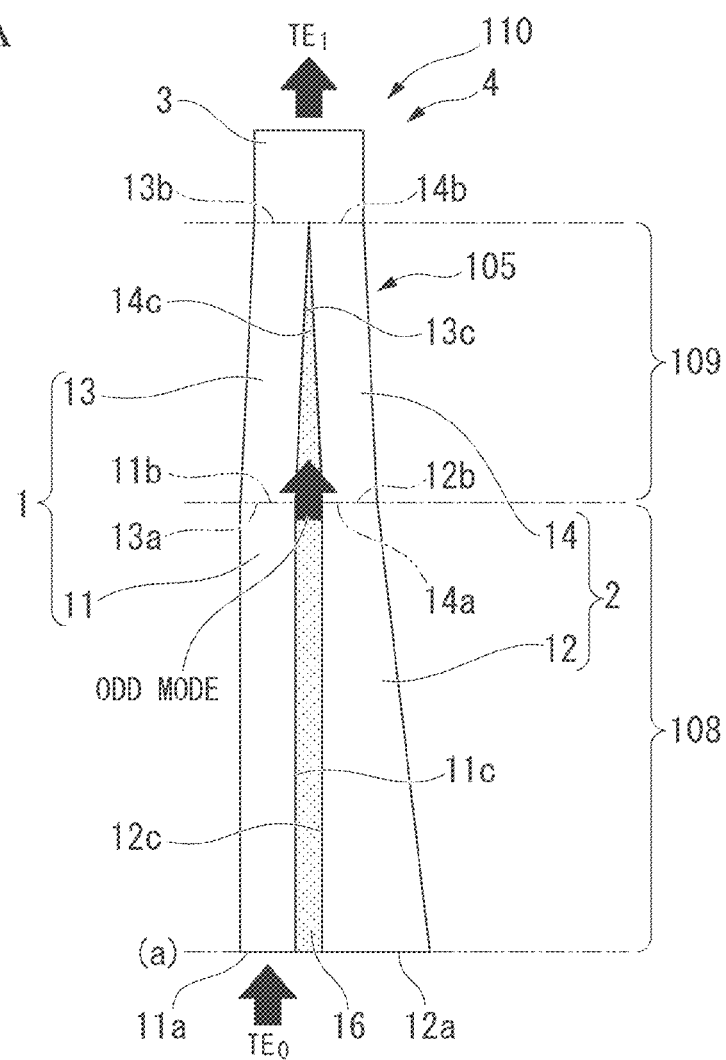
FIG. 25A is a plan view showing a planar optical waveguide element according to a second embodiment of the invention.
Figure 25B:
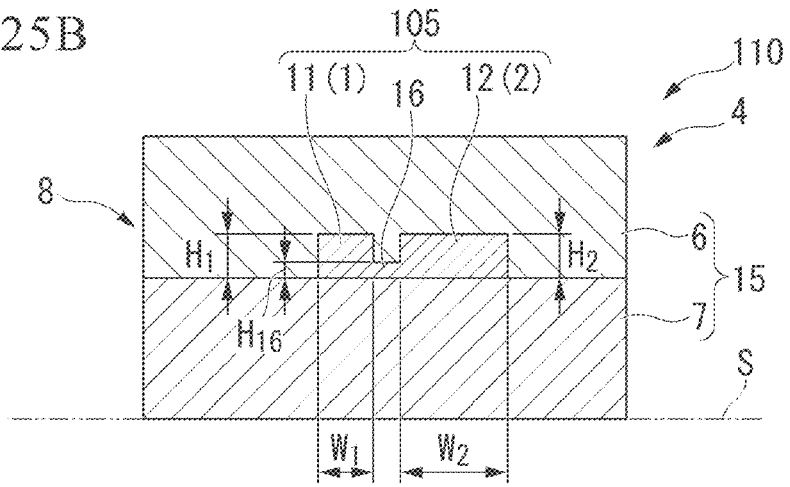
FIG. 25B shows the planar optical waveguide element according to the second embodiment of the invention, and is a sectional view at the sectional position (a).

As a second embodiment of the invention, the structure of a planar optical waveguide element 110 shown in FIGS. 25A and 25B will be described. FIG. 25A is a plan view showing the planar optical waveguide element 110, and FIG. 25B is a sectional view at the sectional position (a) in FIG. 25A. The same components as in the planar optical waveguide element 10 shown in FIGS. 1A and 1B are denoted by the same reference numerals, and an explanation thereof will be omitted.

As shown in FIGS. 25A and 25B, the planar optical waveguide element 110 (mode conversion element) has the same configuration as the planar optical waveguide element 10 shown in FIGS. 1A and 1B except that the core 105 is provided instead of the core 5. In FIG. 25A, a slab portion 16 is shaded.

The core 105 includes a pair of core regions 1 and 2 (rib portion), the slab portion 16 formed at least between the core regions 1 and 2, and the output portion 3 provided on the subsequent stage sides (output side) of the core regions 1 and 2 and the slab portion 16.

The slab portion 16 is formed so as to be lower than the core regions 1 and 2. That is, as shown in FIG. 25B, the height $H_{16}$ of the slab portion 16 is lower than the heights $H_1$ and $H_2$ of the core regions 1 and 2.

As shown in FIG. 25A, the slab portion 16 is formed so as to connect the core regions 1 and 2 to each other in at least parts of the core regions 1 and 2 in the longitudinal direction.

The slab portion 16 is formed between the inner side surfaces opposite to each other of the core regions 1 and 2 (that is, between the side surfaces of inner edges 11*c* and 13*c* of the core region 1 and the side surfaces of inner edges 12*c* and 14*c* of the core region 2).

The slab portion 16 in the example shown in the diagrams is formed over the entire length of the core regions 1 and 2. In addition, the slab portion 16 may be formed only in parts of the core regions 1 and 2 in the longitudinal direction.

The slab portion 16 is formed of the same material (preferably, Si) as the core regions 1 and 2, and is formed integrally with the core regions 1 and 2.

As shown in FIG. 25B, since the slab portion 16 is formed so as to extend from the lower portions of the inner side surfaces of the core regions 1 and 2, the bottom surface of the slab portion 16 the bottom surface of the core regions 1 and 2 are even with each other. The core regions 1 and 2 protrude upward from the upper surface of the slab portion 16.

In the core 105, the slab portion 16 is provided on only one side (inner side) of each of the core regions 1 and 2 in the width direction. Therefore, the core 105 forms a so-called semi-rib waveguide.

The core 105 (the core regions 1 and 2, the slab portion 16, and the output portion 3) can be formed by processing the Si layer of the SOI substrate.

As shown in FIG. 25A, the core 105 includes a preceding-stage mode conversion portion 108 (super mode generating element) for converting the mode of light propagating through the core regions 1 and 2 and a subsequent-stage mode conversion portion 109 (Y branch) for converting the mode of light transmitted through the preceding-stage mode conversion portion 108.

The preceding-stage mode conversion portion 108 includes core regions 11 and 12 (rib regions) and the slab portion 16 provided between the core regions 11 and 12.

The subsequent-stage mode conversion portion 109 includes core regions 13 and 14 (rib regions) and the slab portion 16 provided between the core regions 13 and 14. The subsequent-stage mode conversion portion 109 is formed continuously to the rear end (output side) of the preceding-stage mode conversion portion 108.

The planar optical waveguide element 110 can be manufactured by processing the SOI substrate. For example, an $SiO_2$ layer and an Si layer of the SOI substrate can be formed as a lower cladding and a core, respectively, by the lithography/etching process.

The core region can be formed by two lithography/etching processes. That is, a core including a core region and a slab portion can be formed by forming a core having a fixed thickness by the lithography/etching process first and then forming a slab portion by making a part of the core thinner by the lithography/etching process.

<Principle of the Super Mode Generating Element>

Figure 26A:
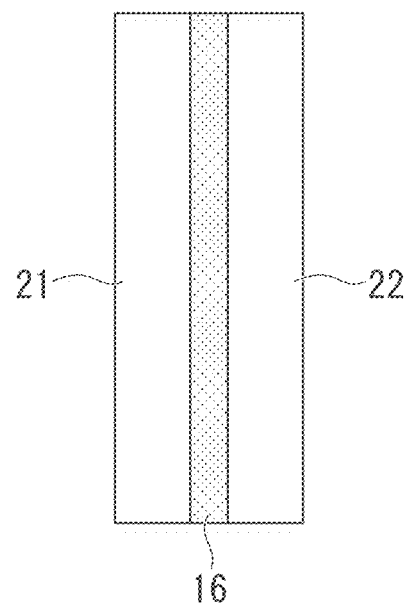
FIG. 26A is a plan view showing an example of the optical waveguide element.
Figure 26B:
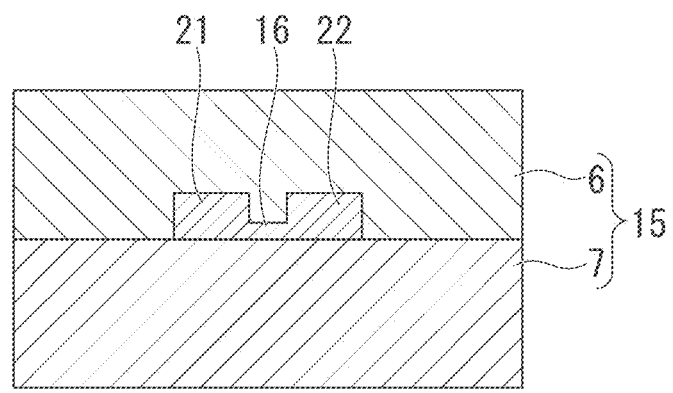
FIG. 26B is a sectional view showing an example of the optical waveguide element.

FIGS. 26A and 26B show an optical waveguide element including the core regions 21 and 22 having the same width and the slab portion 16 formed between the core regions 21 and 22.

Figure 27C:
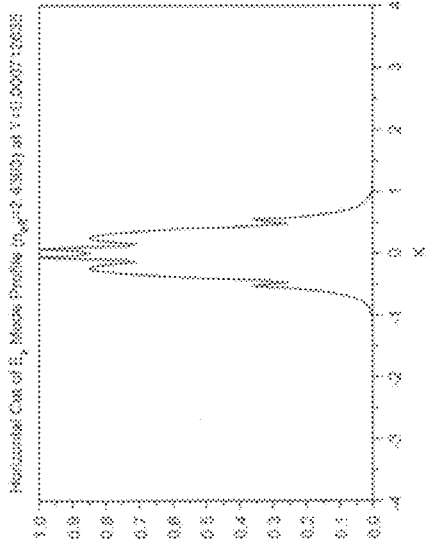
FIG. 27C is a graph of the electric field distribution ($E_X$ component) of an even mode in the optical waveguide element shown in FIGS. 26A and 26B.
Figure 27D:
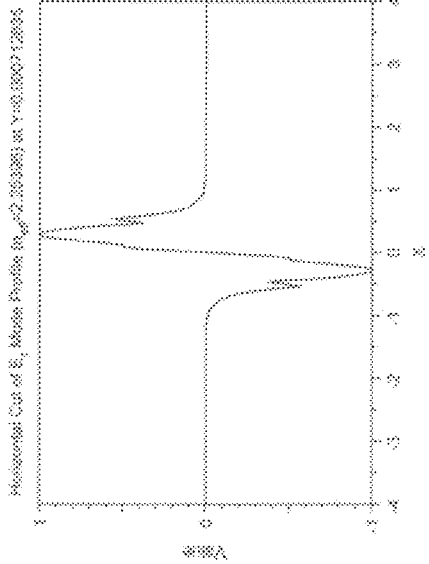
FIG. 27D is a graph of the electric field distribution ($E_X$ component) of an odd mode in the optical waveguide element shown in FIGS. 26A and 26B.
Figure 27A:
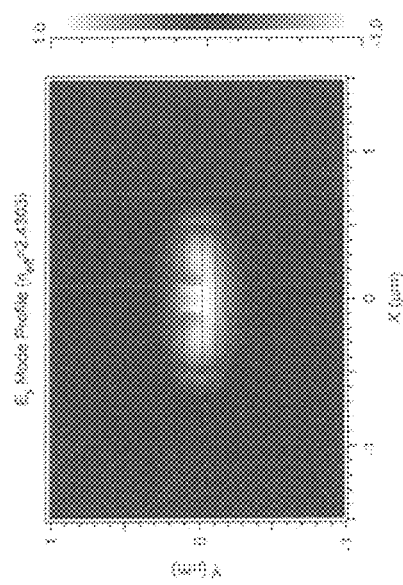
FIG. 27A is a simulation result of the electric field distribution ($E_X$ component) of the even mode in the optical waveguide element shown in FIGS. 26A and 26B.
Figure 27B:
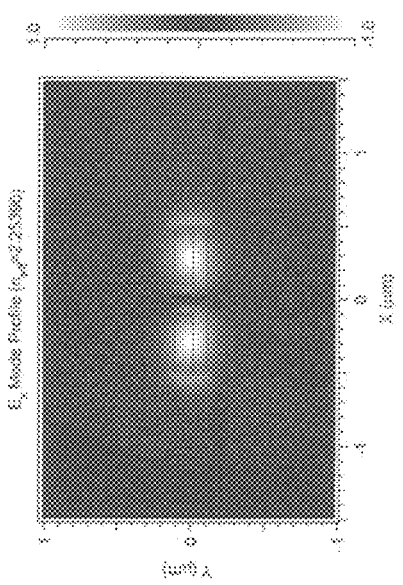
FIG. 27B is a simulation result of the electric field distribution ($E_X$ component) of an odd mode in the optical waveguide element shown in FIGS. 26A and 26B.

At the time of mode coupling of $TE_0$ between the adjacent waveguides, there are two modes. One of these is a mode in which the $TE_0$ with electric field components symmetric in the width direction is coupled as shown in FIGS. 27A and 27C (called an even mode). The other mode is a mode in which the $TE_0$ with electric field components anti-symmetric in the width direction is coupled as shown in FIGS. 27B and 27D (called an odd mode). These are collectively referred to as a super mode of $TE_0$ (or simply a super mode).

As described above, when the phase matching between the adjacent waveguides is satisfied, the length of the waveguide that is required for the light leaking from one waveguide to move to the other waveguide to become a super mode depends on the coupling coefficient $\chi$ indicating the strength of mode coupling.

<Specific Example of the Super Mode Generating Element>

The preceding-stage mode conversion portion 108 that is a specific example of the super mode generating element will be described with reference to FIGS. 25A, 25B, and 28A to 28D.

FIG. 28A is a plan view, FIG. 28B is a sectional view along the sectional position (c) in FIG. 28A, FIG. 28C is a sectional view along the sectional position (b) in FIG. 28A, and FIG. 28D is a sectional view along the sectional position (a) in FIG. 28A.

A "waveguide 1" corresponds to a waveguide including a first core region 1, and a "waveguide 2" corresponds to a waveguide including a second core region 2.

The core region 11 (core region 1) and the core region 12 (core region 2) are formed of Si (refractive index of 3.48 (wavelength of 1580 nm)), and the upper cladding 6 and the lower cladding 7 are formed of $SiO_2$ (refractive index of 1.44 (wavelength of 1580 nm)). The heights of the core regions 11 and 12 (core regions 1 and 2) are 220 nm. The height of the slab portion 16 is 95 nm. The gap between the core regions 11 and 12 (core regions 1 and 2) is 200 nm.

As shown in FIG. 28D, the width of the core region 11 (core region 1) is set to 400 [nm], and the width of the core region 12 (core region 2) is set to 400−X [nm] (−200≤X≤0).

X changes linearly from −200 to 0 in a range from the input end 12a to the output end 12b.

Therefore, the core region 12 (core region 2) has a tapered shape having a width that decreases gradually from the input end 12a (X=−200) to the output end 12b (X=0).

FIG. 28C shows a section at an intermediate position (X=−20) of the input ends 11a and 12a and the output ends 11b and 12b.

In the example shown in FIGS. 28A to 28D, at the input ends 11a and 12a, the width (width $W_{12a}$ in FIG. 28D) of the core region 12 (core region 2) is larger than the width (width $W_{11a}$ in FIG. 28D) of the core region 11 (core region 1). Accordingly, the section of the core region 12 is larger than the section of the core region 11 at the input ends 11a and 12a. For this reason, since phase matching is not satisfied, mode coupling is hardly performed.

On the other hand, at the output ends 11b and 12b, the widths (widths $W_{11b}$ and $W_{12b}$ in FIG. 28B) of the core regions 11 and 12 (core regions 1 and 2) are the same. Accordingly, the shapes and sizes of the sections of the core regions 11 and 12 are the same at the output ends 11b and 12b. For this reason, phase matching is satisfied.

In this manner, mode coupling proceeds gradually along the light waveguide direction from the input end to the output end. Therefore, by making the length (taper length) of the tapered waveguide (core region 12) sufficiently large, the $TE_0$ input to the waveguide 1 can be converted into the odd mode of the super mode of $TE_0$ without little loss.

As described above, the length of the waveguide that is required for the light leaking from one waveguide to move to the other waveguide to become a super mode depends on the coupling coefficient χ. Therefore, as the coupling coefficient χ increases, high-efficiency mode conversion can be realized in a short waveguide (short device length).

This principle will be described based on the specific example described above.

Figure 29A:
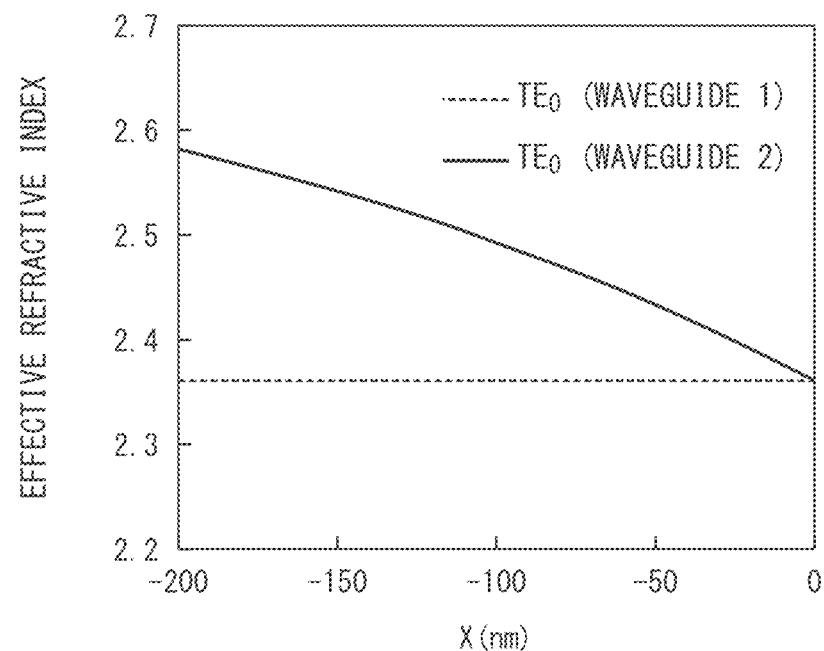
FIG. 29A is a diagram showing an effective refractive index when two waveguides are present independently.

In order to confirm that the conditions for phase matching at the input end are not satisfied by changing the waveguide width in the light waveguide direction (that is, by tapering the waveguide), the effective refractive index of each mode when the waveguides 1 and 2 are present independently is shown in FIG. 29A. The wavelength is 1580 nm (the same hereinbelow).

Figure 29B:
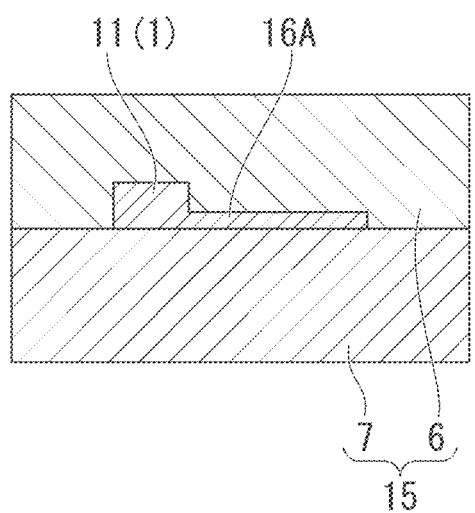
FIG. 29B is a sectional view showing the structure of one waveguide when two waveguides are present independently.

FIG. 29 B is a sectional view of the waveguide 1 when the waveguide 1 including the core region 11 is present independently. The core of the independent waveguide 1 includes the core region 11 and a slab portion 16A (95 nm in height) extending from the core region 11 in the width direction. The entire width is the same as the width (400+200+(400−X) [nm]) of the core 105.

Figure 29C:
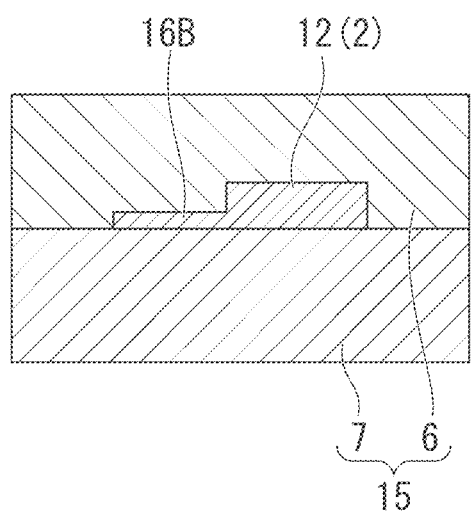
FIG. 29C is a sectional view showing the structure of the other waveguide when two waveguides are present independently.

FIG. 29C is a sectional view of the waveguide 2 when the waveguide 2 including the core region 12 is present independently. The core of the independent waveguide 2 includes the core region 12 and a slab portion 16B (95 nm in height) extending from the core region 12 in the width direction. The entire width is the same as the width (400+200+(400−X) [nm]) of the core 105.

FIG. 29A shows that the effective refractive index of the $TE_0$ of the waveguide 1 and the effective refractive index of the $TE_0$ of the waveguide 2 match each other to realize phase matching at X=0.

As X moves away from 0, the effective refractive index of the $TE_0$ of the waveguide 1 and the effective refractive index of the $TE_0$ of the waveguide 2 are shifted, and the conditions for phase matching are not satisfied.

Figure 30:
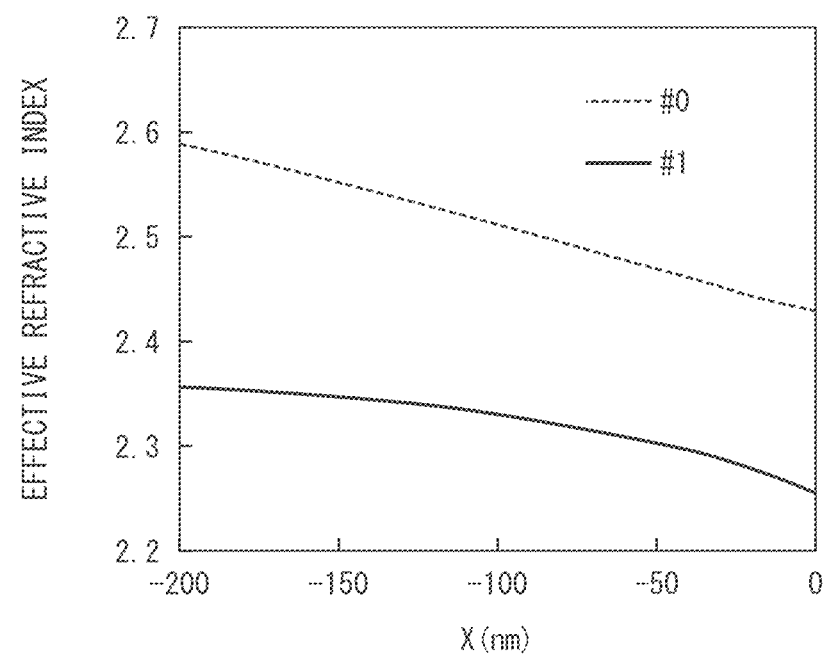
FIG. 30 is a diagram showing the effective refractive index when two waveguides are made to be adjacent to each other.

FIG. 30 shows the effective refractive indices of the modes when the waveguides 1 and 2 are made to be adjacent to each other.

Compared with FIG. 29A showing the effective refractive indices when the waveguides are present independently, modes #0 and #1 are not the same and are separated from each other at X=0 in FIG. 30.

This is because the conditions for phase matching between the $TE_0$ of the waveguide 1 and the $TE_0$ of the waveguide 2 are satisfied and the two modes interact to each other due to mode coupling to form a mixed mode (super mode).

If the distance from X=0 increases, the conditions for phase matching are not satisfied. In this case, such interaction does not occur, and the same mode profile as when the waveguides are present independently is obtained. As a result, the effective refractive index is not greatly changed compared with the case in which the waveguides are present independently.

In a structure in which the structure of the waveguide is changed gradually in the light waveguide direction, such as a tapered waveguide, it is known that a mode is converted so as to remain on one effective refractive index curve (referred to as adiabatic change).

Therefore, in FIG. 30, the $TE_0$ can be converted into the odd mode at X=0 by inputting the $TE_0$ to the waveguide 1 at X=−200 (input end) and changing X gradually from −200 to 0 in the longitudinal direction of the waveguide.

In order to confirm this, FIGS. 31A to 31F shows the electric field distribution of each of the modes #0 and #1 at the sectional positions (a) to (c) (refer to FIG. 28A).

Figure 31A:
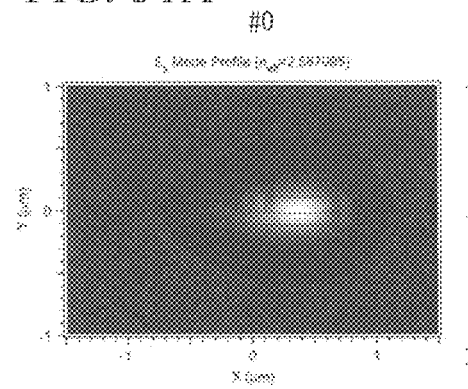
FIG. 31A is a simulation result of the electric field distribution ($E_X$ component) of the mode #0 at the sectional position (a) in FIG. 28A.
Figure 31B:
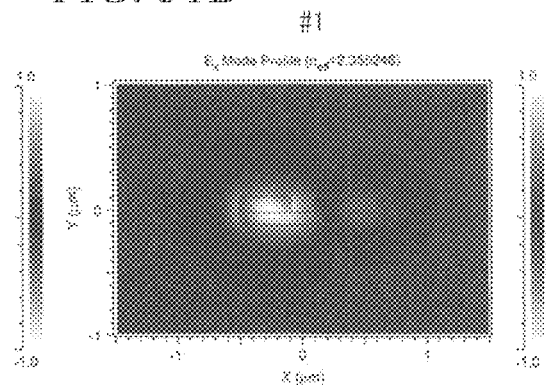
FIG. 31B is a simulation result of the electric field distribution ($E_X$ component) of the mode #1 at the sectional position (a) in FIG. 28A.
Figure 31C:
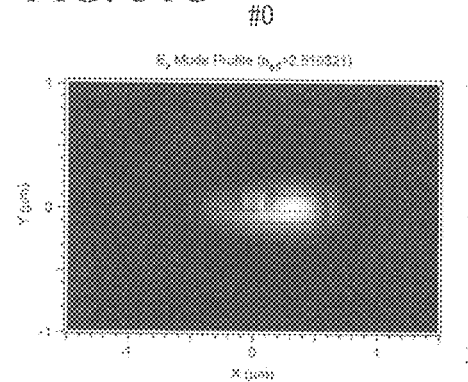
FIG. 31C is a simulation result of the electric field distribution ($E_X$ component) of the mode #0 at the sectional position (b) in FIG. 28A.
Figure 31D:
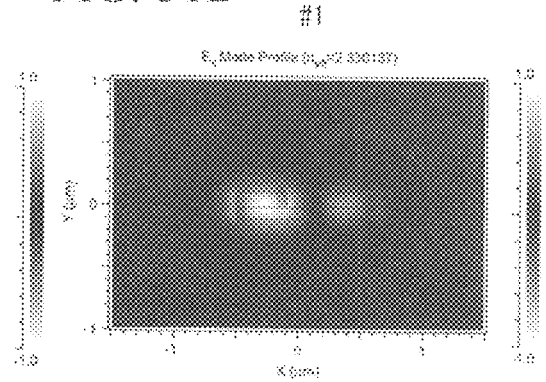
FIG. 31D is a simulation result the electric field distribution ($E_X$ component) of the mode #1 at the sectional position (b) in FIG. 28A.
Figure 31E:
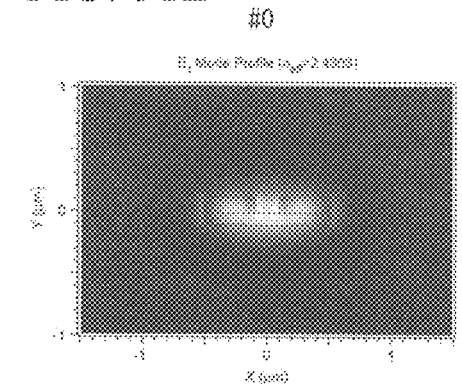
FIG. 31E is a simulation result of the electric field distribution ($E_X$ component) of the mode #0 at the sectional position (c) in FIG. 28A.
Figure 31F:
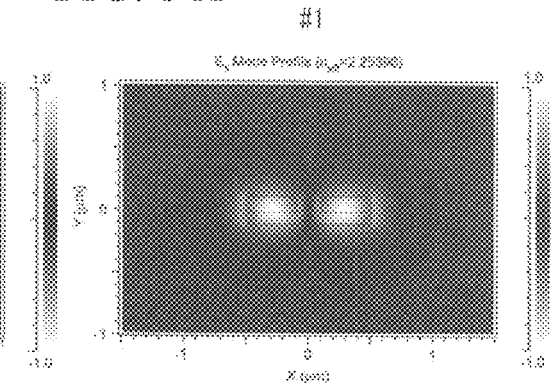
FIG. 31F is a simulation result of the electric field distribution ($E_X$ component) of the mode #1 at the sectional position (c) in FIG. 28A.

FIGS. 31A and 31B are simulation results showing the electric field distribution (Ex component) at the sectional position (a) (FIG. 31A shows the mode #0, and FIG. 31B shows the mode #1). FIGS. 31C and 31D are simulation results showing the electric field distribution ($E_X$ component) at the sectional position (b) (FIG. 31C shows the mode #0, and FIG. 31D shows the mode #1). FIGS. 31E and 31F are simulation results showing the electric field distribution ($E_X$ component) at the sectional position (c) (FIG. 31E shows the mode #0, and FIG. 31F shows the mode #1).

x and y indicate a width direction and a height direction, respectively. The electric field distributions shown in FIGS. 31E and 31F are the same as those shown in FIGS. 27A and 27B.

Looking at the mode #1, at the sectional position (a) (X=−200) shown in FIG. 31B, $TE_0$ is present in the waveguide 1.

At the sectional position (b) (X=−20) shown in FIG. 31D, it can be seen that the mode has started to be coupled to the $TE_0$ of the waveguide 2.

At the sectional position (c) (X=0) shown in FIG. 31F, since the conditions for phase matching are satisfied, an odd mode of the super mode in which the $TE_0$ of the waveguide 1 and the $TE_0$ of the waveguide 2 are mixed is seen.

Thus, the $TE_0$ input to the waveguide 1 can be changed to the odd mode of the super mode of the $TE_0$ by changing the waveguide structure gradually in the light waveguide direction.

<Specific Example of the Y Branch>

The subsequent-stage mode conversion portion 109 that is a specific example of the Y branch will be described with reference to FIGS. 32A to 32D.

FIGS. 32A to 32D are diagrams showing the subsequent-stage mode conversion portion 109. FIG. 32A is a plan view, FIG. 32B is a sectional view along the sectional position (e) in FIG. 32A, FIG. 32C is a sectional view along the sectional position (d) in FIG. 32A, and FIG. 32D is a sectional view along the sectional position (c) in FIG. 32A.

The core region 13 (core region 1) and the core region 14 (core region 2) are formed of Si (refractive index of 3.48 (wavelength of 1580 nm)), and the upper cladding 6 and the lower cladding 7 are formed of $SiO_2$ (refractive index of 1.44 (wavelength of 1580 nm)). The heights of the core regions 13 and 14 (core regions 1 and 2) are 220 nm. The height of the slab portion 16 is 95 nm.

As shown in FIG. 32D, the widths $W_{13}$ and $W_{14}$ of the core regions 13 and 14 (core regions 1 and 2) (branch portions) are set to 400 [nm].

The gap between the core regions 13 and 14 (core regions 1 and 2) is a gap [nm] (0≤gap≤200). The gap changes linearly from 200 nm to 0 nm in a range from the input ends 13a and 14a to the output ends 13b and 14b.

Therefore, the gap between the core regions 13 and 14 (core regions 1 and 2) decreases from the input ends 13a and 14a (gap=200) to the output ends 13b and 14b (gap=0).

FIG. 32C shows a section at an intermediate position (gap=100) between the input ends 13a and 14a and the output ends 13b and 14b.

Figure 33:
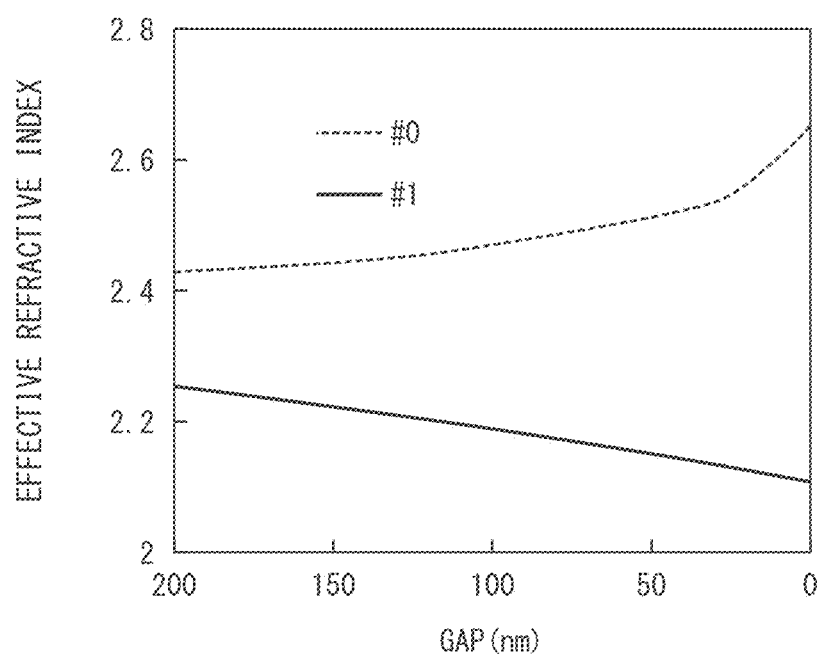
FIG. 33 is a graph showing the relationship between a gap between core regions and the effective refractive index.

FIG. 33 is a graph showing the relationship between the gap between core regions and the effective refractive index.

Modes #0 and #1 indicates first and second effective refractive indices. At the gap=200 nm (input end), the modes #0 and #1 match the mode at X=0 in FIG. 30.

At the gap=0 nm (output end), the mode #0 becomes $TE_0$, and the mode #1 becomes $TE_1$.

Therefore, the odd mode at the input end is converted into the $TE_1$ at the output end by forming the waveguides closer to each other gradually.

In order to confirm this, FIGS. 34A to 34F show the electric field distribution of each of the modes #0 and #1 at the sectional positions (c) to (e) (refer to FIG. 32A).

FIGS. 34A and 34B are simulation results showing the electric field distribution ($E_X$ component) at the sectional position (c) in FIG. 32 A (FIG. 34A shows the mode #0, and FIG. 34B shows the mode #1). FIGS. 34C and 34D are simulation results showing the electric field distribution ($E_X$ component) at the sectional position (d) (FIG. 34C shows the mode #0, and FIG. 34D shows the mode #1). FIGS. 34E and 34F are simulation results showing the electric field distribution ($E_X$ component) at the sectional position (e) (FIG. 34E shows the mode #0, and FIG. 34F shows the mode #1).

From FIGS. 34A to 34F, it can be confirmed that the odd mode is gradually converted into the $TE_1$ and the even mode is gradually converted into the $TE_0$.

According to the present embodiment, in the super mode generating element (preceding-stage mode conversion portion), $TE_0$ is converted into the odd mode of the super mode of the $TE_0$ at the output ends of the first and second cores. The Y branch (subsequent-stage mode conversion portion) converts the odd mode into the $TE_1$.

Therefore, the $TE_0$ input to the super mode generating element is converted into the odd mode, and then the odd mode is input to the Y branch and is converted into the $TE_1$.

<Effects of the Present Embodiment>

[Fifth Effect]

As a fifth effect, it can be mentioned that it is possible to generate a super mode at a shorter distance than in a case in which there is no slab portion by forming a slab portion between a pair of core regions.

Hereinafter, the reason will be described.

By forming the slab portion, the refractive index difference between the core and the cladding is substantially reduced between the core regions, and the amount of leakage light is increased. Therefore, since the coupling coefficient χ is increased, the coupling of light between adjacent waveguides is increased. As a result, since it is possible to generate the super mode at a short distance, it is possible to shorten the device length.

[Sixth Effect]

As a sixth effect, the ease of manufacturing and the ease of integration can be mentioned.

Since a structure in which a slab portion is formed between core regions is adopted, it is possible to form the core regions and the slab portion integrally by two lithography/etching processes.

That is, a core can be formed by forming a core having a fixed thickness by the lithography/etching process first and then forming a slab portion by making a part of the core thinner by the lithography/etching process.

In addition, since there is no particular limitation on the height of the core region and the height of the slab portion and it is sufficient to satisfy the general conditions of the optical waveguide, integration with an optical waveguide element having another slab portion (optical modulator having a rib type phase modulation unit) is easy.

[Seventh Effect]

As a seventh effect, it can be mentioned that, in the subsequent-stage mode conversion portion, not only can the conversion efficiency from the odd mode to the $TE_1$ be increased but also the conversion efficiency from the even mode to the $TE_0$ can be increased by forming the slab portion between the core regions.

This is advantageous when performing the mode multiplexing of $TE_0$ and $TE_1$.

Example 7

<Planar Optical Waveguide Element>

Figure 35A:
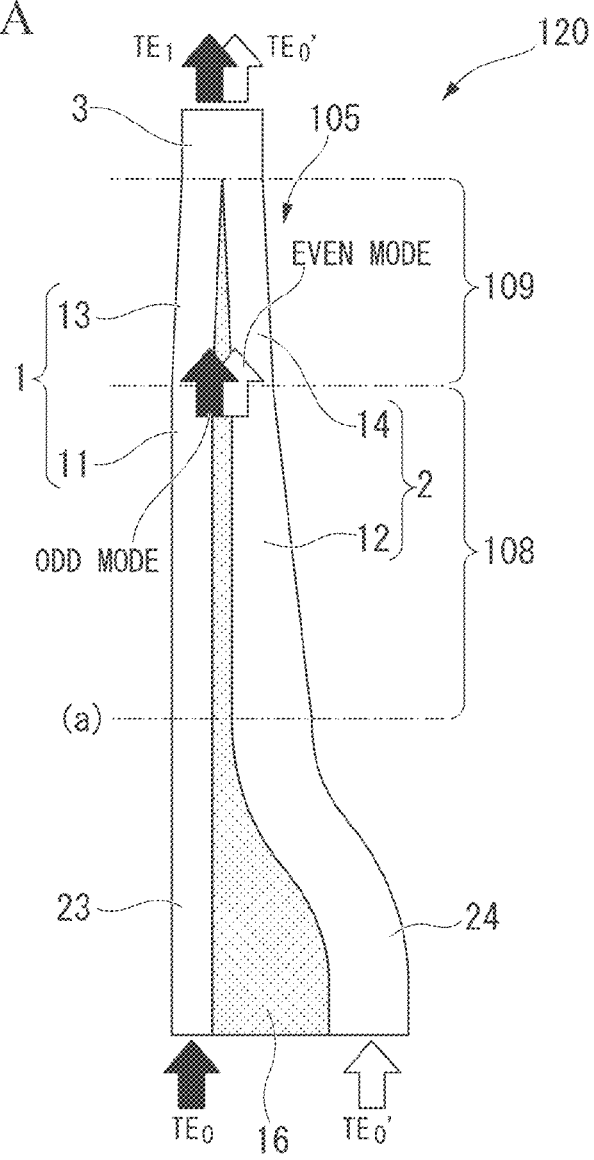
FIG. 35A is a plan view showing an example of a planar optical waveguide element including a curved waveguide.
Figure 35B:
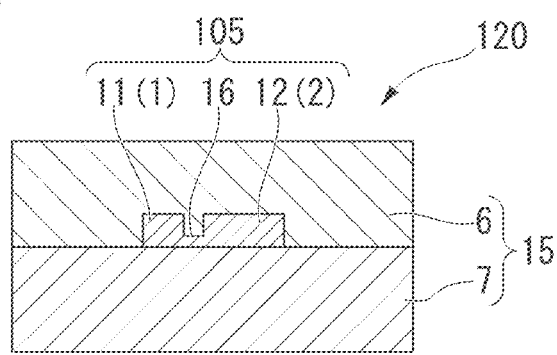
FIG. 35B is a sectional view at the sectional position (a) that shows an example of the planar optical waveguide element including a curved waveguide.

FIGS. 35A and 35B are diagrams showing a planar optical waveguide element 120 in example 7 of the invention. FIG. 35A is a plan view, and FIG. 35B is a sectional view at the sectional position (a) of FIG. 35A. The same components as in the planar optical waveguide element 110 shown in FIGS. 25A and 25B are denoted by the same reference numerals, and explanation thereof will be omitted.

In the planar optical waveguide element 120, the first core region 1 includes a straight waveguide 23, and the second core region 2 includes a curved waveguide 24. The straight waveguide 23 is formed on the input side of the core region 11, and the curved waveguide 24 is formed on the input side of the core region 12.

In the planar optical waveguide element 120, the first core region 1 (straight waveguide 23) and the second core region 2 (curved waveguide 24) are formed so as to become closer to each other as the distance from the preceding-stage mode conversion portion 108 becomes shorter. Therefore, it is possible to limit the reflection of unnecessary light.

Since the straight waveguide 23 and the curved waveguide 24 are spaced apart from each other as the distance from the preceding-stage mode conversion portion 108 increases, it is possible to reduce mode coupling more reliably than in the case of tapering. Therefore, it is possible to improve the mode conversion efficiency in the preceding-stage mode conversion portion 108.

In order to show that mode conversion is possible in this example, the conversion efficiency (ratio of the power of the output $TE_1$ to the power of the input $TE_0$) of the $TE_1$ that was output when the $TE_0$ was input to the core region 1 was calculated using the finite difference time domain method (FDTD).

The wavelength is 1580 nm. The length of the Y branch (subsequent-stage mode conversion portion 109 in FIG. 35A) is 10 μm. The calculation result is shown in FIG. 36.

Figure 36:
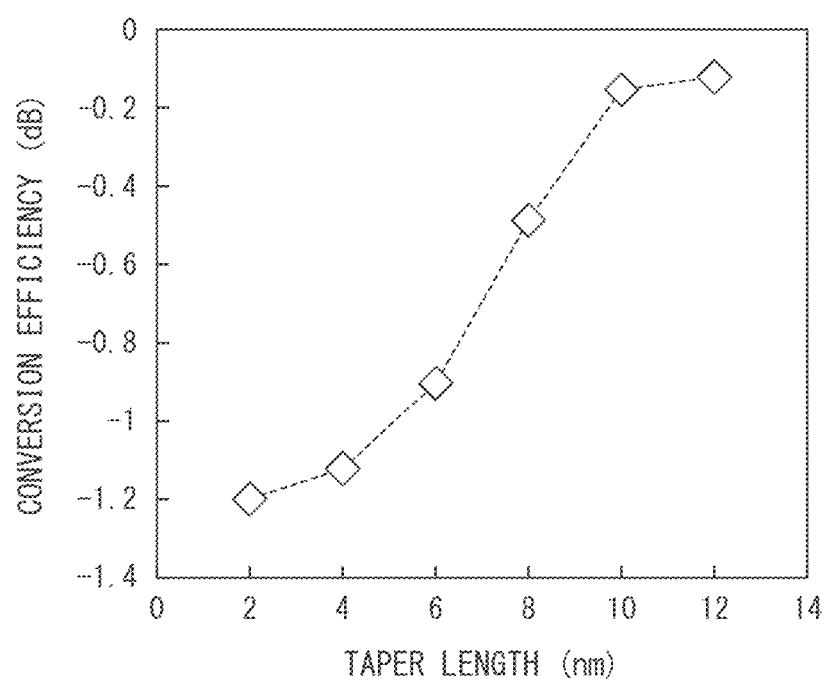
FIG. 36 is a graph showing the relationship between the taper length of a preceding-stage mode conversion portion and conversion efficiency.

FIG. 36 shows the relationship between the taper length of the super mode generating element (length of the tapered waveguide (core region 12)) and the conversion efficiency.

From FIG. 36, it can be seen that the conditions of adiabatic change are easily satisfied and the conversion efficiency is increased since a change in the width of the core region in the light waveguide direction becomes gentle as the taper length of the super mode generating element increases.

Figure 37:
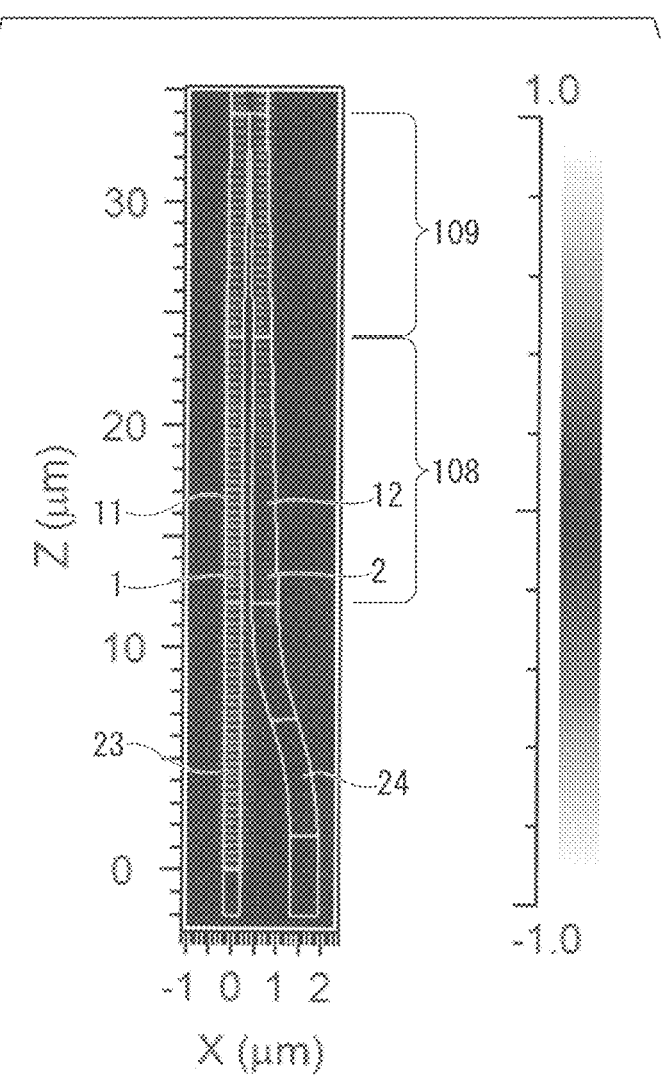
FIG. 37 is a simulation result showing the electric field distribution ($E_X$ component).

FIG. 37 shows the electric field distribution when the taper length (length of the core region 12) of the super mode generating element (preceding-stage mode conversion portion 108) is 12 μm. FIG. 37 shows the $E_X$ component at y=0.1 μm when inputting the $TE_0$ to the core region 1 from the input end (lower end). The wavelength is 1580 nm.

From FIG. 37, it can be seen that optical coupling occurs in the super mode generating element and conversion into the odd mode in which the $TE_0$ is distributed in both of the core regions occurs. In addition, it can also be confirmed that the odd mode is converted into the $TE_1$ by the Y branch.

Figure 38:
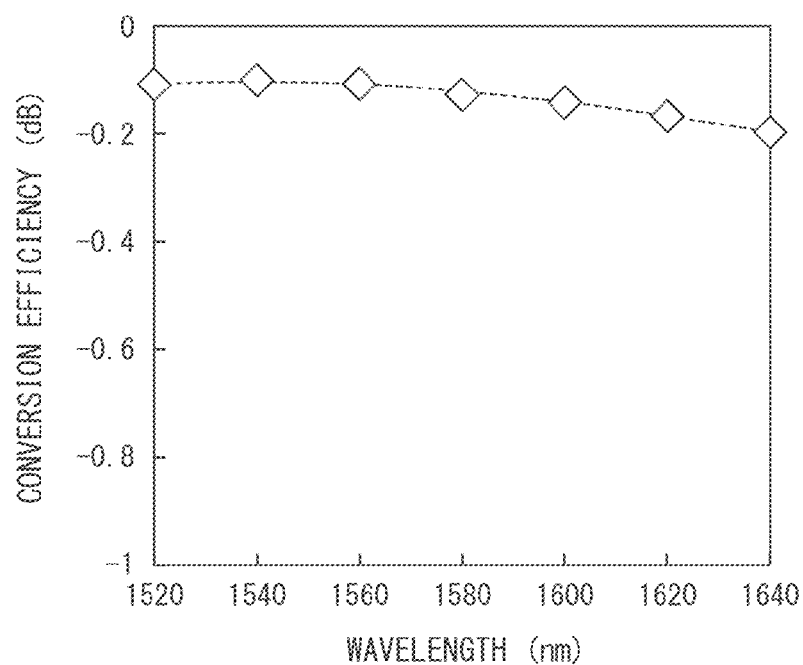
FIG. 38 is a graph showing the relationship between the wavelength of light and conversion efficiency.

FIG. 38 is a graph showing the result when simulating the wavelength dependence (relationship between the wavelength and conversion efficiency) in the present example using the FDTD. The taper length of the super mode generating element is 12 μm.

From FIG. 38, in the present example, it can be confirmed that the high conversion efficiency of −0.19 dB or more is obtained in the range of 1520 nm to 1640 nm.

In addition, the electric field distribution spreads to the outside of the core region as the waveguide increases, and coupling to the adjacent wavelength is increased. At the long wavelength, the conversion efficiency of the super mode generating element is increased. Therefore, the overall conversion efficiency is improved.

Next, in order to check the influence of manufacturing error in the present example, the relationship between the wavelength and the conversion efficiency when the widths of all core regions were changed by only −30 nm was simulated using the FDTD. The taper length of the super mode generating element is 12 μm.

Figure 39:
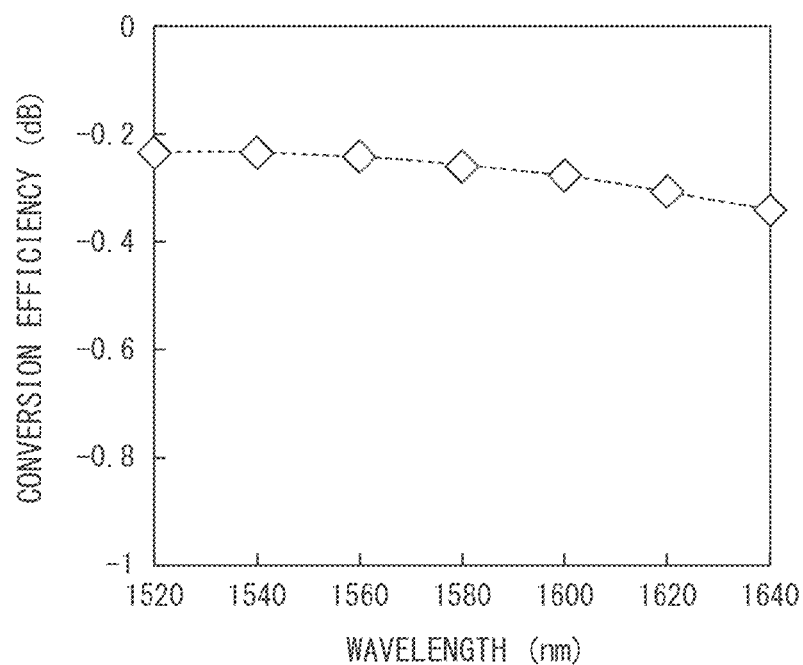
FIG. 39 is a graph showing the relationship between the wavelength of light and conversion efficiency when the width of the core region is changed.

The calculation result is shown in FIG. 39.

When FIG. 39 is compared with FIG. 38, a variation in the conversion efficiency when the widths of all core regions are changed by −30 nm is within 0.14 dB at each wavelength, so that the high conversion efficiency is maintained.

From FIG. 39, it can be confirmed that the present structure is strong against manufacturing error.

Next, it is shown that the mode multiplexing of $TE_0$ and $TE_1$ (mode obtained by conversion of the $TE_0$ input to the core region 1) of the core region 2 is possible in the present example.

For this, the transmittance (ratio of the power of $TE_0'$ output from the Y branch to the power of $TE_0'$ input to the core region 2) of $TE_0'$ output from the Y branch when inputting $TE_0$ (described as $TE_0'$ for distinction) to the core region 2 from the input side was simulated using the FDTD.

Figure 40:
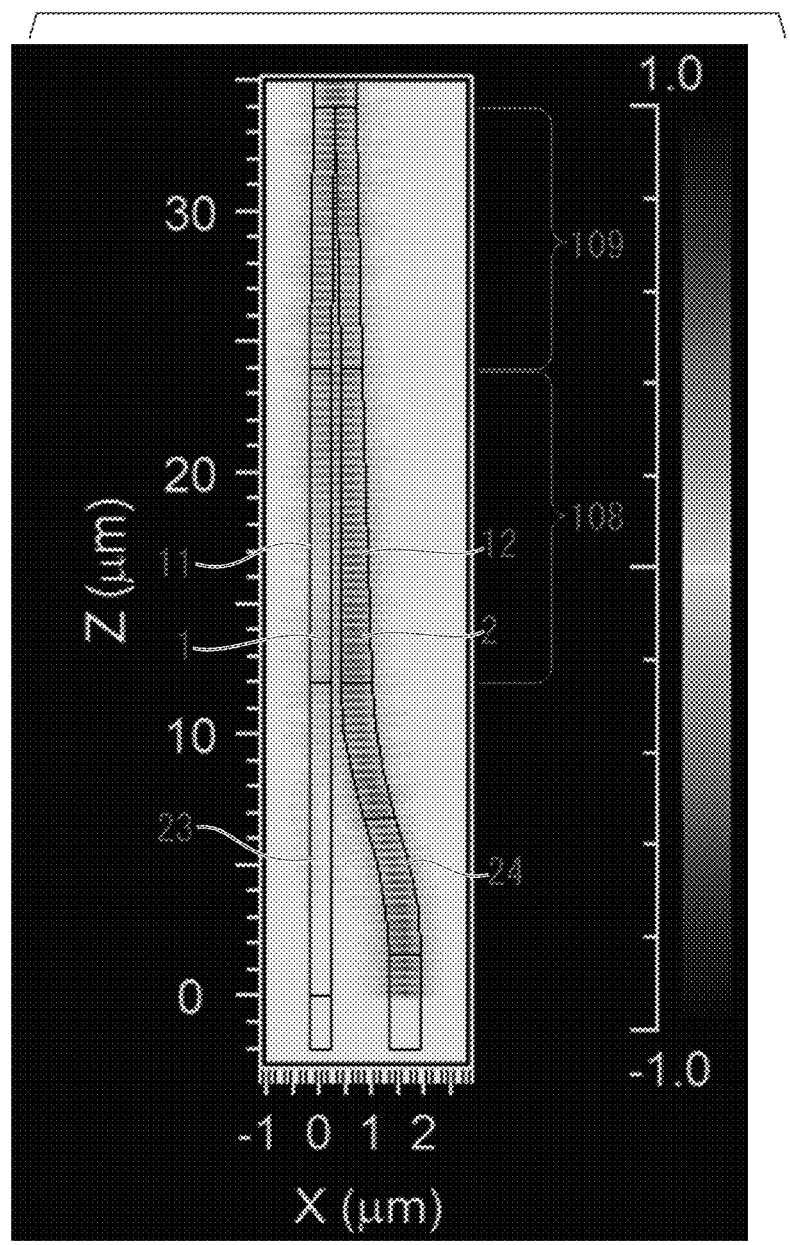
FIG. 40 is a simulation result showing the electric field distribution ($E_X$ component).

FIG. 40 shows the electric field distribution calculated by using the FDTD when the taper length of the super mode generating element is 12 μm. The wavelength is 1580 nm. FIG. 40 shows the $E_X$ component at y=0.1 μm when inputting the $TE_0$ to the core region 1 from the input end (lower end).

In this case, it can be seen that the transmittance is −0.09 dB and a lot of power is transmitted. From the above, mode multiplexing is possible in the present example.

<Comparison with the Related Art>

The present example will be compared with the performance of an asymmetric directional coupler of the related art. Specifically, example 7 will be compared with comparative example 1 having the structure shown in FIGS. 55A and 55B. First, the validity of the comparison will be checked from the follow point of view.

Both the super mode generating element used in the present example and the asymmetric directional coupler in the related art use the principle of mode coupling.

As the amount of light leaking to the adjacent waveguide becomes larger, mode coupling becomes stronger, and the efficiency is improved. In order to realize this, it is preferable to weaken the confinement of light by reducing the width of the core region.

However, when actual manufacturing is taken into consideration, there is a problem that reproducibility is reduced or a waveguide based on the mask design cannot be manufactured depending on the accuracy of lithography if the width of the core region is too narrow. For this reason, there is a minimum value allowing the manufacturing in the width of the core region.

Therefore, it becomes possible to compare example 7 with comparative example 1 by setting the same conditions for the minimum width of the core region. In addition, since the bonding also becomes strong by reducing the gap between the core regions, the gap between the core regions is also set to be the same in example 7 and comparative example 1.

In example 7, the other widths of the core region were determined with the width of the output end (portion where the core needs to be narrowest) of the super mode generating element using the principle of mode coupling as 400 nm.

In comparative example 1 (asymmetric directional coupler shown in FIGS. 55A and 55B), the width of the core region 1 (portion where the core needs to be narrowest) through which the $TE_0$ to be coupled was guided was set to 400 nm, and the width of the core region 2 was determined for phase matching therebetween.

Since the conditions for the minimum width of the core region are the same, it becomes possible to compare example 7 with comparative example 1.

Figure 41:
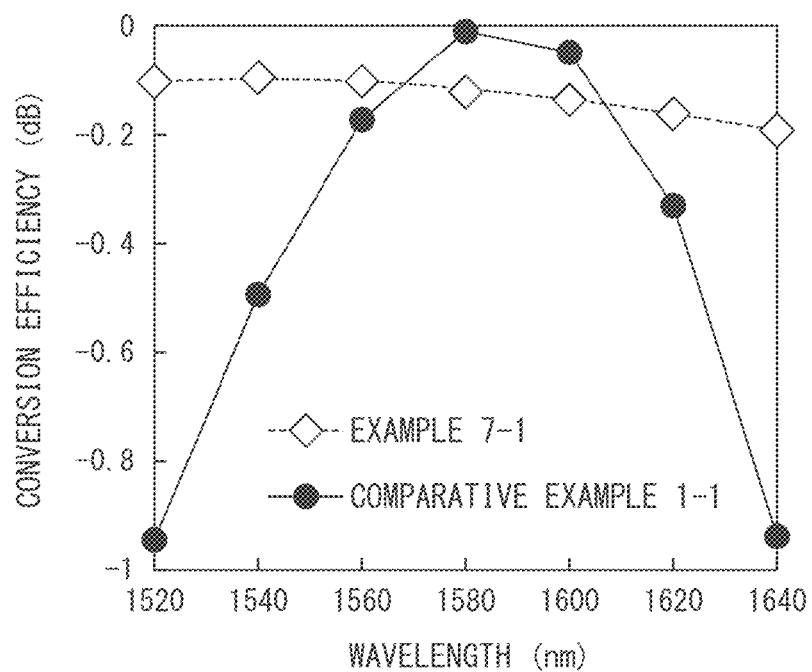
FIG. 41 is a graph showing the relationship between the wavelength of light and conversion efficiency.

FIG. 41 shows the comparison result regarding the influence of the wavelength on the conversion efficiency in example 7 and comparative example 1. The results of example 7 and comparative example 1 are described as example 7-1 and comparative example 1-1, respectively. These results are the same as the graphs shown in FIGS. 38 and 57.

Referring to FIG. 41, in comparative example 1 (comparative example 1-1), the loss near the wavelength of 1580 nm is lower than that in example 7, but the conversion efficiency is greatly reduced when the wavelength is changed. For this reason, the loss change according to the wavelength is large.

In contrast, in example 7 (example 7-1), the loss change according to the wavelength near the wavelength of 1580 nm is larger than that in comparative example 1 (comparative example 1-1), but the loss change according to the wavelength in the wavelength range of 1520 nm to 1640 nm (wavelength range covering the C+L band in optical communication) is small.

In addition, when the minimum conversion efficiency in this wavelength range is compared, it can be seen that the minimum conversion efficiency in example 7 (example 7-1) is higher.

As described above, in example 7 (example 7-1), high-efficiency conversion can be realized over the wider wavelength range than in comparative example 1 (comparative example 1-1).

In addition, since the super mode generating element uses the adiabatic change in example 7 (example 7-1), it is possible to further reduce the loss by increasing the taper length.

In contrast, in the asymmetric directional coupler of comparative example 1 (comparative example 1-1), it is difficult to greatly change the length. Accordingly, a further improvement in the conversion efficiency cannot be expected.

Figure 42:
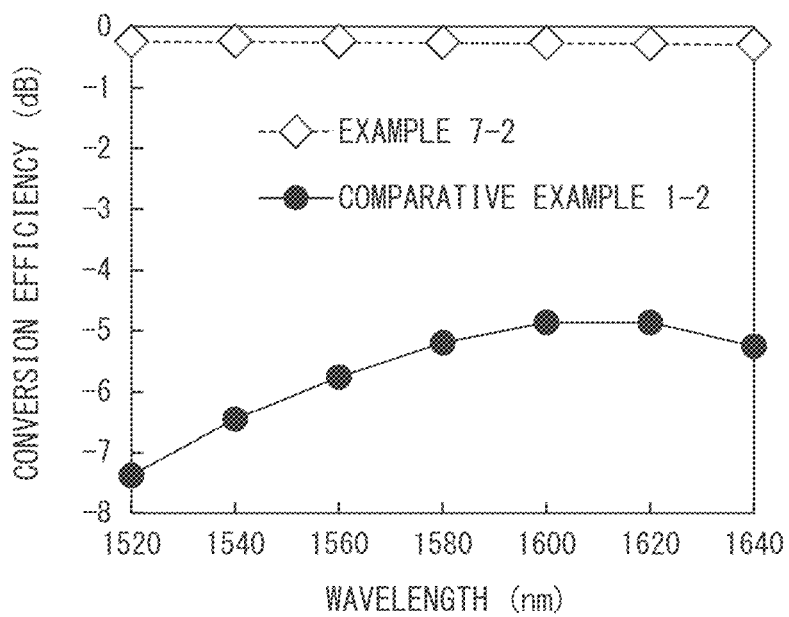
FIG. 42 is a graph showing the relationship between the wavelength of light and conversion efficiency when the width of the core region is changed.

Subsequently, FIG. 42 shows the comparison result regarding the influence of manufacturing error on the conversion efficiency in example 7 and comparative example 1. FIG. 42 shows the conversion efficiency when the width of the core region is changed by −30 nm. The results of example 7 and comparative example 1 are described as example 7-2 and comparative example 1-2, respectively. These results are the same as the graphs shown in FIGS. 39 and 60.

Referring to FIG. 42, phase matching is not realized and the conversion efficiency is greatly reduced in comparative example 1 (comparative example 1-2), while the high conversion efficiency is maintained in example 7 (example 7-2).

Therefore, example 7 (example 7-2) is stronger against manufacturing error than comparative example 1 (comparative example 1-2).

From these results, it can be seen that the present example realizes high conversion efficiency in a wide wavelength band and is strong against manufacturing error, compared with the related art.

Example 8

<Planar Optical Waveguide Element>

Figure 43A:
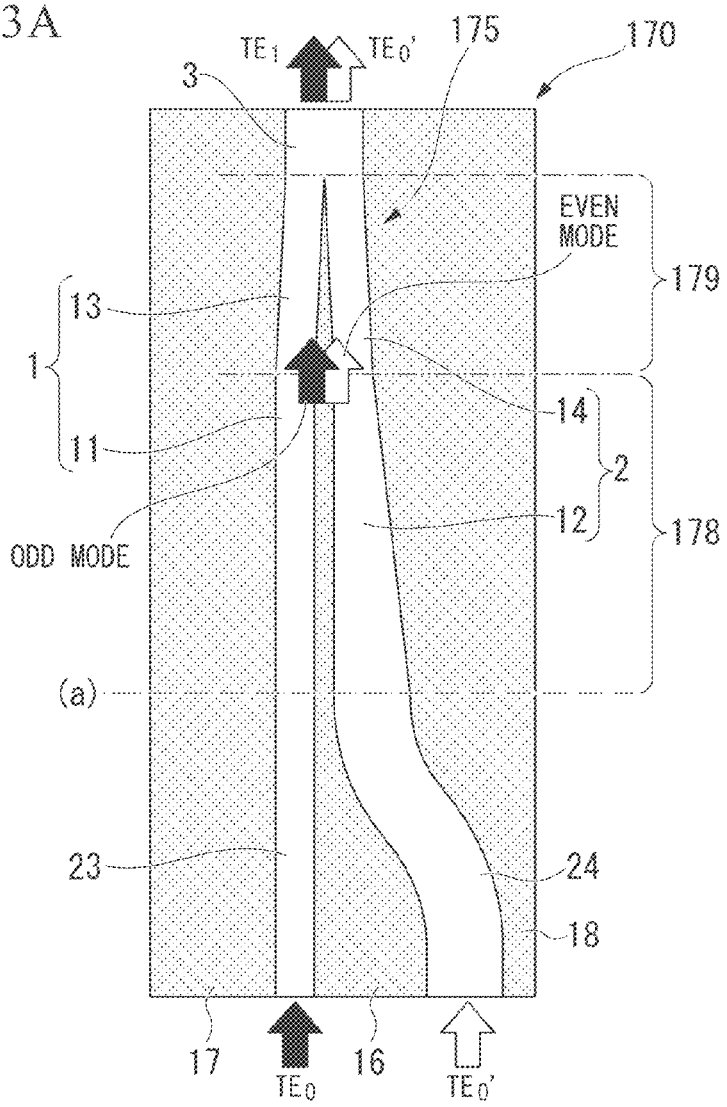
FIG. 43A is a plan view showing an example of a planar optical waveguide element having a rib waveguide structure.
Figure 43B:
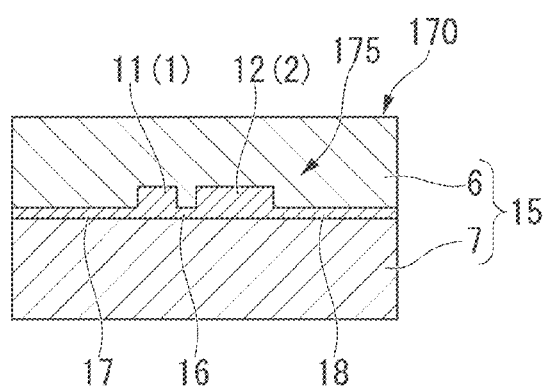
FIG. 43B is a sectional view at the sectional position (a) that shows an example of the planar optical waveguide element having a rib waveguide structure.

FIGS. 43A and 43B are diagrams showing a planar optical waveguide element 170 in example 8 of the invention. FIG. 43A is a plan view, and FIG. 43B is a sectional view at the sectional position (a) of FIG. 43A.

The planar optical waveguide element 170 (mode conversion element) has the same configuration as the planar optical waveguide element 120 shown in FIGS. 35A and 35B except that the core 175 is provided instead of the core 105.

The core 175 includes a pair of core regions 1 and 2 arranged in parallel, a slab portion 16 (intermediate region) formed between the core regions 1 and 2 so as to connect the core regions 1 and 2 to each other, and slab portions 17 and 18 (outwardly extending regions) formed so as to extend outwardly in the width direction from the core regions 1 and 2. In FIG. 43A, the slab portions 16 to 18 are shaded.

Similar to the slab portion 16, the slab portions 17 and 18 are formed so as to be lower than the core regions 1 and 2.

The bottom surfaces of the slab portions 16 to 18 are even with the bottom surface of the core regions 1 and 2. The core regions 1 and 2 protrude upward from the upper surfaces of the slab portions 16 to 18.

In the core 175, the slab portions 17 and 18 are provided not only on one side (inner side) but also on the other side (outer side) of each of the core regions 1 and 2 in the width direction. Therefore, the core 175 forms a so-called rib waveguide.

The core 175 includes a preceding-stage mode conversion portion 178 and a subsequent-stage mode conversion portion 179.

In the planar optical waveguide element 170, since the core 175 includes the slab portions 16 to 18, the coupling of light between the waveguides is increased compared with a case in which there is no slab portion. Accordingly, since it is possible to generate a super mode in a short distance, it is possible to shorten the device length.

Since the planar optical waveguide element 170 has the slab portions 17 and 18 extending to the outside of the core regions 1 and 2, the amount of light leaking to the outside of the core regions 1 and 2 is increased. Accordingly, compared with the planar optical waveguide element 120 shown in FIGS. 35A and 35B, the coupling coefficient $\chi$ is reduced. However, this is advantageous in that it is possible to reduce the adverse effect of the roughness of the side wall of the core region (increase in loss due to light scattering), which occurs during the process, such as dry etching.

The reason why the influence of the roughness of the side wall of the core region can be reduced is that the planar optical waveguide element 170 includes the slab portions 16 to 18 provided on both sides of the core regions 1 and 2 and the area of the side surface of each of the core regions 1 and 2 is reduced.

Therefore, from the viewpoint of decreasing the loss due to the roughness of the side wall, the present embodiment (rib waveguide) is preferable.

Example 9

<Planar Optical Waveguide Element>

Figure 44:
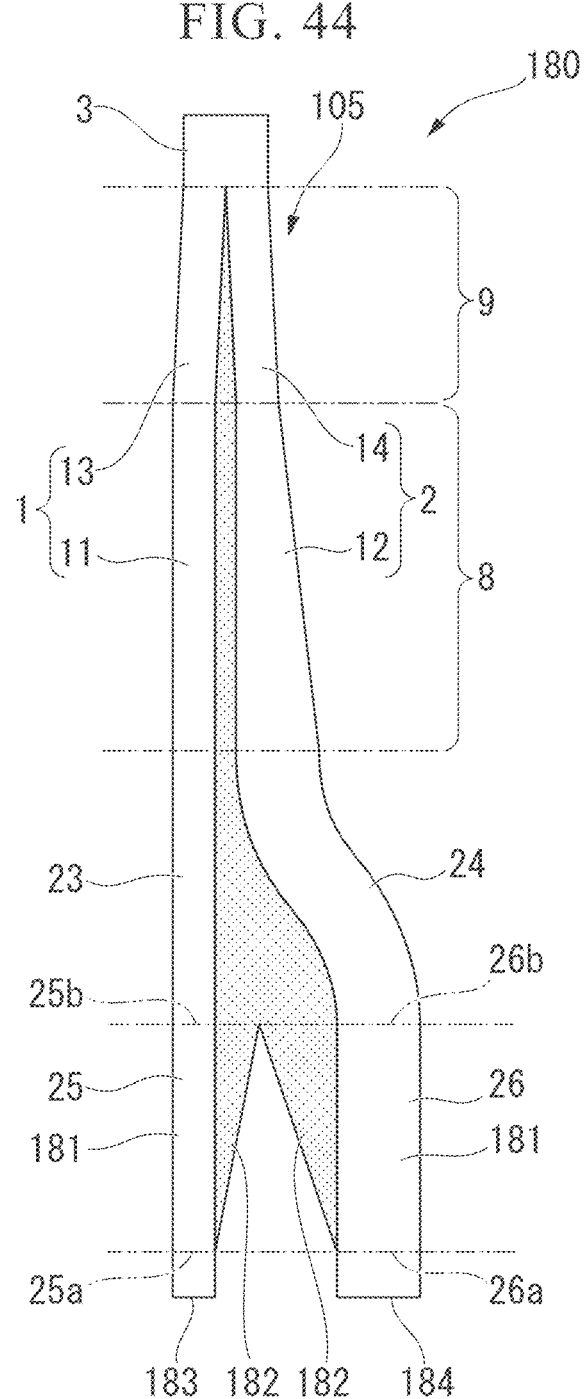
FIG. 44 is a plan view showing an example of a planar optical waveguide element including a tapered waveguide.

FIG. 44 is a plan view showing a planar optical waveguide element 180 in example 9 of the invention.

The planar optical waveguide element 180 (mode conversion element) has the same configuration as the planar optical waveguide element 120 shown in FIGS. 35A and 35B except that the first core region 1 includes a one-side tapered waveguide 25 and the second core region 2 includes a one-side tapered waveguide 26.

The one-side tapered waveguide 25 is provided on the input side of the straight waveguide 23, and the one-side tapered waveguide 26 is provided on the input side of the curved waveguide 24.

FIGS. 45A to 45C are diagrams showing an example of the one-side tapered waveguide 26. FIG. 45A is a sectional view of the input end, FIG. 45B is a plan view, and FIG. 45C is a sectional view of the output end.

The one-side tapered waveguide 26 includes a rib portion 181 and a slab portion 182 that is formed on one side surface of the rib portion 181 so as to extend from the rib portion 181.

The rib portion 181 has a width that is fixed in the longitudinal direction.

The slab portion 182 is formed in a tapered shape having a width that increases gradually from one end 181a toward the other end 181b in the longitudinal direction of the rib portion 181.

The slab portion 182 is formed with one end 181a of the rib portion 181 as a starting point. Therefore, the one-side tapered waveguide 26 is a rectangular waveguide at an input end 26a, and is a semi-rib waveguide at an output end 26b.

For the one-side tapered waveguide 25, the same structure can be adopted.

Thus, by using the one-side tapered waveguides 25 and 26, it is possible to reduce the degree of change in the longitudinal direction of the waveguide structure at the connection points between the external rectangular waveguides 183 and 184 and the semi-rib waveguide (the straight waveguide 23 and the curved waveguide 24). As a result, it is possible to realize low-loss connection.

In the planar optical waveguide element 180 shown in FIG. 44, connection between the rectangular waveguide and the semi-rib waveguide, in which the slab portion is provided on only one side, is assumed. However, in the case of connection between the rectangular waveguide and the rib waveguide in which the slab portion is provided on both sides, it is preferable to use both-sides tapered waveguide 27 shown in FIGS. 46A to 46C.

The both-sides tapered waveguide 27 includes a rib portion 181 and slab portions 182 formed on both side surfaces of the rib portion 181.

Since the slab portion 182 is formed with one end 181a as a starting point, the both-sides tapered waveguide 27 is a rectangular waveguide at the input end, and is a rib waveguide at the output end.

Thus, by using the both-sides tapered waveguide 27, it is possible to realize low-loss connection at the connection point between the external rectangular waveguide and the rib waveguide in which the slab portion is provided on both sides.

Example 10

<Planar Optical Waveguide Element>

Figure 47:
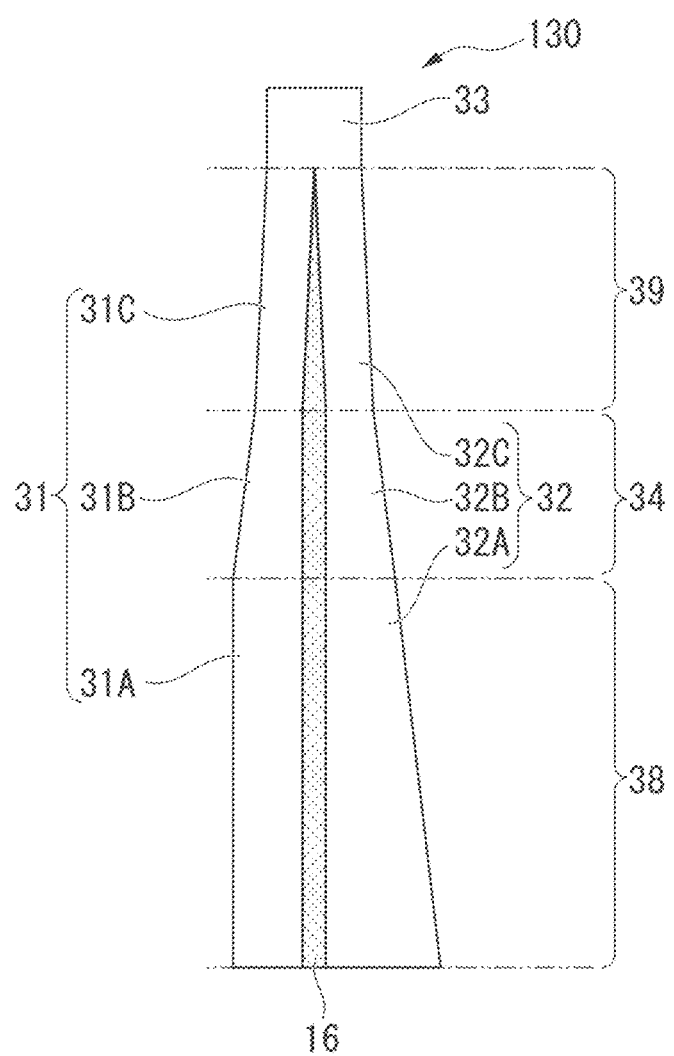
FIG. 47 is a plan view showing a fourth example of the planar optical waveguide element having a structure in which an intermediate core region is provided between a preceding-stage mode conversion portion and a subsequent-stage mode conversion portion.

FIG. 47 is a plan view showing a planar optical waveguide element 130 that is example 10. This example is a fourth example of the structure in which an intermediate core region is provided between a preceding-stage mode conversion portion and a subsequent-stage mode conversion portion.

The planar optical waveguide element 130 has the same configuration as the planar optical waveguide element 30 shown in FIG. 19 except that the slab portion 16 is formed between the core regions 31 and 32.

Also in the planar optical waveguide element 130, similar to the planar optical waveguide element 30, the preceding-stage mode conversion portion 38 and the subsequent-stage mode conversion portion 39 can be connected to each other with low loss by providing the intermediate core region 34 having a tapered structure.

Example 11

<Planar Optical Waveguide Element>

Figure 48:
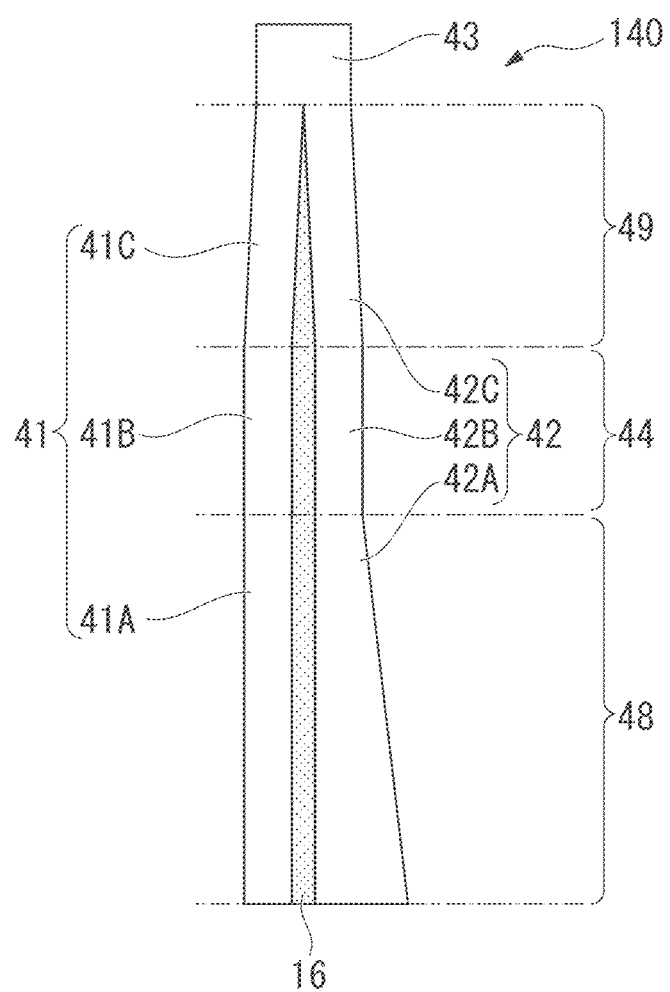
FIG. 48 is a plan view showing a fifth example of the planar optical waveguide element having a structure in which an intermediate core region is provided between a preceding-stage mode conversion portion and a subsequent-stage mode conversion portion.

FIG. 48 is a plan view showing a planar optical waveguide element 140 that is example 11. This example is a fifth example of the structure in which an intermediate core region is provided between a preceding-stage mode conversion portion and a subsequent-stage mode conversion portion.

The planar optical waveguide element 140 has the same configuration as the planar optical waveguide element 40 shown in FIG. 20 except that the slab portion 16 is formed between the core regions 41 and 42.

Also in the planar optical waveguide element 140, similar to the planar optical waveguide element 40, it is possible to increase the degree of freedom of the arrangement of the subsequent-stage mode conversion portion 49 by providing the straight intermediate core region 44.

Example 12

<Planar Optical Waveguide Element>

Figure 49:
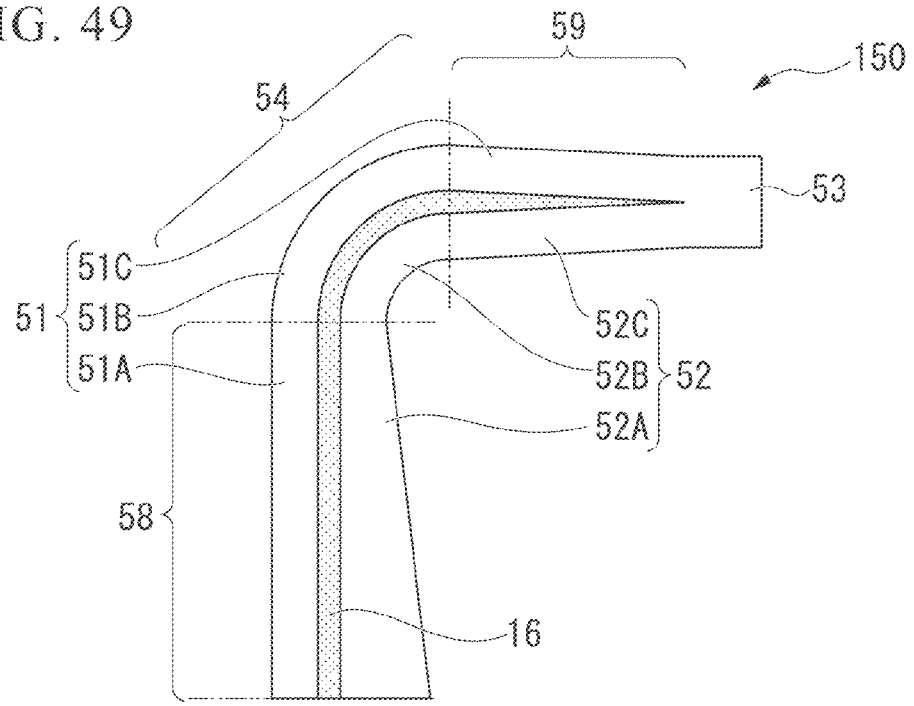
FIG. 49 is a plan view showing a sixth example of the planar optical waveguide element having a structure in which an intermediate core region is provided between a preceding-stage mode conversion portion and a subsequent-stage mode conversion portion.

FIG. 49 is a plan view showing a planar optical waveguide element 150 that is example 12. This example is a sixth example of the structure in which an intermediate core region is provided between a preceding-stage mode conversion portion and a subsequent-stage mode conversion portion.

The planar optical waveguide element 150 has the same configuration as the planar optical waveguide element 50 shown in FIG. 21 except that the slab portion 16 is formed between the core regions 51 and 52.

Also in the planar optical waveguide element 150, similar to the planar optical waveguide element 50, it is possible to increase the degree of freedom of the arrangement of the subsequent-stage mode conversion portion 59 by providing the curved intermediate core region 54.

Example 13

<Planar Optical Waveguide Element (Polarization Conversion Element)>

Figure 50:
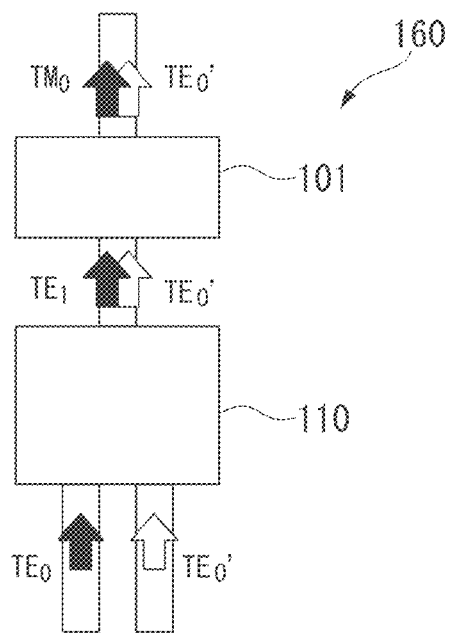
FIG. 50 is a plan view showing an example of a planar optical waveguide element (polarization conversion element) using a high-order polarization conversion element.

FIG. 50 is a schematic diagram showing a planar optical waveguide element 160 (polarization conversion element) that is example 13.

The planar optical waveguide element 160 includes a high-order polarization conversion element 101 (high-order polarization conversion portion) that is provided on the output side of the planar optical waveguide element 110 (mode conversion element) shown in FIGS. 25A and 25B. In addition, the high-order polarization conversion refers to conversion between $TE_1$ and $TM_0$.

As the high-order polarization conversion element 101, the high-order polarization conversion element illustrated in FIGS. 23A and 23B can be used. Instead of the high-order polarization conversion element 101, it is possible to use the high-order polarization conversion element 61 shown in FIGS. 24A to 24D.

In the planar optical waveguide element 160 shown in FIG. 50, the $TE_0$ can be converted into the $TE_1$ by the planar optical waveguide element 110, and the $TE_1$ can be converted into the $TM_0$ by the high-order polarization conversion element 101.

In the high-order polarization conversion element 101, since the $TE_0$ is not converted into another mode, the $TE_0$ (described as $TE_0'$ for distinction) that is input to the core region 2 and is output from the output portion 3 is not converted.

For this reason, an output obtained by the multiplexing of $TM_0$ and $TE_0'$ is obtained from the output side of the high-order polarization conversion element 101. Therefore, the planar optical waveguide element 160 can be used as an element for performing polarization multiplexing.

Example 14

<Planar Optical Waveguide Element (Polarization Conversion Element)>

FIGS. 51A to 51D are diagrams showing a planar optical waveguide element 190 (polarization conversion element) that is example 14. FIG. 51A is an overall plan view, FIG. 51B is a plan view of a high-order polarization conversion element, FIG. 51C is a sectional view of an end portion of the high-order polarization conversion element, and FIG. 51D is a sectional view of a start portion of the high-order polarization conversion element.

The planar optical waveguide element 190 includes a preceding-stage mode conversion portion 178, a subsequent-stage mode conversion portion 179, and a high-order polarization conversion element 111 (high-order polarization conversion portion) provided on the output side of the subsequent-stage mode conversion portion 179.

As shown in FIG. 51A, the preceding-stage mode conversion portion 178 and the subsequent-stage mode conversion portion 179 can be formed in the same structure as those used in the planar optical waveguide element 170 (mode conversion element) shown in FIGS. 43A and 43B.

As shown in FIGS. 51B to 51D, in the high-order polarization conversion element 111, a core 112 is formed by a lower core 114 and an upper core 113, and each of the upper core 113 and the lower core 114 are formed in a tapered shape having a width that decreases continuously in the light waveguide direction.

The core 112 has a vertically asymmetric structure in which the width of the upper core 113 and the width of the lower core 114 are different.

The lower core 114 can be formed integrally with the slab portions 17 and 18 of the subsequent-stage mode conversion portion 179.

The high-order polarization conversion element 111 can perform polarization conversion between the $TE_1$ of a start portion 118 and the $TM_0$ of an end portion 119.

In the planar optical waveguide element 190, the $TE_0$ can be converted into the $TE_1$ by the preceding-stage mode conversion portion 178 and the subsequent-stage mode conversion portion 179, and the $TE_1$ can be converted into the $TM_0$ by the high-order polarization conversion element 111.

The $TE_0$ (described as $TE_0'$ for distinction) that is input to the core region 2 and input to the high-order polarization conversion element 111 is not converted.

For this reason, an output obtained by the multiplexing of $TM_0$ and $TE_0'$ is input to the output portion 3, which is a rectangular waveguide, from the output side of the high-order polarization conversion element 111.

Therefore, the planar optical waveguide element 190 can be used as an element for performing polarization multiplexing.

Since the planar optical waveguide element 190 includes the subsequent-stage mode conversion portion 179 having a rib waveguide structure, connection with the high-order polarization conversion element 111 having a vertically asymmetric structure is easy.

Example 15

<Dual Polarization Quadrature Phase Shift Keying (Dp-Qpsk) Modulator>

The planar optical waveguide element of the invention can be used in a DP-QPSK modulator disclosed in Reference [2] (P. Dong, C. Xie, L. Chen, L. L. Buhl, and Y-K. Chen, "112-Gb/s Monolithic PDM-QPSK Modulator in Silicon," in European Conference and Exhibition on Optical Communication (2012), Vol. 1, p. Th.3.B.1), for example.

Figure 52:
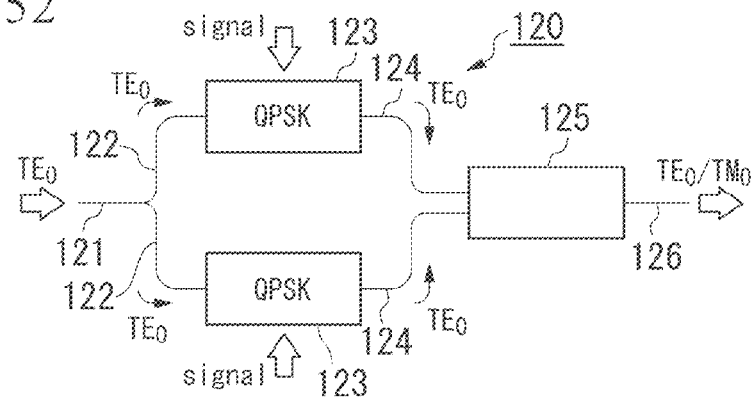
FIG. 52 is a schematic diagram showing an example of a DP-QPSK modulator.

FIG. 52 schematically shows an example of the DP-QPSK modulator.

The DP-QPSK modulator 120 performs DP-QPSK modulation for outputting a QPSK signal independent of both of the $TE_0$ mode and the $TM_0$ mode using the fact that there are two modes of the $TE_0$ mode and the $TM_0$ mode in the normal optical waveguide.

Specifically, light input as a $TE_0$ mode from an input portion 121 is branched to two optical waveguides 122 and 122, and the branched $TE_0$ modes are converted into QPSK signals by QPSK modulators 123 and 123. Then, the $TE_0$ mode of one of optical waveguides 124 and 124 is converted into a $TM_0$ mode by a polarization conversion element 125, the two modes are combined on the same optical waveguide by the polarization beam combiner, and a signal independent of the $TE_0$ mode and the $TM_0$ mode is output to an output portion 126.

Example 16

<Coherent Receiver>

The planar optical waveguide element of the invention can be used in a polarization diversity•coherent receiver on the Si optical waveguide of the polarization multiplexed signal in which the $TE_0$ mode and the $TM_0$ mode are simultaneously transmitted, as disclosed in Reference [3] (C. Doerr, et al., "Packaged Monolithic Silicon 112-Gb/s Coherent Receiver," IEEE Photonics Technology Letters, Vol. 23, p.p. 762, 2011), for example.

Figure 53:
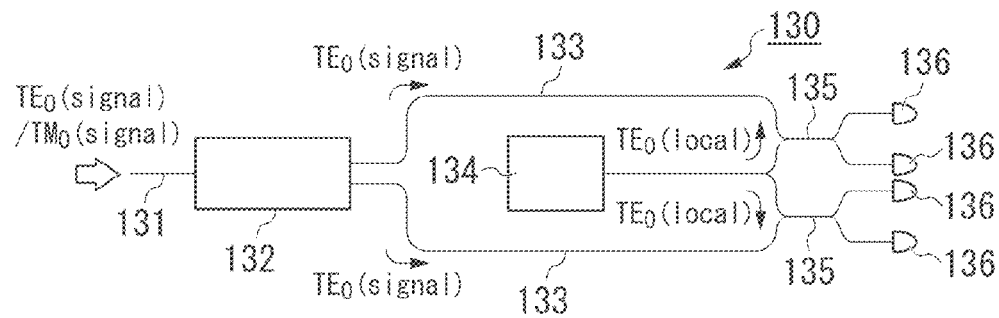
FIG. 53 is a schematic diagram showing an example of a polarization diversity•coherent receiver.

FIG. 53 schematically shows an example of the polarization diversity•coherent receiver.

In a coherent receiver 130, an optical waveguide 131 of the polarization multiplexed signal in which the $TE_0$ mode and the $TM_0$ mode are simultaneously transmitted is connected to a polarization conversion element 132 that can simultaneously perform polarization conversion and polarization beam splitting. The signal of the $TE_0$ mode is branched to one of optical waveguides 133 and 133, and the signal of the $TE_0$ mode converted from the $TM_0$ mode is branched to the other one of the optical waveguides 133 and 133. A semiconductor laser light source that is generally used as local light 134 uses only single polarization, for example, an output of the $TE_0$ mode (local). When such a light source is used, polarization conversion of local light is required in the related art.

In the coherent receiver 130, however, the polarization conversion of local light is not required since the signal light necessarily becomes a signal of the $TE_0$ mode after polarization separation. Signal light and local light are output from a coupling section 136 through an optical multiplexing section 135.

When using an optical waveguide type structure for the polarization conversion element 132, it is possible to use a coupler that does not have a polarization separation function, such as a reverse tapered mode field converter that is coupled from the substrate side, for the coupling of light with respect to the outside of the element in the coupling section 136. As a coupler, for example, a reverse tapered structure disclosed in reference [4] (Qing Fang, et al., "Suspended optical fiber-to-waveguide mode size converter for Silicon photonics", OPTICS EXPRESS, Vol. 18, No. 8, 7763(2010)) can be mentioned.

Example 16

<Polarization Diversity>

The planar optical waveguide element of the invention can be used to perform a polarization diversity scheme when it is necessary to use an element to provide the same operation for both modes when polarization multiplexing transmission for simultaneously transmitting the $TE_0$ mode and the $TM_0$ mode or one polarized wave is transmitted at random, as disclosed in Reference [5] (Hiroshi Fukuda, et al., "Silicon photonic circuit with polarization diversity," Optics Express, Vol. 16, No. 7, 2008), for example.

Figure 54:
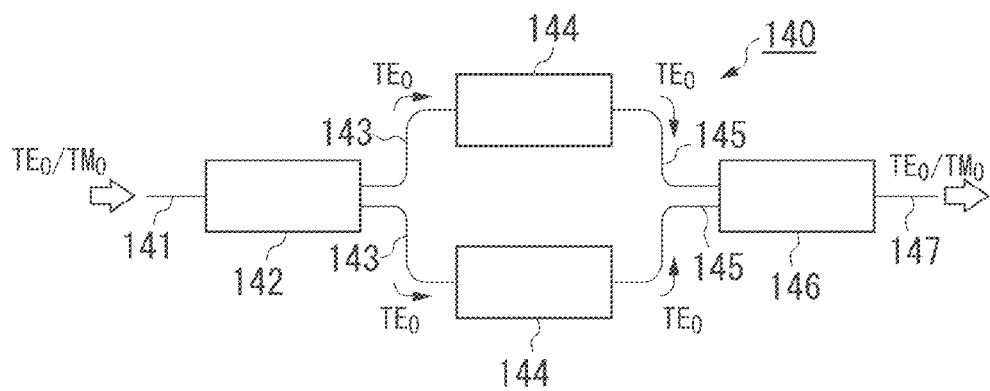
FIG. 54 is a schematic diagram showing an example of the polarization diversity scheme.

In a polarization diversity 140 shown in FIG. 54, an optical waveguide 141 of the polarization multiplexed signal in which the $TE_0$ mode and the $TM_0$ mode are simultaneously transmitted is connected to a polarization conversion element 142 that can simultaneously perform polarization conversion and polarization beam splitting. The signal of the $TE_0$ mode is branched to one of optical waveguides 143 and 143, and the signal of the $TE_0$ mode converted from the $TM_0$ mode is branched to the other one of the optical waveguides 143 and 143. The signal light of the $TE_0$ operated in elements 144 and 144 is combined by a polarization conversion element 146 through optical waveguides 145 and 145, and is output to an optical waveguide 147 of the polarization multiplexed signal in which the $TE_0$ mode and the $TM_0$ mode are simultaneously transmitted.

Similar to the polarization diversity-coherent receiver, the polarization conversion element of the invention that can simultaneously perform polarization conversion and polarization beam splitting can be used as the polarization conversion element 142.

Similar to the DP-QPSK modulator, the polarization conversion element of the invention that can simultaneously perform polarization conversion and polarization beam combination can be used as the polarization conversion element 146.

In addition, the invention is not necessarily limited to the embodiments described above, and various changes can be made without departing from the spirit and scope of the invention.

In the subsequent-stage mode conversion portion (Y branch), both of the core regions are formed in straight lines in plan view in the example shown in the diagrams. However, the planar shape of each core region is not limited thereto.

The planar shape of each core region may be a curved shape or may be a shape obtained by combining a plurality of straight lines having different inclination angles as long as a structure is adopted in which the gap between both of the core regions decreases continuously along the light waveguide direction and both of the core regions are connected to each other at the output end.

In addition, the widths of both of the core regions at the output end of the subsequent-stage mode conversion portion (Y branch) may not be the same. That is, the width of one of the core regions may be larger than that of the other core region.

In the subsequent-stage mode conversion portion (Y branch), the gap between both of the core regions is very small at a position close to the output end. For this reason, it is difficult to form this portion with high accuracy. Therefore, a structure may be formed in which both of the core regions are connected to each other at a position slightly before (input side) the output end of both the core regions. In this structure, since the continuity of the waveguide in the longitudinal direction is lost at the connection point, there is a possibility that the adiabatic change will be slightly affected by the sudden mode change. However, the invention also includes the subsequent-stage mode conversion portion having such a shape.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A planar optical waveguide element, comprising:
a substrate; and
an optical waveguide comprising a core and a cladding, the core being provided on the substrate so as to include first and second core regions arranged in parallel, the cladding having a smaller refractive index than the core,
wherein the core forms a preceding-stage mode conversion portion that is configured to convert a mode of input light and a subsequent-stage mode conversion portion that is configured to convert a mode of light output from the preceding-stage mode conversion portion,
sectional shapes of the first and second core regions are not congruent at an input end of the preceding-stage mode conversion portion, and a shape or size of a section of at least one of the first and second core regions is continuously changed along a light waveguide direction such that the sectional shapes of the first and second core regions are congruent at an output end of the preceding-stage mode conversion portion,
the input end of the preceding-stage mode conversion is configured not to perform mode coupling between the first and second core regions, and the output end of the preceding-stage mode conversion portion is configured to perform the mode coupling between the first and second core regions, and
the first and second core regions are spaced apart from each other at an input end of the subsequent-stage mode conversion portion, and a gap between the first and second core regions is continuously decreased along the light waveguide direction such that the first and second core regions are in contact with each other at an output end of the subsequent-stage mode conversion portion.

2. The planar optical waveguide element according to claim 1,
wherein, in each of the first and second core regions, a section perpendicular to the light waveguide direction is a rectangular shape.

3. The planar optical waveguide element according to claim 1,
wherein, in the preceding-stage mode conversion portion, heights of the first and second core regions are the same, and a width of one of the first and second core regions having a larger section at the input end is continuously decreased along the light waveguide direction such that shapes of sections of the first and second core regions are congruent at the output end.

4. The planar optical waveguide element according to claim 1,
wherein, in the subsequent-stage mode conversion portion, a sectional shape of each of the first and second core regions is fixed over an entire length, and
sectional shapes of the first and second core regions at the input end of the subsequent-stage mode conversion portion are the same as the sectional shapes of the first and second core regions at the output end of the preceding-stage mode conversion portion.

5. The planar optical waveguide element according to claim 1,
wherein the core includes a slab portion that extends in a width direction of the first and second core regions, and
the slab portion has a smaller height than the first and second core regions, is disposed at least between the first and second core regions, and is formed so as to connect the first and second core regions to each other.

6. The planar optical waveguide element according to claim 5,
wherein the slab portion has an outwardly extending region that is formed so as to extend outwardly in the width direction from the first and second core regions.

7. The planar optical waveguide element according to claim 1,
wherein the preceding-stage mode conversion portion is configured to convert TE0 into an odd mode of a super mode of TE0, and
the subsequent-stage mode conversion portion is configured to convert the odd mode of the super mode into TE 1.

8. The planar optical waveguide element according to claim 1,
wherein the core includes a curved waveguide that is formed on an input side of the preceding-stage mode conversion portion so as to be curved in plan view of at least one of the first and second core regions, and
in the curved waveguide, the first and second core regions become closer to each other as a distance from the preceding-stage mode conversion portion becomes shorter.

9. The planar optical waveguide element according to claim 1, further comprising:
an intermediate core region that is provided between the preceding-stage mode conversion portion and the subsequent-stage mode conversion portion so as to connect the preceding-stage mode conversion portion and the subsequent-stage mode conversion portion to each other.

10. The planar optical waveguide element according to claim 1,
wherein the core is formed of Si, and the cladding is formed of $SiO_2$.

11. The planar optical waveguide element according to claim 1, further comprising:
a high-order polarization conversion portion that is connected to an output side of the subsequent-stage mode conversion portion, the high-order polarization conversion portion being configured to convert TE1 obtained by the subsequent-stage mode conversion portion into TM0.

12. A dual polarization quadrature phase shift keying modulator comprising the planar optical waveguide element according to claim 1.

13. A coherent receiver comprising the planar optical waveguide element according to claim 1.

14. A polarization diversity comprising the planar optical waveguide element according to claim 1.

* * * * *

UNITED STATES PATENT AND TRADEMARK OFFICE
CERTIFICATE OF CORRECTION

PATENT NO. : 9,500,807 B2  
APPLICATION NO. : 14/827397  
DATED : November 22, 2016  
INVENTOR(S) : Akira Oka Page 1 of 1

It is certified that error appears in the above-identified patent and that said Letters Patent is hereby corrected as shown below:

On the Title Page

"(73) Assignee: FUJIKURA, LTD., Tokyo (JP)", should be -- (73) Assignee: FUJIKURA LTD., Tokyo (JP) --.

Signed and Sealed this  
Thirtieth Day of May, 2017

Michelle K. Lee  
*Director of the United States Patent and Trademark Office*